United States Patent
Dinu et al.

(10) Patent No.: US 10,567,770 B2
(45) Date of Patent: Feb. 18, 2020

(54) VIDEO DECODING IMPLEMENTATIONS FOR A GRAPHICS PROCESSING UNIT

(71) Applicant: Microsoft Technology Licensing, LLC, Redmond, WA (US)

(72) Inventors: Daniel Dinu, Redmond, WA (US); Juan Carlos Arevalo Baeza, Bellevue, WA (US); Barry Friemel, Redmond, WA (US); William Chen, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 15/345,315

(22) Filed: Nov. 7, 2016

(65) Prior Publication Data

US 2017/0155907 A1    Jun. 1, 2017

Related U.S. Application Data

(63) Continuation of application No. 11/824,508, filed on Jun. 30, 2007, now Pat. No. 9,648,325.

(51) Int. Cl.
  *H04N 19/105*  (2014.01)
  *H04N 19/13*   (2014.01)
  (Continued)

(52) U.S. Cl.
  CPC .............. *H04N 19/13* (2014.11); *G06T 1/20* (2013.01); *H04N 19/105* (2014.11);
  (Continued)

(58) Field of Classification Search
  CPC ...... H04N 19/42; H04N 19/43; H04N 19/436; H04N 19/439; H04N 19/44; H04N 19/513;
  (Continued)

(56) References Cited

U.S. PATENT DOCUMENTS

| 4,309,754 A | 1/1982 | Dinwiddie, Jr. |
| 4,642,756 A | 2/1987 | Sherrod |

(Continued)

FOREIGN PATENT DOCUMENTS

| CN | 1366775 | 8/2002 |
| CN | 1960472 | 5/2007 |

(Continued)

OTHER PUBLICATIONS

3rd Generation Partnership Project, "Multimedia Telephony over IP Multimedia Subsystem (IMS); Optimization Opportunities (Release 7)," 3GPP Technical Report TR 26.914 V7.0.0, 18 pp. (Mar. 2006).

(Continued)

*Primary Examiner* — Jin Cheng Wang
(74) *Attorney, Agent, or Firm* — Klarquist Sparkman, LLP

(57) ABSTRACT

Video decoding innovations for multithreading implementations and graphics processor unit ("GPU") implementations are described. For example, for multithreaded decoding, a decoder uses innovations in the areas of layered data structures, picture extent discovery, a picture command queue, and/or task scheduling for multithreading. Or, for a GPU implementation, a decoder uses innovations in the areas of inverse transforms, inverse quantization, fractional interpolation, intra prediction using waves, loop filtering using waves, memory usage and/or performance-adaptive loop filtering. Innovations are also described in the areas of error handling and recovery, determination of neighbor availability for operations such as context modeling and intra prediction, CABAC decoding, computation of collocated information for direct mode macroblocks in B slices, reduction of memory consumption, implementation of trick play modes, and picture dropping for quality adjustment.

27 Claims, 38 Drawing Sheets

(51) Int. Cl.

| | | |
|---|---|---|
| *H04N 19/15* | (2014.01) | |
| *H04N 19/43* | (2014.01) | |
| *H04N 19/593* | (2014.01) | |
| *H04N 19/82* | (2014.01) | |
| *G06T 1/20* | (2006.01) | |
| *H04N 19/42* | (2014.01) | |
| *H04N 19/436* | (2014.01) | |
| *H04N 19/91* | (2014.01) | |
| *H04N 19/124* | (2014.01) | |
| *H04N 19/159* | (2014.01) | |
| *H04N 19/31* | (2014.01) | |
| *H04N 19/46* | (2014.01) | |
| *H04N 19/51* | (2014.01) | |
| *H04N 19/61* | (2014.01) | |
| *H04N 19/44* | (2014.01) | |
| *H04N 19/89* | (2014.01) | |
| *H04N 19/112* | (2014.01) | |
| *H04N 19/137* | (2014.01) | |
| *H04N 19/16* | (2014.01) | |
| *H04N 19/174* | (2014.01) | |
| *H04N 19/176* | (2014.01) | |
| *H04N 19/184* | (2014.01) | |
| *H04N 19/172* | (2014.01) | |

(52) U.S. Cl.
CPC ........... *H04N 19/124* (2014.11); *H04N 19/15* (2014.11); *H04N 19/159* (2014.11); *H04N 19/31* (2014.11); *H04N 19/42* (2014.11); *H04N 19/43* (2014.11); *H04N 19/436* (2014.11); *H04N 19/46* (2014.11); *H04N 19/51* (2014.11); *H04N 19/593* (2014.11); *H04N 19/61* (2014.11); *H04N 19/82* (2014.11); *H04N 19/91* (2014.11); *H04N 19/112* (2014.11); *H04N 19/137* (2014.11); *H04N 19/16* (2014.11); *H04N 19/172* (2014.11); *H04N 19/174* (2014.11); *H04N 19/176* (2014.11); *H04N 19/184* (2014.11); *H04N 19/44* (2014.11); *H04N 19/89* (2014.11)

(58) Field of Classification Search
CPC .... H04N 19/13; H04N 19/112; H04N 19/137; H04N 19/174; H04N 19/91; H04N 19/176; H04N 19/159; G06T 1/20
USPC .............. 345/501, 522; 375/E7.014, E7.027, 375/E7.094, 240.25
See application file for complete search history.

(56) References Cited

U.S. PATENT DOCUMENTS

| | | | |
|---|---|---|---|
| 5,465,335 A | 11/1995 | Anderson | |
| 5,694,179 A | 12/1997 | Kwak et al. | |
| 5,734,783 A | 3/1998 | Shimoda et al. | |
| 5,909,559 A | 6/1999 | So | |
| 6,002,801 A | 12/1999 | Strongin et al. | |
| 6,006,303 A | 12/1999 | Barnaby et al. | |
| 6,105,048 A | 8/2000 | He | |
| 6,219,502 B1 | 4/2001 | Osari et al. | |
| 6,249,288 B1 | 6/2001 | Campbell | |
| 6,278,691 B1 | 8/2001 | Ohyama et al. | |
| 6,298,166 B1 | 10/2001 | Ratnakar et al. | |
| 6,300,888 B1 | 10/2001 | Chen et al. | |
| 6,427,058 B1 | 7/2002 | Akiba et al. | |
| 6,438,169 B1 | 8/2002 | Takashima et al. | |
| 6,445,314 B1 | 9/2002 | Zhang et al. | |
| 6,574,279 B1 | 6/2003 | Vetro et al. | |
| 6,782,368 B2 | 8/2004 | Fujii et al. | |
| 6,823,016 B1 | 11/2004 | Nguyen et al. | |
| 6,963,347 B1 | 11/2005 | Selvaggi et al. | |
| 7,043,088 B2 | 5/2006 | Chiu et al. | |
| 7,072,404 B2 | 7/2006 | Itokawa | |
| 7,085,322 B2 | 8/2006 | Ngai et al. | |
| 7,099,389 B1 | 8/2006 | Yu et al. | |
| 7,116,714 B2 | 10/2006 | Hannuksela | |
| 7,130,526 B2 | 10/2006 | Abelard et al. | |
| 7,289,047 B2 | 10/2007 | Nagori | |
| 7,366,236 B1 | 4/2008 | Winger | |
| 7,370,325 B1 | 5/2008 | Hull et al. | |
| 7,499,960 B2 | 3/2009 | Dageville et al. | |
| 7,573,407 B2 | 8/2009 | Reznik | |
| 7,653,128 B2 | 1/2010 | Shibata et al. | |
| 7,735,087 B2 | 6/2010 | Hayashi | |
| 7,817,723 B2 | 10/2010 | Wiegand et al. | |
| 7,889,788 B2 | 2/2011 | Toma et al. | |
| 8,213,518 B1 | 7/2012 | Wang et al. | |
| 8,291,448 B2 | 10/2012 | Pekonen et al. | |
| 8,396,082 B2 | 3/2013 | Hannuksela et al. | |
| 8,675,729 B2 | 3/2014 | Kadono et al. | |
| 2002/0036707 A1 | 3/2002 | Gu | |
| 2002/0076115 A1 | 6/2002 | Leeder et al. | |
| 2003/0058949 A1 | 3/2003 | MacInnis et al. | |
| 2003/0138150 A1 | 7/2003 | Srinivasan | |
| 2003/0142746 A1 | 7/2003 | Tanaka et al. | |
| 2003/0161405 A1 | 8/2003 | Howard | |
| 2003/0185298 A1 | 10/2003 | Alvarez et al. | |
| 2003/0189982 A1 | 10/2003 | MacInnis | |
| 2003/0202608 A1* | 10/2003 | MacInnis ............. | H04N 19/159 375/240.29 |
| 2003/0210163 A1 | 11/2003 | Yang | |
| 2003/0235251 A1 | 12/2003 | Hsiun et al. | |
| 2004/0047512 A1 | 3/2004 | Handley et al. | |
| 2004/0117427 A1 | 6/2004 | Allen et al. | |
| 2004/0131272 A1 | 7/2004 | Kobayashi et al. | |
| 2004/0146109 A1 | 7/2004 | Kondo et al. | |
| 2004/0190617 A1 | 9/2004 | Shen et al. | |
| 2004/0208245 A1 | 10/2004 | MacInnis et al. | |
| 2004/0240743 A1 | 12/2004 | Hamada et al. | |
| 2005/0013362 A1 | 1/2005 | Pearson et al. | |
| 2005/0047666 A1 | 3/2005 | Mitchell et al. | |
| 2005/0053157 A1 | 3/2005 | Lillevold | |
| 2005/0053295 A1 | 3/2005 | Holcomb | |
| 2005/0053300 A1 | 3/2005 | Mukerjee | |
| 2005/0068208 A1* | 3/2005 | Liang .................. | H04N 19/159 341/65 |
| 2005/0123207 A1* | 6/2005 | Marpe ................. | H04N 19/196 382/239 |
| 2005/0169374 A1 | 8/2005 | Marpe et al. | |
| 2005/0175091 A1 | 8/2005 | Puri et al. | |
| 2005/0179568 A1 | 8/2005 | Wee et al. | |
| 2005/0180511 A1 | 8/2005 | Arafune et al. | |
| 2005/0220190 A1 | 10/2005 | Ha et al. | |
| 2005/0289505 A1 | 12/2005 | Williams | |
| 2006/0002479 A1 | 1/2006 | Fernandes | |
| 2006/0013320 A1 | 1/2006 | Oguz | |
| 2006/0056513 A1 | 3/2006 | Shen et al. | |
| 2006/0056517 A1 | 3/2006 | MacInnis et al. | |
| 2006/0056708 A1 | 3/2006 | Shen et al. | |
| 2006/0088286 A1 | 4/2006 | Shibata et al. | |
| 2006/0098734 A1 | 5/2006 | Cho et al. | |
| 2006/0114995 A1 | 6/2006 | Robey et al. | |
| 2006/0126726 A1 | 6/2006 | Lin et al. | |
| 2006/0126744 A1 | 6/2006 | Peng et al. | |
| 2006/0133479 A1 | 6/2006 | Chen et al. | |
| 2006/0133507 A1 | 6/2006 | Lim et al. | |
| 2006/0133770 A1* | 6/2006 | Shibata ................ | H04N 5/783 386/356 |
| 2006/0140271 A1 | 6/2006 | Wedi et al. | |
| 2006/0193383 A1 | 8/2006 | Alvarez et al. | |
| 2006/0204119 A1 | 9/2006 | Feng et al. | |
| 2006/0215754 A1 | 9/2006 | Buxton et al. | |
| 2006/0222254 A1 | 10/2006 | Zandi et al. | |
| 2006/0227872 A1 | 10/2006 | Mori et al. | |
| 2006/0230162 A1 | 10/2006 | Chen et al. | |
| 2006/0233525 A1 | 10/2006 | Shibata et al. | |
| 2006/0239343 A1 | 10/2006 | Mohsenian | |
| 2006/0245498 A1 | 11/2006 | Lee et al. | |
| 2006/0248516 A1 | 11/2006 | Gordon | |
| 2006/0267976 A1 | 11/2006 | Saito et al. | |

(56) References Cited

U.S. PATENT DOCUMENTS

| | | |
|---|---|---|
| 2006/0285594 A1 | 12/2006 | Kim et al. |
| 2007/0030899 A1 | 2/2007 | Iguchi et al. |
| 2007/0030911 A1 | 2/2007 | Yoon |
| 2007/0033494 A1 | 2/2007 | Wenger et al. |
| 2007/0036223 A1 | 2/2007 | Srinivasan |
| 2007/0071095 A1 | 3/2007 | Lim |
| 2007/0083578 A1* | 4/2007 | Chen ............... H04N 19/593 708/203 |
| 2007/0086528 A1* | 4/2007 | Mauchly ........... H04N 19/174 375/240.24 |
| 2007/0098068 A1 | 5/2007 | Kimata et al. |
| 2007/0116426 A1 | 5/2007 | Toma et al. |
| 2007/0120711 A1 | 5/2007 | Hu et al. |
| 2007/0120867 A1 | 5/2007 | Shastry et al. |
| 2007/0121728 A1 | 5/2007 | Wang et al. |
| 2007/0124733 A1 | 5/2007 | Bril et al. |
| 2007/0126853 A1 | 6/2007 | Ridge et al. |
| 2007/0153008 A1* | 7/2007 | Song ................ G06F 9/3802 345/501 |
| 2007/0160151 A1 | 7/2007 | Bolton et al. |
| 2007/0177668 A1* | 8/2007 | Park ................ H04N 19/176 375/240.12 |
| 2007/0183491 A1 | 8/2007 | Pearson et al. |
| 2007/0183507 A1 | 8/2007 | Maheshwari et al. |
| 2007/0189385 A1* | 8/2007 | Park ................ H04N 19/46 375/240.12 |
| 2007/0201562 A1 | 8/2007 | Ganesh et al. |
| 2007/0223595 A1 | 9/2007 | Hannuksela et al. |
| 2007/0230582 A1 | 10/2007 | Chiu et al. |
| 2007/0230584 A1 | 10/2007 | Chiu et al. |
| 2007/0233989 A1 | 10/2007 | Garcia-Arellano et al. |
| 2007/0253491 A1* | 11/2007 | Ito ................... H04N 19/61 375/240.24 |
| 2007/0286276 A1 | 12/2007 | Gartner et al. |
| 2007/0291857 A1 | 12/2007 | Hussain |
| 2007/0297501 A1 | 12/2007 | Hussain et al. |
| 2008/0002773 A1 | 1/2008 | Lai |
| 2008/0013620 A1 | 1/2008 | Hannuksela et al. |
| 2008/0048894 A1 | 2/2008 | Ridge et al. |
| 2008/0107184 A1 | 5/2008 | Katsavounidis et al. |
| 2008/0123736 A1 | 5/2008 | Sekiguchi et al. |
| 2008/0123974 A1* | 5/2008 | Zhu .................. H04N 19/61 382/234 |
| 2008/0137736 A1 | 6/2008 | Richardson et al. |
| 2008/0159408 A1 | 7/2008 | Degtyarenko |
| 2008/0181308 A1 | 7/2008 | Wang et al. |
| 2008/0187046 A1* | 8/2008 | Joch ................ H04N 19/56 375/240.16 |
| 2008/0187053 A1* | 8/2008 | Zhao ............... H04N 19/513 375/240.25 |
| 2008/0212676 A1 | 9/2008 | Liu et al. |
| 2008/0225950 A1* | 9/2008 | Zhu ................. H04N 19/159 375/240.14 |
| 2008/0240242 A1* | 10/2008 | Lainema ............ H04N 19/52 375/240.16 |
| 2008/0240252 A1* | 10/2008 | He ................. H04N 19/176 375/240.24 |
| 2008/0253463 A1* | 10/2008 | Lin ................. H04N 19/176 375/240.25 |
| 2008/0285642 A1 | 11/2008 | Jahanghir et al. |
| 2008/0304520 A1 | 12/2008 | Hannuksela et al. |
| 2009/0002379 A1 | 1/2009 | Baeza et al. |
| 2009/0003446 A1 | 1/2009 | Wu et al. |
| 2009/0003447 A1 | 1/2009 | Christoffersen et al. |
| 2009/0003451 A1 | 1/2009 | Lin et al. |
| 2009/0010337 A1 | 1/2009 | Wang |
| 2009/0010338 A1 | 1/2009 | Wang |
| 2009/0016430 A1 | 1/2009 | Schmit |
| 2009/0034856 A1* | 2/2009 | Moriya ............. G06T 9/004 382/238 |
| 2009/0109988 A1 | 4/2009 | Musunuri et al. |
| 2009/0122864 A1 | 5/2009 | Palfner et al. |
| 2009/0147859 A1 | 6/2009 | McGowan et al. |
| 2009/0175548 A1 | 7/2009 | Fukuhara et al. |
| 2009/0279608 A1* | 11/2009 | Jeon ................. H04N 19/597 375/240.16 |
| 2010/0008418 A1 | 1/2010 | Wu et al. |
| 2010/0061643 A1 | 3/2010 | Fukuhara et al. |
| 2010/0158135 A1 | 6/2010 | Yin et al. |
| 2010/0189182 A1 | 7/2010 | Hannuksela |
| 2010/0195721 A1 | 8/2010 | Wu et al. |
| 2011/0064137 A1 | 3/2011 | Han et al. |
| 2011/0206131 A1 | 8/2011 | Vafin et al. |
| 2011/0295820 A1 | 12/2011 | Volkoff et al. |
| 2012/0054463 A1 | 3/2012 | Poyarekar |

FOREIGN PATENT DOCUMENTS

| | | |
|---|---|---|
| CN | 101051465 | 10/2007 |
| CN | 101313585 | 11/2008 |
| CN | 101569170 | 10/2009 |
| EP | 0 909 094 | 4/1999 |
| EP | 1 195 992 | 4/2002 |
| WO | WO 2006/096612 | 9/2006 |
| WO | WO 2006/134110 | 12/2006 |

OTHER PUBLICATIONS

Akramullah et al., "Parallelization of MPEG-2 Video Encoder for Parallel and Distributed Computing Systems," *IEEE*, pp. 834-837 (Aug. 1995).

ATI Technologies, Inc., "Introduction to H.264," 6 pp. (month unknown, 2005).

Azevedo et al., "A Highly Scalable Parallel Implementation of H.264," Transactions on High-Performance Embedded Architectures and Compilers, 25 pp. (Sep. 2009).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Dawson, "Coding for Multiple Cores on Xbox 360 and Microsoft Windows," 8 pp. (Aug. 2006) [Downloaded from the Internet on Jan. 22, 2007].

De Neve et al., "Real-Time BSD-driven Adaptation Along the Temporal Axis of H.264/AVC Bitstreams," *Advances in Multimedia Information Processing*, pp. 131-140 (2006).

Duffy, "CLR Inside Out: Using Concurrency for Scalability," MSDN Magazine, 11 pp. (Sep. 2006) [Downloaded from the Internet on Jan. 22, 2007].

foldoc.org, "priority scheduling," 1 p. (No date) [Downloaded from the Internet on Jan. 26, 2007].

foldoc.org, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Huang et al., "Joint Algorithm/Code-Level Optimization of H.264 Video Decoder for Mobile Multimedia Applications," ICASSP, pp. 2189-2192 (Mar. 2008).

Intel Corp., "Intel's Next Generation Integrated Graphics Architecture—Intel® Graphics Media Accelerator X3000 and 3000," 14 pp. (Jul. 2006).

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).

ITU, "Advanced Video Coding for Generic Audiovisual Services," Recommendation ITU-T H.264, 676 pp. (Mar. 2010).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).

Joint Collaborative Team on Video Coding, "Description of Video Coding Technology Proposal by Texas Instruments Inc.," JCTVC-A101, 45 pp. (Apr. 2010).

Kim et al., "Multi-thread VLIW Processor Architecture for HDTV Decoding," *IEEE 2000 Custom Integrated Circuits Conf.*, pp. 559-562 (May 2000).

(56) References Cited

OTHER PUBLICATIONS

Loomis et al., "VC-1 Technical Overview," 7 pp. (Apr. 2006) [Downloaded from the Internet on Jan. 24, 2007].

MainConcept, "MainConcept™ Showcase 2.8," 4 pp. (downloaded from the World Wide Web on Apr. 6, 2011).

Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).

Narasimhan, "Contributions to Carriage of AVC in MPEG-2," ISO/IEC/JTC1/SC29/WG11, MPEG2003/m9448, 12 pp. (2003).

Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).

Ostermann et al., "Video Coding with H.264/AVC: Tools, Performance, and Complexity," *IEEE Circuits and Systems Magazine*, pp. 7-28 (Aug. 2004).

Prada-Rojas et al,. "Towards a Component-based Observation of MPSoC," *IEEE*, pp. 542-549 (Sep. 2009).

Richardson, H.264 and MPEG-4 Video Compression: Video Coding for Next-generation Multimedia, Chapter 6, "H.264/MPEG4 Part 10," pp. 159-223 (Aug. 2003).

Sambe et al., "High-speed Distributed Video Transcoding for Multiple Rates and Formats," *IEICE Trans on Information and Systems*, vol. E88-D, Issue 8, pp. 1923-1931 (Aug. 2005).

Schwarz et al., "Overview of the Scalable H.264/MPEG4-AVC Extension," *IEEE Int'l Conf. on Image Processing*, pp. 161-164 (Oct. 2006).

Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).

SMPTE, "Proposed SMPTE Standard for Television: VC-1 Compressed Video Bitstream Format and Decoding Process," SMPTE 421M, pp. i-xx, 5-7, 23-27 (Aug. 2005).

SMPTE, "VC-1 Compressed Video Bitstream Format and Decoding Process," SMPTE 421M-2006, 493 pp. (Feb. 2006).

Sullivan, "DirectX Video Acceleration Specification for H.264/AVC Decoding," 66 pp. (Dec. 2007—updated Dec. 2010).

Sullivan et al., "DirectX Video Acceleration Specification for H.264/MPEG-4 AVC Multiview Video Coding (MVC), Including the Stereo High Profile," 17 pp. (Mar. 2011).

Sullivan et al., "Microsoft DirectX VA: Video Acceleration API/DDI," 88 pp. (2001).

Van Der Tol et al., "Mapping of MPEG-4 Decoding on a Flexible Architecture Platform," *Proceedings of the SPIE, Media Processors*, vol. 4674, 13 pp. (Jan. 2002).

Van Der Tol et al., "Mapping of H.264 Decoding on a Multiprocessor Architecture," *Proceedings of the SPIE*, vol. 5022, pp. 707-718 (May 2003).

Wang, "H.264 Baseline Video Implementation on the CT3400 Multi-core DSP," Cradle Technologies, 15 pp. (2006).

Wang, "[Mp4-tech] [H.264] output timing, bumping process, missing HRD parameters," downloaded from World Wide Web, 3 pp. (document marked May 5, 2006).

Wiegand et al., "Introduction to the Special Issue on Scalable Video Coding—Standardization and Beyond," *IEEE Trans. on Circuits and Systems for Video Technology*, vol. 17, No. 9, pp. 1099-1102 (Sep. 2007).

Wong et al., "Task Concurrency Management Methodology to Schedule the MPEG4 IM1 Player on a Highly Parallel Processor Platform," *Proc. of the Ninth Int'l Symp. on Hardware/Software Codesign*, pp. 170-175 (Apr. 2001).

Yadav et al., "Software-only Multiple Variable Length Decoding for Real-Time Video on MDSP," *Int'l Conf. on Consumer Electronics*, pp. 141-142 (Jan. 2005).

Final Office Action dated Feb. 11, 2019, from U.S. Appl. No. 15/589,781, 56 pp.

Marpe et al., "Context-based Adaptive Binary Arithmetic Coding in the H.264/AVC Video Compression Standard," *IEEE Transactions on Circuits and Systems for Video Technology*, vol. 13, No. 7, pp. 620-636 (2003).

\* cited by examiner software 180 implementing one or more multithreaded
decoding innovations or other decoding innovations

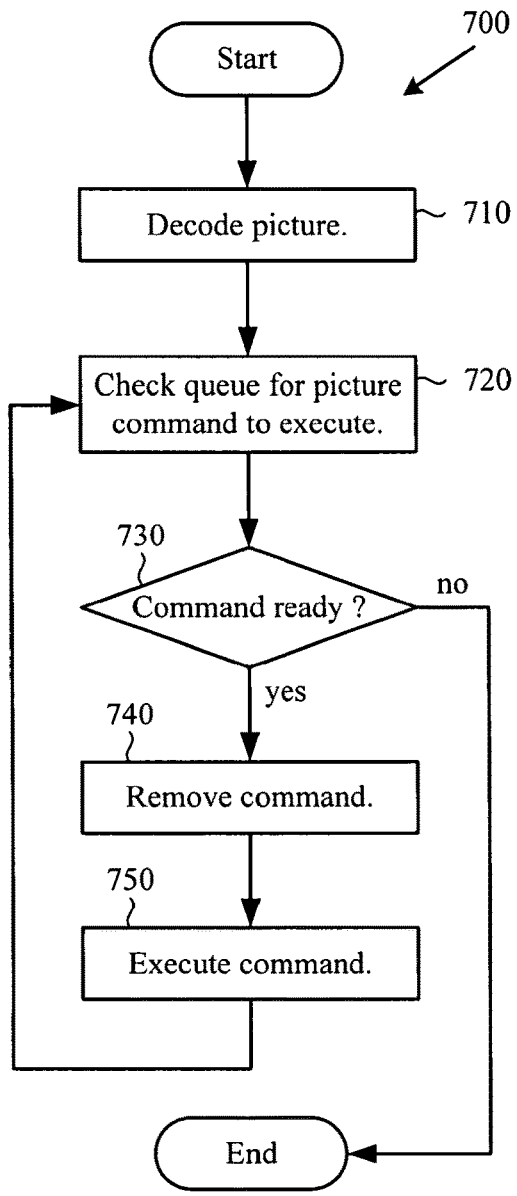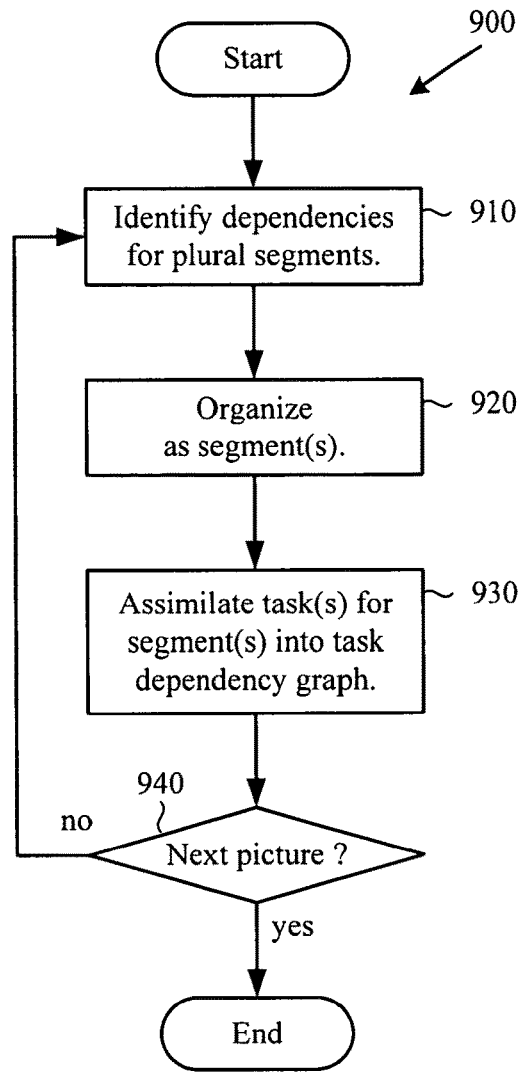

Figure 8
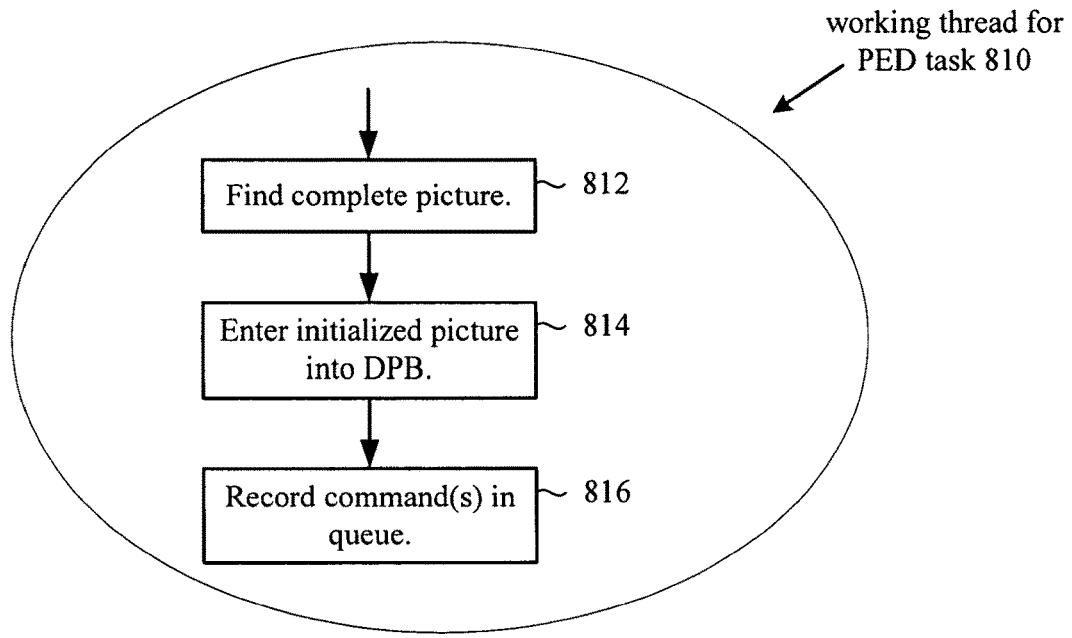
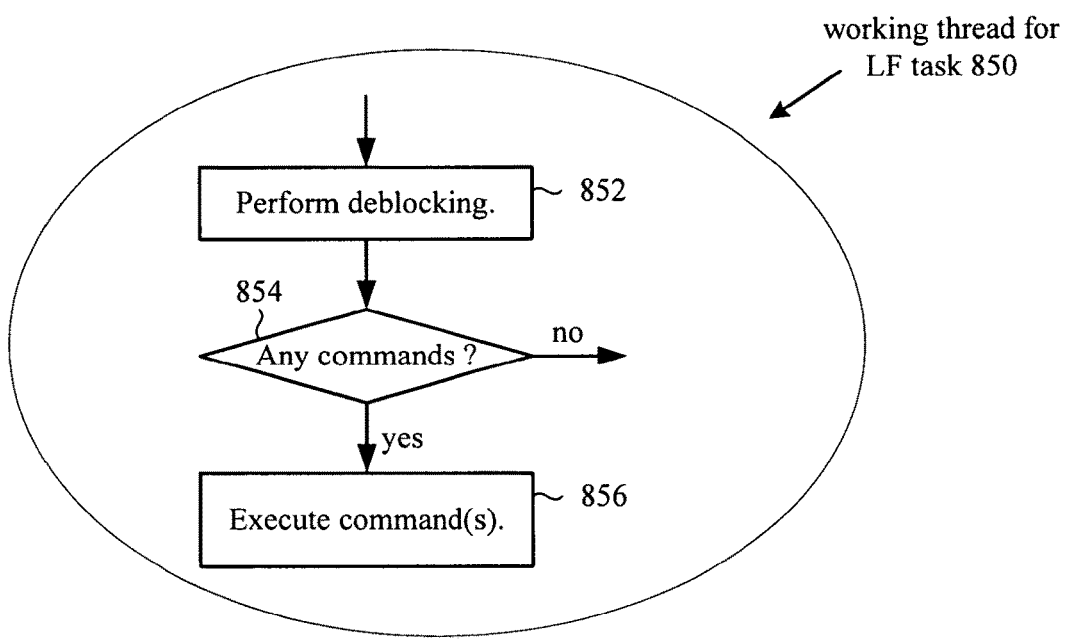

Figure 15
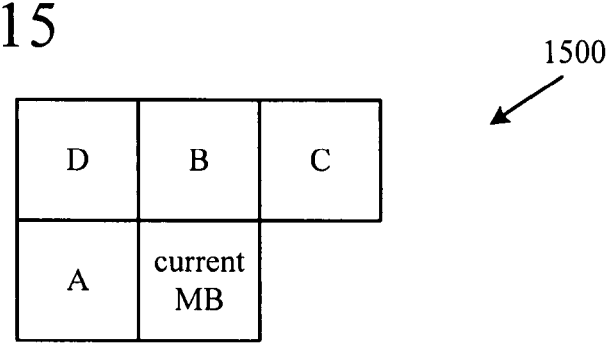
Figure 16
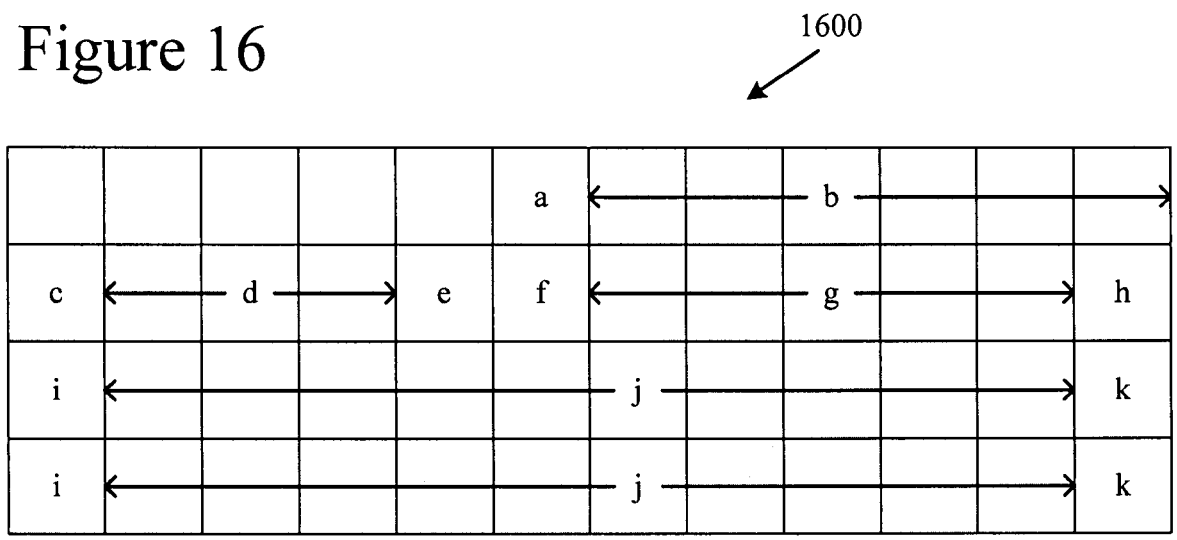
Figure 17
```
// 41 different total combinations of partitions and partition locations
BlockAvailable   rgBlockAvailable[41];
typedef struct
{
    unsigned char uiAvail[16]; // array indexed by macroblock availability
                    // provides the availability for a partition
}BlockAvailable;
```

Figure 18

```
typedef struct NeibMBOffset_tag
{
    unsigned char left;   //Macroblock address offset for left macroblock neighbor
    unsigned char up;
    unsigned char upleft;
    unsigned char upright;
}NeibMBOffset;

typedef struct stNeibMBOffsetTable_tag
{
    NeibMBOffset rgi4x4BlockMBOffset[4][4];  //Offset information for 4x4 luma blocks.
    rgi8x8BlockMBOffset[4];  //Offset information for 8x8 luma blocks.
}stNeibMBOffsetTable;
```

Figure 19

| Most significant bit | | | | | Least significant bit |
|---|---|---|---|---|---|
| Above-left MB pair field/frame indicator bit | Above-right MB pair field/frame indicator bit | Above MB pair field/frame indicator bit | Left MB pair field/frame indicator bit | Current MB pair field/frame indicator bit | Current MB top/bottom indicator bit |

```
typedef struct stNeibMBOffsetTableMBAFF_tag
{
    // 21 = 16 + 4 + 1
    // First 16 for 4x4
    // Next   4 for 8x8
    // Last   1 for 16x16
    NeibMBOffsetMBAFF rgrgnmbBlockMBOffsetMBAFF[64][21];
}stNeibMBOffsetTableMBAFF;

typedef struct
{
    char b4x4OffsetLeftMb;       // Offset to left luma 4x4 block
    char b4x4OffsetUpMb;         // Offset to above luma 4x4 block
    char b4x4OffsetUpRightMb;    // Offset to above-right luma 4x4 block
    char b4x4OffsetUpLeftMb;     // Offset to above-left luma 4x4 block unsigned char bMbOffsetLeft;    // Offset to MB including left luma 4x4 block
    unsigned char bMbOffsetUp;      // Offset to MB including above luma 4x4 block
    unsigned char bMbOffsetUpRight; // Offset to MB including above-right luma 4x4 block
    unsigned char bMbOffsetUpLeft;  // Offset to MB including above-left luma 4x4 block
}NeibMBOffsetMBAFF;
```

```
biari_decode_symbol(Value, Range, MPS, state, rLPS)
        bit := MPS
        Range := Range - rLPS
        if (Value < Range)
                state := AC_next_state_MPS[state]
        else
                Value := Value - Range
                Range := rLPS
                bit := !bit
                if (!state)
                        MPS := MPS & 1
                state := AC_next_state_LPS[state]
        end
        // re-normalize Range (1 <= Range <= 511)
        // Range is "re-normalized" when it's bigger than 256
        while (Range < 256)
                Range := 2*Range
                Dbits_to_go := Dbits_to_go - 1
                if (Dbits_to_go < 0)
                        get_a_byte;
                Value := updated Value
        end return bit
```

Figure 32

| code path | curr pic format | collocated pic format | direct_spatial_mv_pred_flag | function name |
|---|---|---|---|---|
| PROG | PROG | PROG | 1 | colocate_frame_ref_frame_spatial |
| PICAFF | PROG | PROG | 0 | colocate_frame_ref_frame_temporal |
| PICAFF | PROG | PROG | 1 | colocate_frame_ref_frame_spatial |
| PICAFF | PROG | PROG | 0 | colocate_frame_ref_frame_temporal |
| PICAFF | PROG | FIELD | 1 | colocate_frame_ref_field_spatial |
| PICAFF | PROG | FIELD | 0 | colocate_frame_ref_field_temporal |
| PICAFF | FIELD | PROG | 1 | colocate_field_ref_frame_spatial |
| PICAFF | FIELD | PROG | 0 | colocate_field_ref_frame_temporal |
| PICAFF | FIELD | FIELD | 1 | colocate_mb_field_ref_field_spatial |
| PICAFF | FIELD | FIELD | 0 | colocate_mb_field_ref_field_temporal |

| curr pic format | curr MB pair format | pos | collocated pic format | direct_spatial_mv_pred flag | function name |
|---|---|---|---|---|---|
| MBAFF | frame | X | FIELD | 1 | Compute_ColInfo_FrameMBPair_Ref_FieldPic_Spatial_opt |
| | | | | 0 | Compute_ColInfo_FrameMBPair_Ref_FieldPic_NonSpatial_opt |
| | field | top | FIELD | 1 | Compute_ColInfo_TopMB_FieldMBPair_Ref_FieldPic_Spatial_opt |
| | | | | 0 | Compute_ColInfo_TopMB_FieldMBPair_Ref_FieldPic_NonSpatial_opt |
| | | bottom | FIELD | 1 | Compute_ColInfo_BotMB_FieldMBPair_Ref_FieldPic_Spatial_opt |
| | | | | 0 | Compute_ColInfo_BotMB_FieldMBPair_Ref_FieldPic_NonSpatial_opt |
| | frame | X | MBAFF | 1 | Compute_ColInfo_FrameMBPair_Ref_MBAFFPic_Spatial_opt |
| | | | | 0 | Compute_ColInfo_FrameMBPair_Ref_MBAFFPic_NonSpatial_opt |
| | field | top | MBAFF | 1 | Compute_ColInfo_TopMB_FieldMBPair_Ref_MBAFFPic_Spatial_opt |
| | | | | 0 | Compute_ColInfo_TopMB_FieldMBPair_Ref_MBAFFPic_NonSpatial_opt |
| | | bottom | MBAFF | 1 | Compute_ColInfo_BotMB_FieldMBPair_Ref_MBAFFPic_Spatial_opt |
| | | | | 0 | Compute_ColInfo_BotMB_FieldMBPair_Ref_MBAFFPic_NonSpatial_opt |
| FIELD | | X | FIELD | 1 | colocate_mb_field_ref_field_spatial |
| | | | | 0 | colocate_mb_field_ref_field_temporal |
| | | X | MBAFF | 1 | colocate_mb_field_ref_mbaff_spatial |
| | | | | 0 | colocate_mb_field_ref_mbaff_temporal |

3300

Figure 36
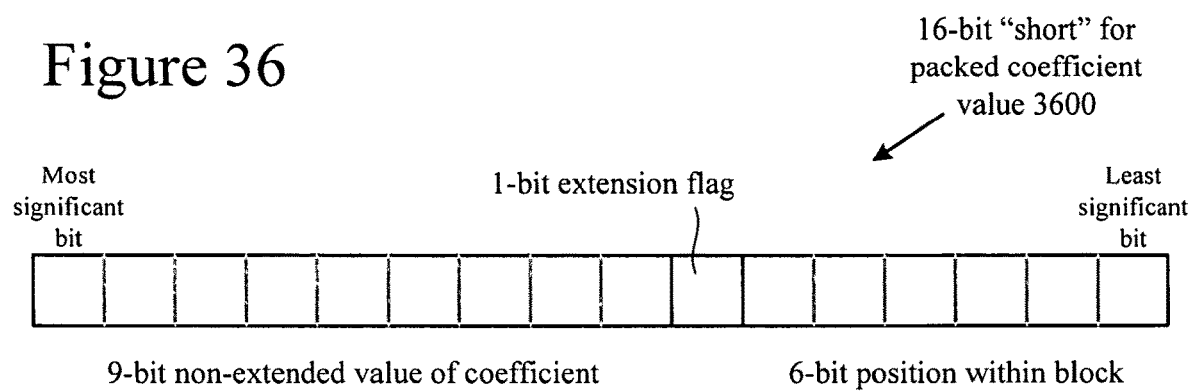
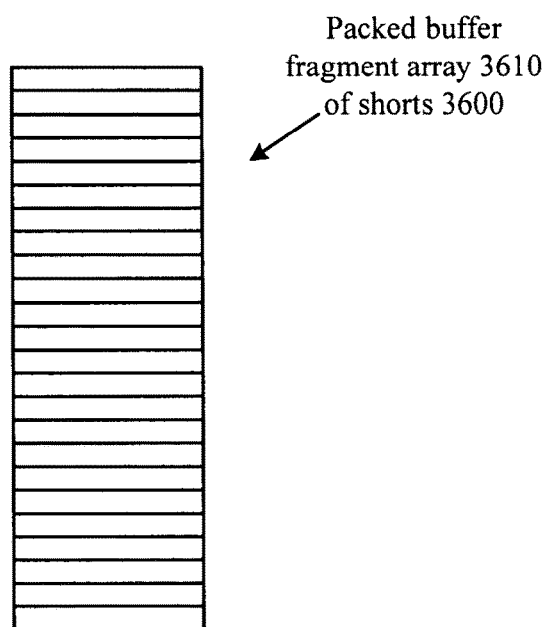

| 0 | 4 | 8 | 12 |
|---|---|---|----|
| 1 | 5 | 9 | 13 |
| 2 | 6 | 10 | 14 |
| 3 | 7 | 11 | 15 | input 4x4 block order 4410

| 0 | 1 | 2 | 3 |
|---|---|---|---|
| 4 | 5 | 6 | 7 |
| 8 | 9 | 10 | 11 |
| 12 | 13 | 14 | 15 | output 4x4 block order 4420

M0 = T * A
M0(2,:) = M0(2,:) + C
M0(3,:) = M0(3,:) + C
M1 = Floor(M0/2)
M2 = T * M1'
M2(2,:) = M2(2,:) + C
M2(3,:) = M2(3,:) + C
B = DQ(Floor(M2/2))

where: A is the 4x4 input transform coefficient matrix
B is the 4x4 output residual value matrix
M0, M1, M2 are 4x4 intermediate matrices T is the 4x4 transform matrix $\begin{bmatrix} 2 & 2 & 2 & 1 \\ 2 & 1 & -2 & -2 \\ 2 & -1 & -2 & 2 \\ 2 & -2 & 2 & -1 \end{bmatrix}$ C is a 1x4 constant matrix $[1 \ 1 \ 1 \ 1]$
DQ(v) = Floor((v + 64.0f/2) * (1/64.0f))
Floor(x) returns the largest integer <= x 8x8 block 5700

5800

VIDEO DECODING IMPLEMENTATIONS FOR A GRAPHICS PROCESSING UNIT

CROSS REFERENCE TO RELATED APPLICATIONS

This application is a continuation of U.S. patent application Ser. No. 11/824,508, filed Jun. 30, 2007, which is hereby incorporated by reference.

BACKGROUND

Companies and consumers increasingly depend on computers to process, distribute, and play back high quality video content. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector ("MV")). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

I. Video Codec Standards.

Over the last two decades, various video coding and decoding standards have been adopted, including the H.261, H.262 (MPEG-2) and H.263 series of standards and the MPEG-1 and MPEG-4 series of standards. More recently, the H.264 standard (sometimes referred to as AVC or JVT) and VC-1 standard have been adopted. For additional details, see representative versions of the respective standards.

Such a standard typically defines options for the syntax of an encoded video bit stream according to the standard, detailing the parameters that must be in the bit stream for a video sequence, picture, block, etc. when particular features are used in encoding and decoding. The standards also define how a decoder conforming to the standard should interpret the bit stream parameters—the bit stream semantics. In many cases, the standards provide details of the decoding operations the decoder should perform to achieve correct results. Often, however, the low-level implementation details of the operations are not specified, or the decoder is able to vary certain implementation details to improve performance, so long as the correct decoding results are still achieved.

During development of a standard, engineers may concurrently generate reference software, sometimes called verification model software or JM software, to demonstrate rate-distortion performance advantages of the various features of the standard. Typical reference software provides a "proof of concept" implementation that is not algorithmically optimized or optimized for a particular hardware platform. Moreover, typical reference software does not address multithreading implementation decisions, instead assuming a single threaded implementation for the sake of simplicity.

II. Acceleration of Video Decoding and Encoding.

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

Given the critical importance of video compression and decompression to digital video, it is not surprising that compression and decompression are richly developed fields. Whatever the benefits of previous techniques and tools, however, they do not have the advantages of the following techniques and tools.

SUMMARY

In summary, techniques and tools are described for various aspects of video decoder implementations. These techniques and tools help, for example, to increase decoding speed to facilitate real time decoding, or to reduce computational complexity in scenarios such as those with processing power constraints and/or delay constraints.

According to one aspect of the techniques and tools described herein, a decoder receives a coded video bit stream including multiple pictures in serial coded order. The decoder decodes the multiple pictures with one or more central processing units ("CPUs") and a graphics processing unit ("GPU"). The CPU(s) perform multiple decoding operations (e.g., picture extent discovery, entropy decoding). The GPU performs multiple decoding operations (e.g., intra prediction, motion compensation, loop filtering) asynchronously from the multiple decoding operations performed by the CPU(s). For a given picture, the GPU can perform at least some of its decoding operations in parallel for multiple blocks with the given picture. The CPU(s) can generate tasks and insert them in a command buffer; one at a time, the GPU can extract primitives corresponding to the tasks and execute the primitives in serial order. The CPU(s) can also generate markers and insert them into a command buffer, where a marker indicates completion of decoding of a corresponding picture; the GPU can trigger the marker upon reaching the marker in the command buffer, resulting in copying of the corresponding picture into an output buffer and marking it as available for reference in a decoded picture buffer.

According to another aspect, a decoder receives a coded video bit stream that includes encoded video for multiple pictures in serial coded order. The decoder scans ahead in the bit stream to determine multiple resource usage patterns (e.g., memory partitions, image array slot assignments) for the multiple pictures, tracking the multiple resource usage patterns. The tracked patterns include at least some inconsistent resource usage patterns in flight during at least part of decoding. The decoder can also track commands for decoding operations in a command queue, which represents the multiple resource usage patterns. The decoder performs decoding operations on the multiple pictures in serial coded order with a GPU.

According to another aspect, a decoder organizes multiple blocks as multiple waves. Each of the multiple waves includes one or more of the blocks. For example, the decoder groups as a first wave a first set of blocks having no dependencies on other blocks, groups as a second wave a second set of blocks having no dependencies other than dependencies on the first set, groups as a third wave a third set of blocks having no dependencies other than dependencies on the first and second sets, and so on. The waves can de determined dynamically or statically. With a GPU, the decoder performs decoding operations (e.g., intra prediction, loop filtering) on the multiple blocks on a wave-by-wave basis. For at least one of the multiple waves, the decoder (with GPU) processes blocks within the wave in parallel.

In other embodiments, a decoder implements one or more of the innovations stated in the table at the end of the application.

The various techniques and tools can be used in combination or independently. Additional features and advantages will be made more apparent from the following detailed description of different embodiments, which proceeds with reference to the accompanying figures.

BRIEF DESCRIPTION OF THE DRAWINGS

FIG. 7 is a flowchart illustrating a generalized technique for removing picture commands from a picture command queue in multithreaded decoding.

FIG. 8 is a diagram illustrating example picture command queue management processing in different decoding tasks.

FIG. 9 is a flowchart illustrating a generalized technique for creating a task dependency graph for segments of macroblocks.

FIG. 15 is a chart showing MB neighbors of a current MB.

FIG. 16 is a diagram illustrating a state machine used in MB neighbor availability determinations.

FIGS. 17, 18 and 20 are pseudocode listings for example tables used in table-based neighbor availability determinations.

FIG. 19 is a diagram illustrating an example neighbor context bit vector used in table-based neighbor availability determinations.

FIG. 21 is a pseudocode listing for reference code for a core context-adaptive binary arithmetic decoding function.

FIGS. 32 and 33 are tables showing functions for computing collocated macroblock information in different situations.

FIGS. 36 and 37 are diagrams illustrating example data structures for packing entropy decoded transform coefficients.

FIG. 44 is a diagram illustrating example input and output block orders for a macroblock.

FIG. 45 is a pseudocode listing for an example inverse transform implementation.

DETAILED DESCRIPTION

Figure 1:
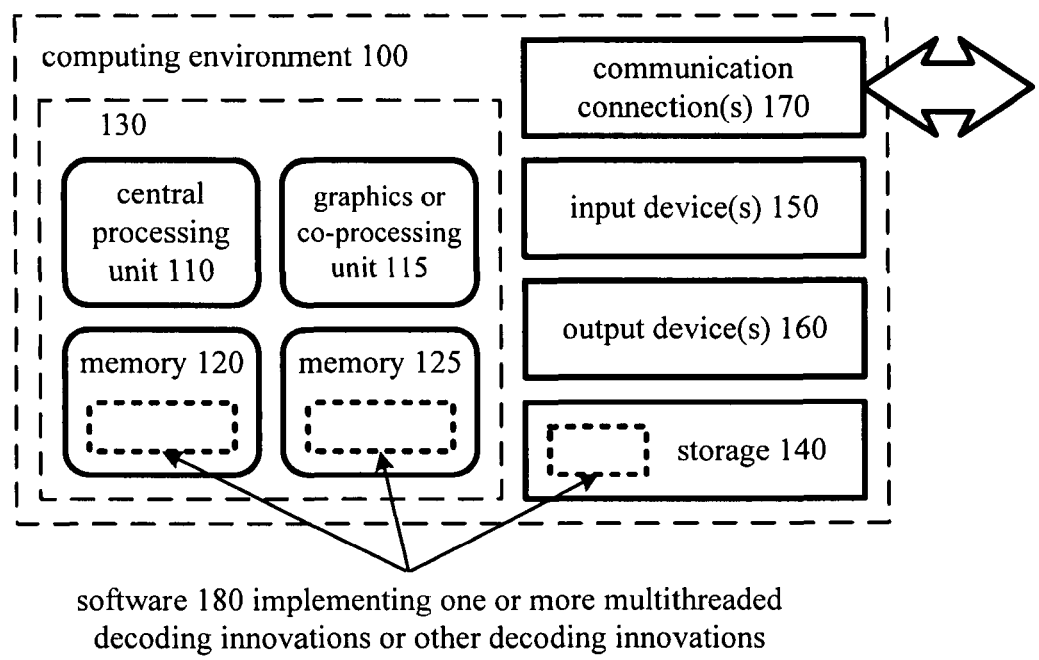
FIG. 1 is a block diagram illustrating a generalized example of a suitable computing environment in which several of the described embodiments may be implemented.

The present application relates to innovations in implementations of video decoders. Many of these innovations reduce decoding complexity and/or increase decoding speed to improve decoding performance. These innovations include:

1. A decoder framework with layered data structures for multithreading implementations.
2. Picture extent discovery for multithreading implementations.
3. A picture command queue for multithreading implementations.
4. An improved task scheduler for multithreading implementations.
5. A decoder that can run in different threading modes, including single threaded mode, multithreaded with CPU mode, and 1 or 2 CPU threads+GPU mode.
6. An error handling and recovery framework providing strong error resilience.
7. Efficient determination of neighbor availability for operations such as context modeling and intra prediction, using pre-designed tables and/or state machines, for various types of pictures.
8. CABAC decoding innovations that speed up CABAC decoding and/or more efficiently use memory.
9. Improved computation of collocated information for direct mode macroblocks in B slices.
10. Reduction of memory consumption in multithreading implementations.
11. Efficient implementations of trick play modes.
12. An efficient picture dropping approach for quality adjustment.
13. An interface for communication between CPU(s) and GPU.
14. Inverse transforms for GPU implementations.
15. Inverse quantization for GPU implementations.
16. Fractional interpolation for GPU implementations.
17. Intra prediction using waves for GPU implementations.
18. Loop filtering using waves for GPU implementations.
19. Efficient memory usage for GPU implementations.
20. Efficient film grain noise generation for GPU implementations.
21. Adaptive loop filtering with quality feedback for GPU implementations.
22. Asynchronous decoding by GPU and CPU(s).
23. A GPU command buffer filled by CPU(s) and emptied by GPU.
24. A synchronization interface between GPU and CPU(s).

For example, in order to decode video in real time, the decoding processes of a standard such as H.264 or VC-1 are analyzed to identify opportunities for algorithmic improvements. Specific examples of identified algorithmic improvements are described below. The decoding processes are also analyzed to identify opportunities for hardware-specific performance improvements. Additional improvements for multithreading implementations further speed up the decoding processing, and still other improvements help reduce memory consumption during decoding.

Collectively, these improvements are at times loosely referred to as "optimizations." As used conventionally and as used herein, the term "optimization" means an improvement that is deemed to provide a good balance of performance in a particular scenario or platform, considering computational complexity, memory use, processing speed, and/or other factors. Use of the term "optimization" does not foreclose the possibility of further improvements, nor does it foreclose the possibility of adaptations for other scenarios or platforms.

Other innovations provide new decoder-side features to improve the playback experience for end users. For example, the present application describes efficient implementations for trick play modes (e.g., fast forward, fast rewind) and recovery modes using picture dropping.

With these innovations, efficient decoder implementations have been provided for diverse platforms. The implementations include media players for gaming consoles with complex, special-purpose hardware and graphics capabilities, personal computers, and set-top boxes/digital video receivers.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, although some implementations are described with reference to specific macroblock formats, other formats also can be used. As another example, while several of the innovations described below are presented in terms of H.264/AVC decoding examples, the innovations are also applicable to other types of decoders (e.g., MPEG-2, VC-1) that provide or support the same or similar decoding features.

The various techniques and tools described herein can be used in combination or independently. For example, although flowcharts in the figures typically illustrate techniques in isolation from other aspects of decoding, the illustrated techniques in the figures can typically be used in combination with other techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

I. Computing Environment.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one CPU (110) and associated memory (120) as well as at least one GPU or other co-processing unit (115) and associated memory (125) used for video acceleration. In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. A host encoder or decoder process offloads certain computationally intensive operations (e.g., fractional sample interpolation for motion compensation, in-loop deblock filtering) to the GPU (115). The memory (120, 125) may be volatile memory (e.g., registers, cache, RAM), non-volatile memory (e.g., ROM, EEPROM, flash memory, etc.), or some combination of the two. The memory (120, 125) stores software (180) for a decoder implementing one or more of the decoder innovations described herein.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

II. Example Organization of Video Frames.

For progressive video, lines of a video frame contain samples starting from one time instant and continuing through successive lines to the bottom of the frame. An interlaced video frame consists of two scans—one for the even lines of the frame (the top field) and the other for the odd lines of the frame (the bottom field).

A progressive video frame can be divided into 16×16 macroblocks. For 4:2:0 format, a 16×16 macroblock includes four 8×8 blocks (Y0 through Y3) of luma (or brightness) samples and two 8×8 blocks (Cb, Cr) of chroma (or color component) samples, which are collocated with the four luma blocks but half resolution horizontally and vertically.

An interlaced video frame includes alternating lines of the top field and bottom field. The two fields may represent two different time periods or they may be from the same time period. When the two fields of a frame represent different time periods, this can create jagged tooth-like features in regions of the frame where motion is present.

Therefore, interlaced video frames can be rearranged according to a field structure, with the odd lines grouped together in one field, and the even lines grouped together in another field. This arrangement, known as field coding, is useful in high-motion pictures. For an interlaced video frame organized for encoding/decoding as separate fields, each of the two fields of the interlaced video frame is partitioned into macroblocks. The top field is partitioned into macroblocks, and the bottom field is partitioned into macroblocks. In the luma plane, a 16×16 macroblock of the top field includes 16 lines from the top field, and a 16×16 macroblock of the bottom field includes 16 lines from the bottom field, and each line is 16 samples long.

On the other hand, in stationary regions, image detail in the interlaced video frame may be more efficiently preserved without rearrangement into separate fields. Accordingly, frame coding (at times referred to coding with MBAFF pictures) is often used in stationary or low-motion interlaced video frames. An interlaced video frame organized for encoding/decoding as a frame is also partitioned into macroblocks. In the luma plane, each macroblock includes 8 lines from the top field alternating with 8 lines from the bottom field for 16 lines total, and each line is 16 samples long. Within a given macroblock, the top-field information and bottom-field information may be coded jointly or separately at any of various phases—the macroblock itself may be field-coded or frame-coded.

III. Generalized Video Decoder.

Figure 2:
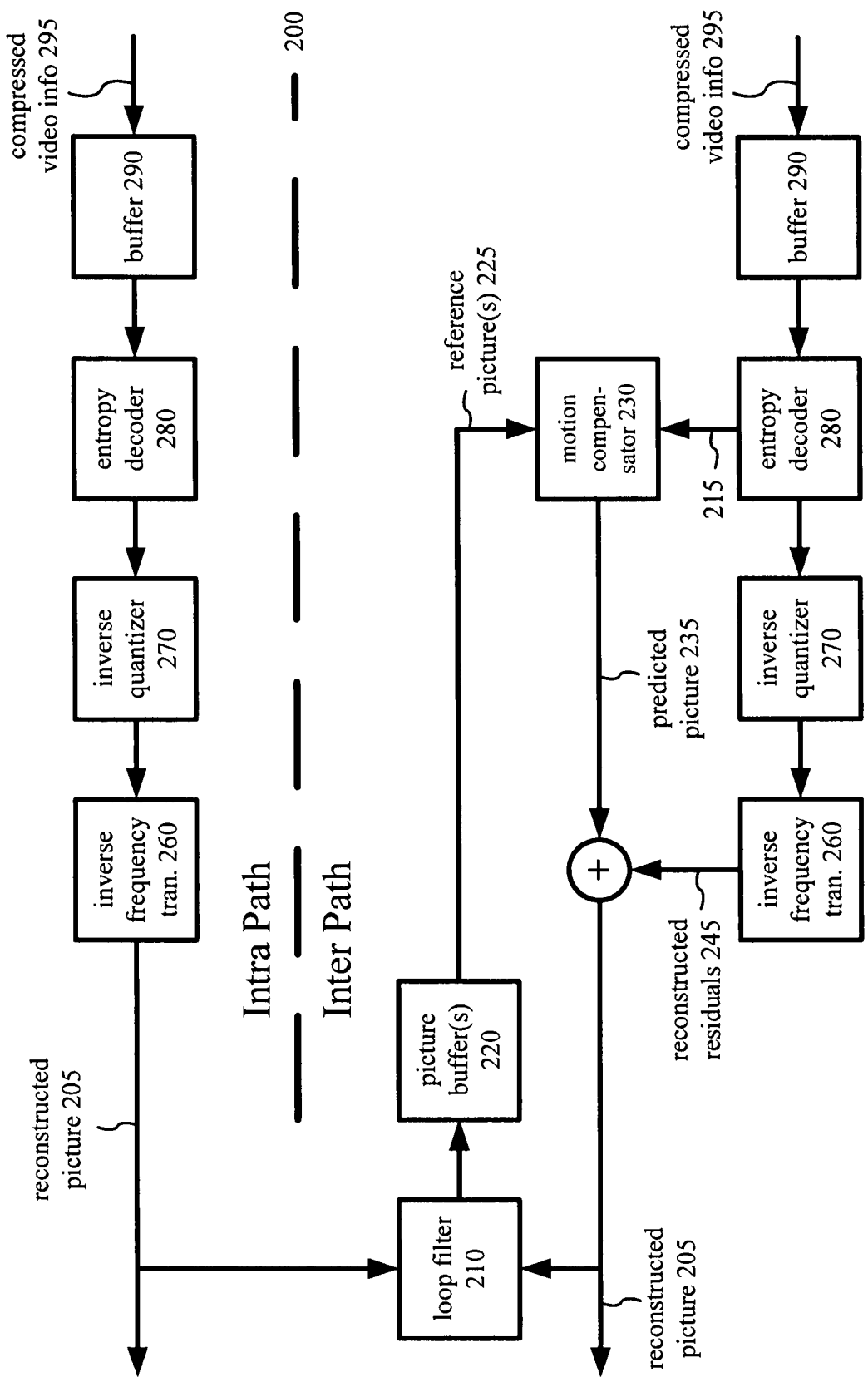
FIG. 2 is a block diagram of a generalized video decoder in conjunction with which several of the described embodiments may be implemented.

FIG. 2 is a block diagram of a generalized video decoder (200) in conjunction with which several described embodiments may be implemented. A corresponding video encoder (not shown) may also implement one or more of the described embodiments.

The relationships shown between modules within the decoder (200) indicate general flows of information in the decoder; other relationships are not shown for the sake of simplicity. In particular, while a decoder host performs some operations of modules of the decoder (200), a video accelerator performs other operations (such as inverse frequency transforms, fractional sample interpolation, motion compensation, in-loop deblocking filtering, color conversion, post-processing filtering and/or picture re-sizing). For example, the decoder (200) passes instructions and information to the video accelerator as described in "Microsoft DirectX VA: Video Acceleration API/DDI," version 1.01, a later version of DXVA or another acceleration interface. In general, once the video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload out-of-loop, post-decoding operations, while another profile offloads in-loop filtering, fractional sample interpolation and motion compensation as well as the post-decoding operations. Still another profile can further offload frequency transform operations. In still other cases, different profiles each include operations not in any other profile.

Returning to FIG. 2, the decoder (200) processes video pictures, which may be video frames, video fields or combinations of frames and fields. The bit stream syntax and semantics at the picture and macroblock levels may depend on whether frames or fields are used. The decoder (200) is block-based and uses a 4:2:0 macroblock format for frames. For fields, the same or a different macroblock organization and format may be used. 8×8 blocks may be further subdivided at different stages. Alternatively, the decoder (200) uses a different macroblock or block format, or performs operations on sets of samples of different size or configuration.

The decoder (200) receives information (295) for a compressed sequence of video pictures and produces output including a reconstructed picture (205) (e.g., progressive video frame, interlaced video frame, or field of an interlaced video frame). The decoder system (200) decompresses predicted pictures and key pictures. For the sake of presentation, FIG. 2 shows a path for key pictures through the decoder system (200) and a path for predicted pictures. Many of the components of the decoder system (200) are used for decompressing both key pictures and predicted pictures. The exact operations performed by those components can vary depending on the type of information being decompressed.

A demultiplexer (290) receives the information (295) for the compressed video sequence and makes the received information available to the entropy decoder (280). The entropy decoder (280) entropy decodes entropy-coded quantized data as well as entropy-coded side information, typically applying the inverse of entropy encoding performed in the encoder. A motion compensator (230) applies motion information (215) to one or more reference pictures (225) to form motion-compensated predictions (235) of sub-blocks, blocks and/or macroblocks of the picture (205) being reconstructed. One or more picture stores store previously reconstructed pictures for use as reference pictures.

The decoder (200) also reconstructs prediction residuals. An inverse quantizer (270) inverse quantizes entropy-decoded data. An inverse frequency transformer (260) converts the quantized, frequency domain data into spatial domain video information. For example, the inverse frequency transformer (260) applies an inverse block transform to sub-blocks and/or blocks of the frequency transform coefficients, producing sample data or prediction residual data for key pictures or predicted pictures, respectively. The inverse frequency transformer (260) may apply an 8×8, 8×4, 4×8, 4×4, or other size inverse frequency transform.

For a predicted picture, the decoder (200) combines reconstructed prediction residuals (245) with motion compensated predictions (235) to form the reconstructed picture (205). A motion compensation loop in the video decoder (200) includes an adaptive deblocking filter (223). The decoder (200) applies in-loop filtering (223) to the reconstructed picture to adaptively smooth discontinuities across block/sub-block boundary rows and/or columns in the picture. The decoder stores the reconstructed picture in a picture buffer (220) for use as a possible reference picture.

Depending on implementation and the type of compression desired, modules of the decoder can be added, omitted, split into multiple modules, combined with other modules, and/or replaced with like modules. In alternative embodiments, encoders or decoders with different modules and/or other configurations of modules perform one or more of the described techniques. Specific embodiments of video decoders typically use a variation or supplemented version of the generalized decoder (200).

For the sake of presentation, the following table provides example explanations for acronyms and selected shorthand terms used herein.

| Term | Explanation |
| --- | --- |
| block | arrangement (in general, having any size) of sample values for pixel data or residual data, for example, including the possible blocks in H.264/AVC - 4 × 4, 4 × 8, 8 × 4, 8 × 8, 8 × 16, 16 × 8, and 16 × 16 |
| CABAC | context adaptive binary arithmetic coding |
| CAVLC | context adaptive variable length coding |
| DPB | decoded picture buffer |
| ED | entropy decoding |
| FIFO | first in first out |
| INTRA | spatial intra-prediction |
| LF | loop filtering |
| MB | megabyte OR macroblock, depending on context; a macroblock is, e.g., 16 × 16 arrangement of sample values for luma with associated arrangements of sample values for chroma |
| MBAFF | macroblock adaptive frame field |
| MC | motion compensation |
| MMCO | memory management control operation |
| NALU | network abstraction layer unit |
| FED | picture extent discovery |
| PICAFF | picture adaptive frame field |
| PPS | picture parameter set |
| PROG | progressive |
| SEI | supplemental enhancement information |
| SIMD | single instruction multiple data |
| SPS | sequence parameter set |
| stage (of decoding) | a set of different passes/steps to decode a picture, such as PED, ED, MC and so on |
| sub-block | a partition of a sub-MB, e.g., 8 × 4, 4 × 8 or 4 × 4 block or other size block |
| sub-MB | a partition of an MB, e.g., 16 × 8, 8 × 16 or 8 × 8 block or other size block; in some contexts, the term sub-MB also indicates sub-blocks |
| task | a stage plus input data |
| wave | a set of portions of a picture (e.g., a diagonal set of macroblocks in the picture) such that each portion within one wave can be processed in parallel, without dependencies on the other portions within the same wave; a picture can then be processed as a sequence of waves where each wave is dependent on the data resulting from processing the preceding waves |

IV. Multithreading Design Innovations for a Video Decoder.

In some embodiments, a decoder uses one or more multithreading innovations when decoding video. Collectively, the multithreading innovations efficiently find opportunities for parallel processing in the bit stream and support fine-grained task scheduling in the decoding.

In contrast, naïve implementations of the reference code for the H.264 standard are single threaded and synchronous. A decoder parses the bit stream for a picture, initializes structures for the picture, decodes the pictures, and updates the decoded picture buffer, then moves on to the next picture.

This is inefficient for many modern architectures and impractical for many H.264 decoding scenarios.

Previous multithreading implementations provide coarse-grained scheduling or only allow for parallel processing for entropy decoding. These implementations do not effectively look ahead in a bit stream to find other opportunities for parallel processing in decoding, nor do they support finer grained scheduling for other types of operations.

This section describes flexible multithreading models that incorporate different multithreading implementations. A PED module finds complete pictures in a bit stream, identifies opportunities for parallel processing, and simulates a "live" DPB as in a single threaded implementation so as to help order picture commands. A picture command queue facilitates pipeline picture decoding, potentially storing picture commands for pictures as those pictures are being decoded. A task scheduler distributes available tasks to different threads according to one of several available scheduling heuristics. An available task can process data for a picture, slice or other segment (collection of macroblocks). The multithreading models can be applied in a CPU+GPU architecture, multiple CPU architecture, or multiple CPU+GPU architecture.

A. Overall Multithreading Framework.

1. Layered Data Structures.

Figure 3:
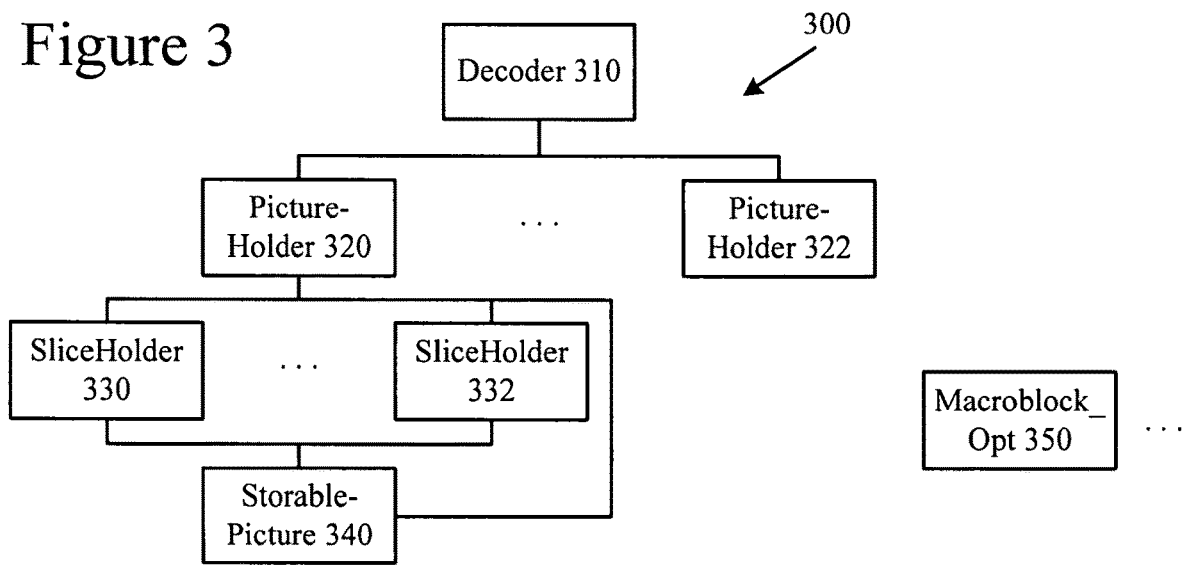
FIG. 3 is a diagram illustrating example layered data structures for multithreaded decoding.

The data structures used in multithreading are an important aspect of the overall design. In some embodiments, a multithreaded decoder uses layered data structures (300) as shown in FIG. 3. As FIG. 3 shows, the parameters of an encoded video bit stream are organized into layered/hierarchical data structures generally according to their lifetime in the decoding process.

The Decoder structure (310) (stMSH264Decoder_tag) holds parameters and data structures for the decoder. These parameters and structures basically have the decoder's lifetime. For example, it holds parameters and structures as follows.

| Structure/Parameter | Explanation |
| --- | --- |
| struct threading | holds the parameters for threading, such as pumped or not (pumpedDecoder), pumped PED running or not (bPEDTaskRunning), and so on. |
| struct ped | holds the necessary parameters for the process of PED, such as the temporary slice header parameters, temporal NALU parameters, parameters for field picture pairing, live DPB and so on. |
| struct pools | holds different memory pools, such as PictureHolder pool, neighbor availability table pool, SliceHolder pool, and so on. |
| struct stTaskDependencyGraph_tag | parameters for dependency graph |
| struct Manage_PIC_FIFO | parameters for picture command FIFO. |
| struct stOutFrm | parameters for circular output buffer. |
| timing stamp parameters | parameters for time stamps for pictures. |

The parameters in the Decoder structure (310) can be accessed by working threads. The parameters are based upon, for example, sequence parameters, and the parameters may change when a new SPS is processed.

A PictureHolder structure (320, 322) (stPictureHolder_tag) holds temporary parameters for decoding a picture and references other structures used in decoding the picture. Once a picture is decoded, some of the temporary picture parameters may be discarded. The decoded sample data for the picture (along with certain parameters used for reference purposes) are stored in a StorablePicture structure (340). For example, the picture parameters are divided into several categories. Pointers that point to live instances in decoder structure include pstStorablePicPool, pstMBOffsetTableVar, pstMBOffsetTableMBAFFVar and pPPS. Cache pointers that point to the real memories inside StorablePicture (340) include imgY, imgUV, pcRefIdx1, pnMv0. Picture parameters for the picture in PictureHolder (320, 322) include PicWidthInMbs, field_pic_flag, bottom_used_for_reference. The buffers/arrays are shared by different slices in the picture—these may be compressed buffer pointers, stream buffer pointers, slice parameter arrays (rgSliceOpt), macroblock arrays (mb_data_opt). A SliceHolder Xarray holds all the Sliceholders (330, 332) in this picture.

A StorablePicture structure (340) holds decoded pixel data, side information, and parameters for a reference picture and DPB management. The lifetime of a StorablePicture structure (340) is different from that of a PictureHolder structure (320, 322). A PictureHolder structure (320, 322) for a picture can be deallocated when the picture is decoded, since the parameters in the PictureHolder structure (320, 322) are used for decoding. The parameters and data in a StorablePicture structure (340) are valid until the corresponding picture is deleted from the decoder. For example, the StorablePicture structure (340) stores decoded picture data imgY, imgUV, ref_idx, pnMv0, which are used for the purpose of reference. It also stores DPB management parameters frame_num, long_term_pic_num, non_existing. The values of these DPB parameters can be changed during DPB management. A private copy is stored in a PictureHolder structure (320, 322) for some DPB management parameters if the parameters are needed for the decoding of the picture itself. For example, frame_used_for_reference, top_used_for_reference, . . . are the private copies of used_for_reference. The StorablePicture structure (340) also stores time stamp and display parameters (e.g., uiAspectRatio, bPicStructPresentFlag, timeStampFlag, bIsDiscontinuity) and parameters used for picture skipping (e.g., bSkipDecodingPicture, bIPicture, bBPicture).

A SliceHolder structure (330, 332) (stSliceHolder_tag) holds the temporary parameters, buffers and arrays for the decoding of one slice. Once the slice is decoded, the parameters in this structure can be de-allocated. For example, a SliceHolder structure (330, 332) stores slice parameters (e.g., start_mb_nr, iSliceType, current_slice_nr), buffers (e.g., pintraMBPosLevelBase, pcITransBuffers), and arrays (e.g., mvscale, listX, listXsize).

A macroblock structure (350) (macroblock_opt) holds the temporary parameters to decode one macroblock. A PictureHolder structure (320, 322) holds macroblock structures for the macroblocks inside a picture. In some implementations, the macroblock structure is highly compressed in that empty space in certain bytes is avoided by assigning different meanings to different bits within the bytes.

Alternatively, the decoder uses different data structures for multithreading. For example, the decoder uses data structures with other and/or additional parameters or data.

2. Code Paths.

In some embodiments, a multithreaded decoder uses different code paths for different picture formats. For example, an H.264 decoder includes different code paths for PROG pictures, PICAFF pictures, and MBAFF pictures. The following table shows different picture formats for different combinations of the parameters frame_mbs_only_flag, mb_adaptive_frame_field_flag and field_pic_flag for an H.264 decoder.

| frame_mbs_only_flag | mb_adaptive_frame_field_flag | field_pic_flag | picture format |
|---|---|---|---|
| 1 | x | x | progressive (A) |
| 0 | 0 | 0 | progressive (B) |
| 0 | 0 | 1 | field picture(C) |
| 0 | 1 | 0 | mbaff frame(D) |
| 0 | 1 | 1 | field picture(E) |

The PROG path processes pictures of format A, the PICAFF path processes pictures of format B or C, and the MBAFF path processes pictures of format D or E. The H.264 decoder also supports two different kinds of entropy encoding—CABAC and CAVLC. Since different picture formats often use different optimization techniques, the decoding process for different picture formats is separated into different code paths, i.e. PROG code path, PICAFF code path, and MBAFF code path. In each code path, entropy decoding can be CABAC or CAVLC.

Alternatively, the decoder uses more or fewer code paths.

3. Task Separation.

Figure 4:
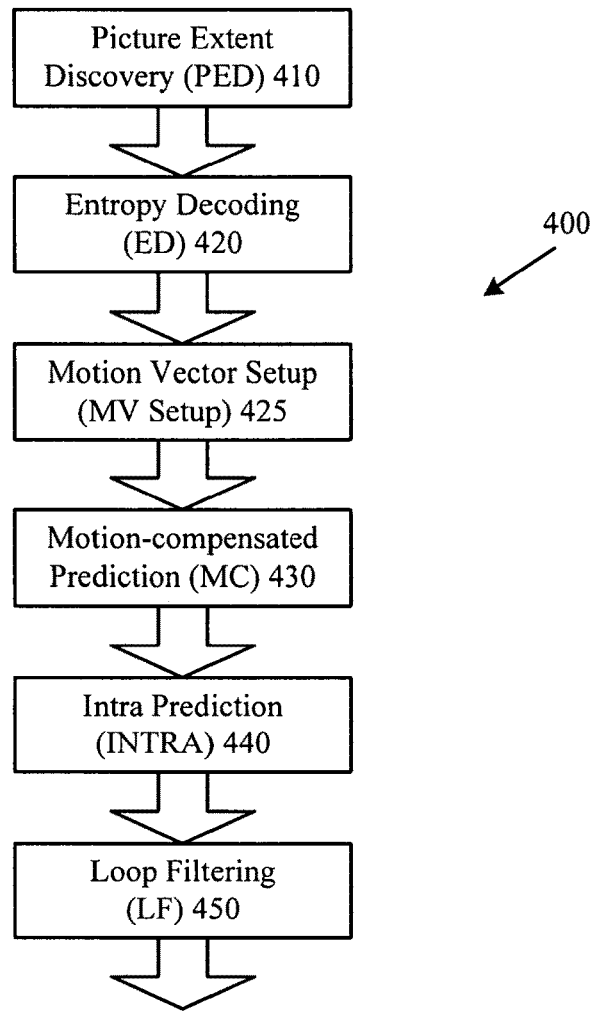
FIG. 4 is a diagram illustrating example stages of multithreaded decoding.

In some embodiments, a multithreaded decoder separates decoding processes into tasks as follows. FIG. 4 shows stages (400) of decoding for one picture in some implementations. The stages (400) include a picture extent discovery ("PED") stage (410) for finding and initializing complete pictures; an entropy decoder ("ED") stage (420) for entropy decoding transform coefficients, motion vectors and other side information with CABAC decoding or CAVLC decoding; a motion vector setup ("MV setup") stage (425) for reconstructing motion vectors in PB or B pictures; a motion-compensated prediction ("MC") stage (430) for reconstructing inter-coded content using motion compensation; an intra-prediction ("INTRA") stage (440) for reconstructing intra-coded content using spatial intra prediction, and a loop filtering ("LF") stage (450) for performing deblock filtering and other processing on decoded pictures. Not all pictures are decoded with all stages. For example, the MC stage is not used for I pictures, and the INTRA stage is not used when decoding some P pictures.

Alternatively, the decoder partitions decoding processes into other and/or different stages, for example, by combining smaller tasks into larger ones. For example, for some architectures, the decoder puts decoding processes for MC, INTRA and LF into a single task. Or, a post-processing stage ("POST") is used for processing such as the addition of film grain noise to pictures before display.

4. Modules for Multithreading.

In some embodiments, a multithreaded decoder uses modules that facilitate multithreading by finding opportunities for fine-grained parallel processing. For example, for some implementations of H.264 decoders, aside from the modules conventionally used for decoding, these modules include a picture extent discovery module, a picture command queue management module, and a task scheduler.

The PED module finds a complete picture from the bit stream and initializes the parameters and data structures that will be used for decoding the picture. The PED module populates some of the initialized parameters and structures with parameters parsed from the bit stream. The PED module also enters the initialized (but as yet un-decoded) picture into a live DPB, which facilitates multithreaded decoding.

The picture command queue module manages picture commands such as output commands and delete commands which are stored in a command queue (e.g., a FIFO queue). DPB management routines (e.g., in the PED module) produce picture commands associated with a dependent picture, which is an initialized but un-decoded picture in the DPB. When the dependent picture is decoded, the associated commands for the picture can be executed. The command queue thus records commands associated with completion of decoding for the dependent picture, and the commands are executed when the dependent picture is decoded, which facilitates simulation of a live DPB from a typical single threaded decoding scenario.

When a working thread is ready (out of waiting/sleep state), the task scheduler finds a ready task, runs the ready task with the working thread, updates the dependency graph on the completion of the task, puts ready tasks into a ready queue, and returns. To find the ready task, the scheduler can use a task dependency graph that facilitates fine-grained multithreading or some other threading model(s) dependent on the decoder settings.

Alternatively, a multithreaded decoder includes other and/or additional modules.

B. Picture Extent Discovery with Simulation of Live DPB.

Video decoding according to recent standards (e.g., H.264, VC-1) can be too computationally intensive for a single hardware thread. In particular, processes like CABAC and loop filtering can be performance bottlenecks.

In some embodiments, a decoder includes a PED module that parses encoded video bit streams to discover segments (e.g., groups of macroblocks, slices, pictures) that can be independently decoded. For example, the PED module finds picture boundaries and logs data in a lightweight look-ahead process, initializing parameters and data structures for pictures encountered in the bit stream, thereby providing a "snapshot" of upcoming segments and their dependencies that a task scheduler and DPB manager can use in multi-threaded decoding. The look-ahead process is intrinsically serial, in that the decoder traverses the serial encoded video bit stream, but it results in the identification and organization of elements that can be decoded in parallel.

Figure 5:
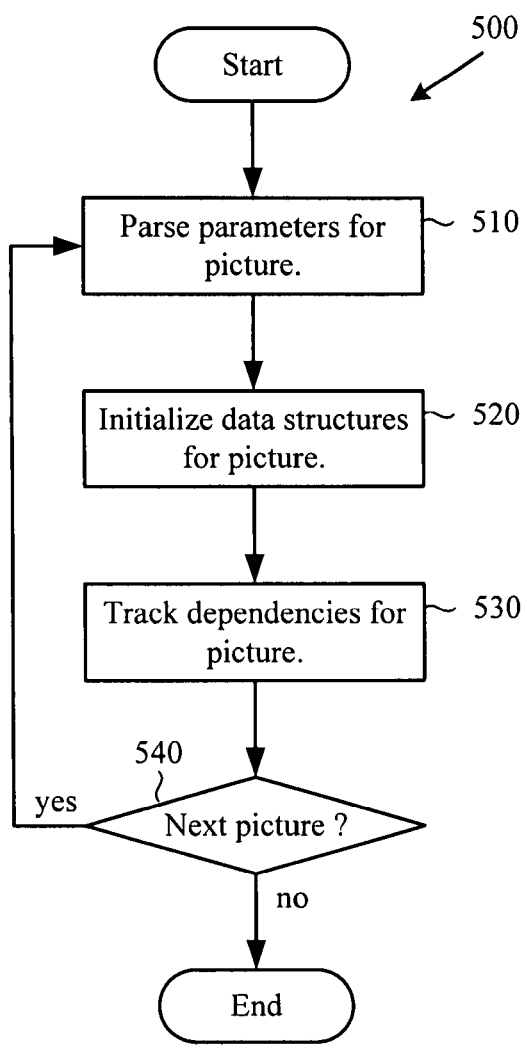
FIG. 5 is a flowchart illustrating a generalized technique for picture extent discovery in multithreaded decoding.

FIG. 5 shows a technique (500) for performing picture extent discovery. A decoder such as the one described above with reference to FIG. 2 or other decoder performs the technique (500).

For a given picture, the decoder (e.g., a PED module in the decoder) parses (510) parameters for the picture from the encoded video bit stream. For example, the decoder parses SPS, PPS, picture layer and slice layer parameters for the picture. Alternatively, the decoder parses other and/or additional parameters from the bit stream.

The decoder initializes (520) structures for holding parameters and data for the picture. For example, the decoder allocates memory and creates layered data structures for the picture as described above, including data structures for the picture, and one or more slices in the picture. The decoder can populate at least some of the data structures with parameters parsed from the bit stream. For other structures, the decoder just creates placeholders for later defined values—at the PED stage, it may suffice to determine which pictures are going to be decoded and determine what the values of certain parameters are, without referencing all pixel data. Alternatively, the decoder initializes other structures for the picture.

The decoder also tracks (530) dependencies for the picture. For example, the decoder identifies and logs stages of decoding for the picture that depend on the completion of other stages of decoding for the picture or that depend on the completion of stages of decoding for other pictures. The decoder tracks the dependencies, for example, in a task dependency graph that includes as nodes decoding tasks for segments of the picture and other pictures, and includes as edges the dependencies between tasks. Dependencies can be logged on a picture-by-picture basis, slice-by-slice basis, segment-by-segment basis, or other basis, for example, decided by the threading model. Alternatively, the decoder tracks dependencies using another type of tracking structure.

The decoder determines (540) whether to continue with the next picture or end. If the decoder continues, it parses (510) parameters for the next picture. For multithreaded decoding, the decoder typically scans ahead in the bit stream for multiple pictures before decoding begins for the scanned pictures. In this way, the decoder can more efficiently use available processing resources and make more informed task scheduling decisions. In some implementations, the decoder can have as many as 16 or 32 pictures "in flight" in various stages of decoding, before output of those pictures.

The timing and aggressiveness of PED depends on implementation. In some cases, a PED module when it executes tries to fill as many structures for pictures as possible, up to a limit set for the PED module. The PED is blocked if the PED outputs are full or there is no input available for scanning.

Standards such as the H.264 standard may specify rules for the behavior and state of the DPB, but typically do not detail how the DPB should be managed. In fact, the standards (and reference implementations) assume changes to the DPB on a picture-by-picture basis, with updates occurring in serial order.

In some embodiments, the decoder (e.g., the PED module) plays a role in DPB management for multithreaded decoding. The decoder emulates a "live" DPB that behaves as in the simple, single threaded situation. The decoder simulates decoding of pictures, which would potentially update the DPB, by entering initialized (but as yet undecoded) pictures into the DPB. The decoder inputs commands in a picture command queue uses to track completion of decoding tasks. A picture command in the queue associates a condition (e.g., decoding of a particular picture) with an action (e.g., output of a picture from the DPB, deletion of a picture from the DPB).

For example, the decoder populates the picture command queue during PED. The decoder puts one or more picture commands in a picture command queue. Each of the picture commands has an associated condition and an action. For example, the associated condition is completion of decoding of a particular picture (whether successful or not), and the action is to output or delete a picture from the DPB. An output picture is a picture to be displayed. When a picture is deleted, tables, parameters, and other structures for the picture are removed from memory.

Figure 6:
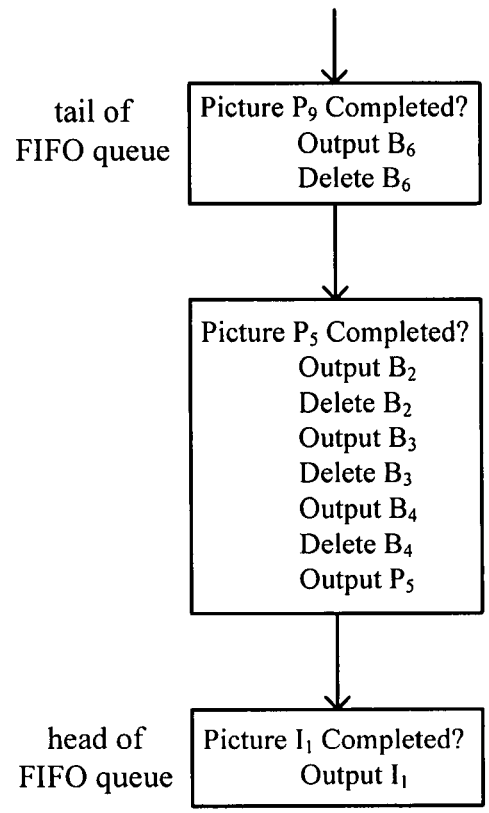
FIG. 6 is a diagram illustrating an example picture command queue in multithreaded decoding.

FIG. 6 shows an example FIFO picture command queue (600) that includes picture commands for the sequence of pictures having the display order $I_1$, $B_2$, $B_3$, $B_4$, $P_5$, $B_6$, $B_7$, $B_8$, $P_9$ . . . and having the coded order $I_1$, $B_2$, $B_3$, $B_4$, $P_5$, $B_6$, $P_9$, $B_7$, $B_8$, in the bit stream. I, P and B indicate I picture, P picture, and B picture, respectively, and the subscript indicates display order. As the decoder scans the bit stream during PED, the decoder adds picture commands starting at the head of the FIFO queue. According to the first command, when $I_1$ is decoded it can be output right away. When decoding completes for $B_2$, $B_3$ and $B_4$, there are no output commands or delete commands. The next commands put in the FIFO queue relate to the completion of decoding for $P_5$. When decoding of $P_5$ completes, the decoder can output and delete $B_2$, $B_3$ and $B_4$ from the DPB, and it can output $P_5$ from the DPB. The next commands in the FIFO queue relate to the completion of decoding for $P_9$. When decoding of $P_9$ completes, the decoder can output and delete $B_6$ from the DPB.

Alternatively, the decoder uses a different data structure to track picture commands. For example, a node of the queue corresponds to a condition (e.g., completion of decoding of a particular picture) and the node stores a single action to be performed upon satisfaction of the condition (e.g., output one picture or delete one picture). With this structure, the queue (600) shown in FIG. 6 would have 10 nodes, one for each action. A node for $I_1$ would have one output action associated with it, and seven nodes for $P_5$ would have seven actions associated with them, respectively. Or, the decoder uses queue nodes with other and/or different fields.

C. Managing Picture Command Queue.

In some embodiments, the decoder uses a picture command queue to record and execute picture commands in decoding order. The picture command queue facilitates complex DPB management in multithreaded decoding, with efficient use of memory and correct output of decoded pictures, even though decoding may occur in parallel and finish for pictures in an order different than the coded bit stream order.

In conventional single threaded decoding, the decoder timing is to traverse the bit stream for a picture, decode the picture, then put the picture in the DPB for output. When a decoded picture enters the DPB, depending on the parameters in the input picture, DPB management routines decide which picture(s) to output and which picture(s) to delete from the current DPB. The DPB is effectively a black box with input and output only. When the decoded picture enters the DPB as input, the management routines can produce two types of commands: output picture(s) and delete picture(s).

For example, when the input decoded picture is an instantaneous data refresh ("IDR") picture, all the pictures in the current DPB are output and deleted. Or, according to reference implementations of the H.264 standard, when the MMCO parameter is equal to 5 for the input decoded picture, all the pictures in the current DPB are output and deleted. Generally, if the decoder uses a "bumping" scheme for picture output, the not-yet-output picture with smallest value of PicOrderCnt( ) is output from the current DPB if the DPB is already full, and any already output picture(s) marked as not used_for_reference are deleted from the current DPB. The "output" and "delete" commands in the picture command queue for multithreaded decoding have similar meanings, but the commands also have conditions (e.g., decoding of particular pictures) associated with them.

In multithreaded decoding, pictures are not necessarily decoded in the coded order they appear in the bit stream. Pictures later in coded order might actually be decoded first. Simply entering decoded pictures into the DPB in the order of their actual decoding can cause problems when the pictures are not entered in coded order, for example, due to execution of DPB commands like output and delete in the wrong order.

So, in some embodiments, a decoder simulates the behavior of a live DPB with decoded pictures in it by entering initialized pictures in the DPB, where the initialized pictures are not necessarily decoded. The decoder (e.g., as part of PED) scans ahead in the bit stream, considering certain picture parameters for pictures but not sample data or side information such as motion vector information or reference picture identifier information for the pictures. The decoder allocates memory and creates data structures for a picture, perhaps populating the picture with certain parameters, then enters the initialized picture into the DPB in its correct, coded order. Thus, the decoder finds complete pictures, which are initialized with parameters but not decoded, and enters them in the DPB. Typically, an initialized picture has its picture header and slice header parameters correctly decoded from the bit stream as part of PED but sample data and side information are not yet decoded.

The decoder can also record picture commands associated with the future completion of decoding of an initialized picture. The decoder records the commands, for example, in a FIFO queue such as the queue (600) shown in FIG. 6. The decoder executes the commands in the queue when the conditions (here, the completion of decoding for the initialized pictures) associated with the commands have been completed. The commands thus execute in correct order (as set during PED) but the execution of the picture commands may be blocked at times to wait for decoding to complete.

FIG. 7 shows a generalized technique (700) for removing picture commands from a picture command queue in multithreaded decoding. A decoder such as the one described above with reference to FIG. 2 or other decoder performs the technique (700).

The decoder decodes (710) a picture then checks (720) a queue for picture commands that can be executed. The decoder determines (730) whether a command is ready (e.g., if the condition for the command at the head of the queue has been satisfied) and, if so, removes (740) the command from the queue, executes (750) the command, and checks/determines (720, 730) whether another command is ready.

FIG. 8 shows a diagram illustrating how picture command queue management processing is embedded in different decoding tasks in an example implementation. A working thread for a PED task (810) finds (812) a completed picture, enters (814) an initialized version into the DPB, and records (816) the picture and one or more commands dependent on decoding of the picture in a FIFO queue. A command in the FIFO queue thus has a dependent picture, which is the input picture to DPB associated with it. In this implementation, a dependent picture occupies one entry in the picture command FIFO queue and has one or more actions associated with it (e.g., a set of output commands and a set of delete commands).

A working thread for the LF task (850) performs deblocking (852) as the last part of decoding for a picture and determines (854) whether there are any picture commands in the FIFO queue whose condition is completion of decoding for the just decoded picture. If so, the working thread for the LF task (850) executes (856) the command(s). Thus, when a thread finishes the decoding for a dependent picture, any commands associated with the dependent picture in the FIFO queue can be executed. The commands are executed in FIFO order. If decoding has not finished for a previous dependent picture represented in the FIFO queue, the commands for a current dependent picture are not executed, even if decoding has already finished for the current dependent picture.

Commands are put in the FIFO queue in the order pictures have in the bit stream, regardless of the threading model. Although the command ordering is serial, decoding can be in parallel for multithreaded decoding. As a result, picture command execution can be blocked at a particular point in the FIFO queue, pending completion of decoding of a dependent picture at that point.

In addition to recording output and delete commands associated with the completion of decoding for pictures, the command queue can store other types of commands. For example, in some implementations, the command queue also stores commands associated with changes in SPS or PPS. When a SPS or PPS changes, the associated action can be, for example, table re-initialization for tables used in decoding, pool re-allocation for memory, or commands on a parameter set map/database. In general, the commands are put in the FIFO queue in the serial order that the coded video bit stream provides for the commands. The decoder (e.g., PED module) puts the commands in the FIFO queue without executing the commands or waiting for completion of the conditions. The commands are later executed, for example, during multithreaded decoding, when the conditions are satisfied.

D. Organizing and Scheduling Tasks.

In some embodiments, a decoder organizes tasks using a task dependency graph and schedules execution of the tasks in multithreaded decoding.

1. Building Task Dependency Graphs.

To build the graph, the decoder analyzes dependencies between past and current pictures. The decoder performs this analysis, for example, during PED. The decoder notes dependencies between stages of decoding for the pictures. In general, a stage of decoding is a set of operations or steps performed to decode a picture or part of a picture, for example, PED, ED, MC, INTRA, LF or POST. In some implementations, the decoder logs dependencies between segments, where a segment is a group of macroblocks for part of a slice, for a slice, for parts of multiple slices, for multiple slices, or for a picture. Thus, picture-by-picture dependencies and slice-by-slice dependencies are special cases of segment-by-segment dependencies.

Within a picture, ED (including CABAC) is typically parallelizable from slice to slice, which facilitates multithreaded decoding. A slice is not split into multiple segments for ED, but a segment may include multiple slices for ED. After ED, there may be inter-picture dependencies for operations such as MC, which relies on previously decoded reference pictures. Typically, macroblocks can be segmented in arbitrary ways for MC stages. For LF, a segment typically includes one slice. Overall, the segmentation decision for macroblocks in a picture can be the same from stage-to-stage of decoding, or the segmentation decisions can vary from stage-to-stage.

FIG. 9 shows a generalized technique (900) for creating a task dependency graph for segments of macroblocks. A decoder such as the one described above with reference to FIG. 2 or other decoder performs the technique (900).

The decoder identifies (910) dependencies for segments. For example, the decoder identifies the dependencies for segments of a picture during a lightweight scan through the coded video bit stream as part of PED. Alternatively, the decoder identifies dependencies using a different scanning mechanism.

The decoder then organizes (920) the one or more segments, regardless of slice boundaries. For example, within a picture, the decoder groups intra-coded macroblocks together in a segment. In another picture, the decoder groups motion-compensated macroblocks that use the same reference picture together as one segment, and the decoder groups motion-compensated macroblocks that use a different reference picture together as a second segment.

The decoder then assimilates (930) tasks for the segment(s) into a task dependency graph. For example, the decoder builds a task dependency graph such as the one shown in FIG. 10 for picture-by-picture dependencies. Or, the decoder builds a task dependency graph with tasks for slices (or, more generally, segments) for nodes. In building the task dependency graph, the decoder consider dependencies between different stages for the same segment (e.g., INTRA depends on ED, MC depends on ED, LF depends on MC, LF depends on INTRA) and dependencies between stages for different segments (e.g., INTRA for segment 2 may depend on INTRA for segment 1 in the same picture, MC for segment 3 may depend on LF for segment in another picture). Dependencies can be intra-picture dependencies or inter-picture dependencies.

The decoder determines (940) whether to continue with the next picture and, if so, identifies dependencies for the next picture.

2. Example Task Dependency Graphs.

Figure 10:
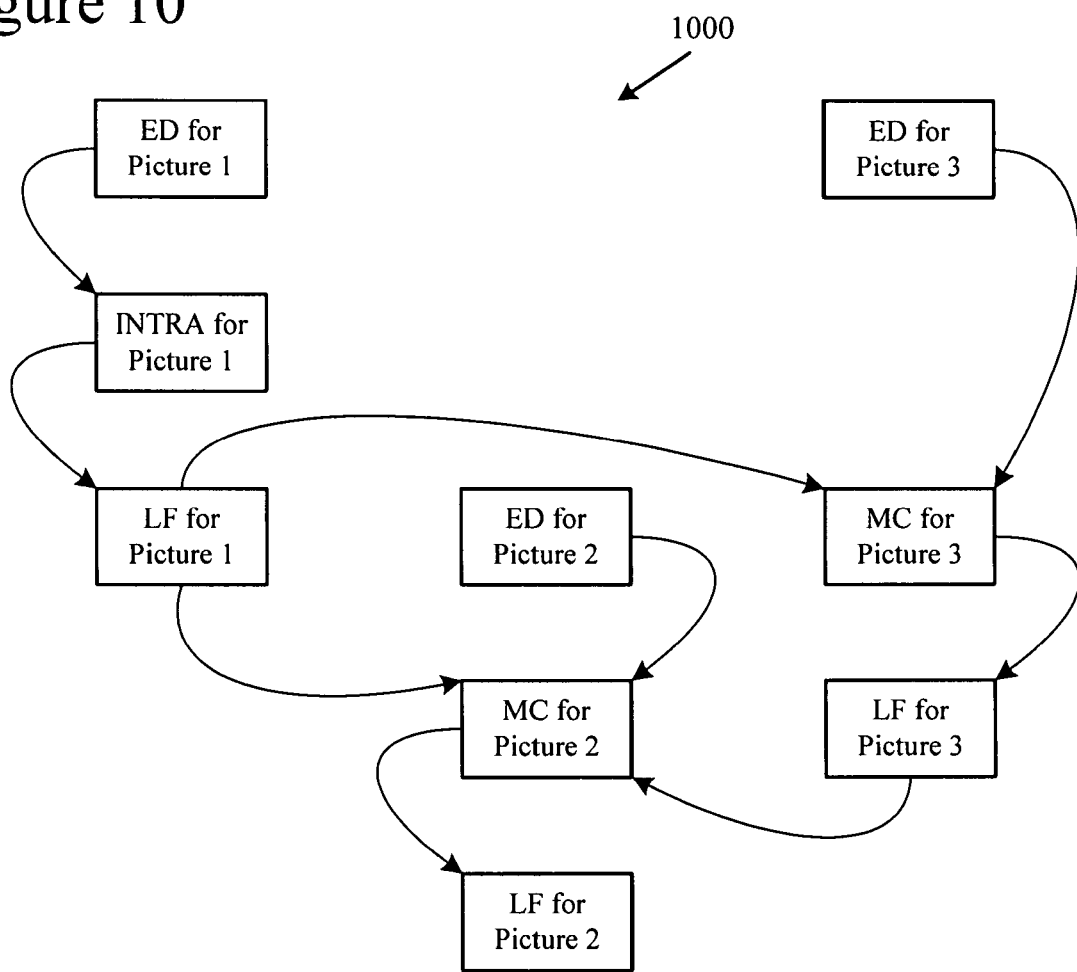
FIG. 10 is a diagram illustrating an example task dependency graph for pictures.

FIG. 10 shows an example task dependency graph (1000) for pictures 1, 2 and 3. Picture 1 is an I picture, and picture 3 is a P picture with macroblocks that use picture 1 as a reference picture. Picture 2 is a B picture with macroblocks that use picture 1 and picture 3 as reference pictures. The INTRA task for picture 1 depends on completion of the ED task for picture 1, and the LF task for picture 1 depends on completion of the INTRA tasks for that picture. The MC task for picture 3 depends on completion of the LF task for (reference) picture 1 and the ED task for picture 3. The LF task for picture 3 depends on completion of the MC task for the picture. For picture 2, the MC task depends on completion of three other tasks—the ED task for picture 2 and the LF tasks for pictures 1 and 3. The LF task for picture 3 depends on completion of the MC task for picture 3. Alternatively, the graph (1000) also includes a MV setup task for picture 2, which depends on completion of the MC task for picture 3, and upon which the MC task for picture 2 is dependent.

In some implementations, graph nodes represent segments. If a picture has 8000 macroblocks, the macroblocks might be organized as four segments for parallelization in multithreaded decoding. If decoding is split into 6 stages (e.g., PED, ED, INTRA, MC, LF and POST) and there are 15-20 pictures in flight at various stages of decoding, the task dependency graph can easily include hundreds of nodes, which facilitates fine-grained scheduling of multithreaded decoding.

In some implementations, the task dependency graph is organized as a set of nodes. A node structure has a counter that indicates how many task dependencies the node's task has. The counter is incremented (or decremented) when a task dependency is added (or completed/removed). For example, a node structure for the MC for Picture 2 task of FIG. 10 would have a counter=3, then the counter would be decremented as the LF for picture 1, ED for picture 2 and LF for picture 3 tasks complete. A node structure also has an expandable list of its dependencies. For example, the node structure for the MC for Picture 2 task of FIG. 10 has one dependency in its list—LF for picture 2. Dependencies are added to the list when noted during PED. When a task completes, the task(s) dependent on the completion are notified, with counter(s) for those task(s) being decremented. For example, when the MC for Picture 2 task of FIG. 10 completes, the counter for the node structure for the LF for picture 2 task is decremented. When the dependency counter is zero for a task during decoding, the task is put in the ready task list for scheduling. Alternatively, the node structure for tasks in the task dependency graph includes other and/or additional fields.

3. Scheduling Tasks.

The decoder then schedules tasks for decoding using the task dependency graph. In implementations in which the graph nodes include dependency counters, the decoder adds a task to a list of ready tasks when the dependency counter for the task reaches zero. During multithreaded decoding, the decoder selects tasks from the ready list according to one or more heuristic approaches. For example, the heuristic approach is:

(a) FIFO—tasks are scheduled in the order they were put in the ready list;

(b) stage priority—tasks are scheduled depending on priority for their decoding stage;

(c) picture age—tasks for oldest pictures have highest priority;

(d) number of dependencies on tasks—task with most dependencies on it executes first, such that completion of the task potentially unblocks more other tasks in the graph; or (e) shortest critical path from task to output—tasks that put pictures close to output are executed first.

Alternatively, the task scheduler considers other and/or additional heuristics.

E. Recovery Mechanisms.

In some embodiments, a decoder includes special mechanisms for handling decoding of a corrupted bit stream or starting decoding from an arbitrary location in a bit stream. For example, according to one recovery mechanism, the decoder during PED finds a valid picture to start decoding after corruption of part of an encoded video bit stream or to start decoding from an arbitrary location indicated in the encoded video bit stream. According to another recovery mechanism, the decoder during PED handles corrupted parameters in a slice header and attempts to recover. According to another recovery mechanism, the decoder handles errors in other decoding stages (e.g., ED, MC, INTRA, LF). The mechanisms can be used in combination or separately. Collectively, the mechanisms improve the robustness of decoding for bit streams that have a high probability of becoming corrupted.

An IDR picture is a valid starting point for decoding—the pictures after an IDR picture do not reference pictures before the IDR picture for motion compensation. An IDR picture typically begins a video sequence, but IDR pictures may be rare after that. For some applications, IDR pictures appear only once per chapter of video or only once every 30 seconds in a sequence. When trying to start decoding from an arbitrary location in the bit stream, there might not be an IDR picture for several seconds or even minutes. As a result, while waiting for an IDR picture, downloaded bits may be wasted or reasonable quality pictures may be skipped.

Therefore, in some embodiments, as part of a recovery mechanism, a decoder (e.g., a PED module) seeks an I picture at which to start decoding, as if the I picture were an IDR picture. An I picture is intra coded; it includes I slices but not P slices or B slices.

Figure 11:
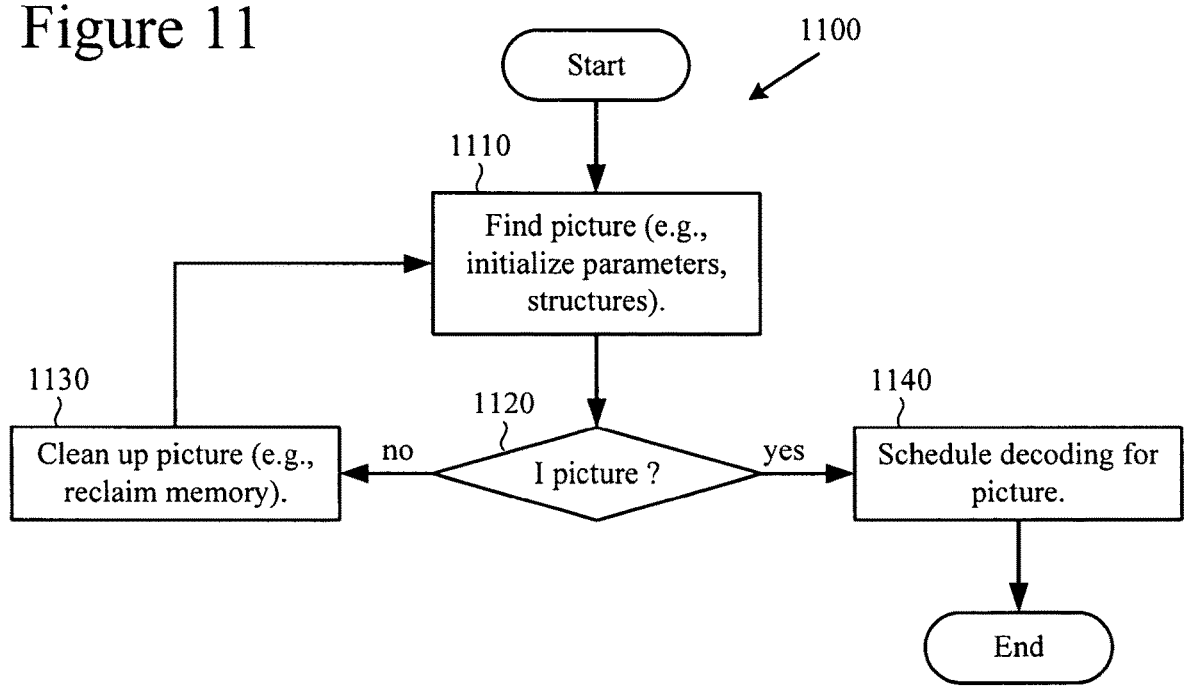
FIGS. 11 and 12 are flowcharts illustrating generalized techniques for recovery mechanisms in decoding.

FIG. 11 shows a technique (1100) for finding a valid picture to begin decoding at an arbitrary location in an encoded video bit stream. A decoder such as the one described above with reference to FIG. 2 or other decoder performs the technique (1100). The decoder performs the method, for example, after detecting corruption in the bit stream or after receiving an indication that it should start decoding from a particular, arbitrary location in the bit stream.

To start, the decoder finds (1110) a picture in the encoded video bit stream. For example, a PED module of the decoder parses a NALU from the bit stream, where the NALU is for a complete picture, then initializes structures for parameters and data for the picture. Alternatively, the decoder finds the picture using another mechanism.

The decoder determines (1120) whether the picture is an I picture. If not, the decoder cleans up (1130) the picture. For example, the decoder removes any picture commands put in a picture command queue for the picture and releases memory used for structures for the picture.

If the picture is an I picture, the decoder schedules (1140) decoding for the picture. For example, the decoder puts an initialized picture in the DPB, puts picture commands for the picture in a picture command queue, and assimilates one or more tasks for the picture into a task dependency graph for multithreaded decoding.

The decoder continues the technique (1100) until it finds a valid I picture or IDR picture in the bit stream. In some implementations, a flag bFirstTimeSeek indicates whether the decoder should perform the technique (1100). At the start of decoding or when recovering from an error, bFirstTimeSeek is TRUE. When the flag is TRUE, a PED module in the decoder finds a complete picture and checks whether the picture is an I picture. If the picture is an I picture, the PED module sets the flag bFirstTimeSeek to be FALSE and decoding starts from the I picture. Otherwise, the PED module continues trying to find an I picture.

Even after an I picture is found, there may be errors in decoding starting from the I picture. For example, macroblocks of later B pictures (in coded order) may reference pictures from before the I picture. Or, macroblocks of a later P picture may reference (by remote prediction) pictures that are currently unavailable. Or, there may be parts of the bit stream that are corrupted after the I picture. Some of the errors may be ignored or concealed (e.g., errors in frame_num gap, reference pictures being unavailable). Other errors can require that a picture (or part thereof) be treated as corrupted, however.

In some implementations, a decoder handles errors differently depending on whether they are identified during a PED stage or during another decoding stage. When the decoder catches the error during a PED stage, the decoding processes the error by cleaning up the picture in question (and skipping decoding of the picture) or just skipping decoding of the picture, depending on the type of error. If the error occurs during another stage, the decoder processes the error using another error handling mechanism such as skipping decoding of the affected part (e.g., slice) but decoding other parts, or concealing the error in the affected part.

Figure 12:
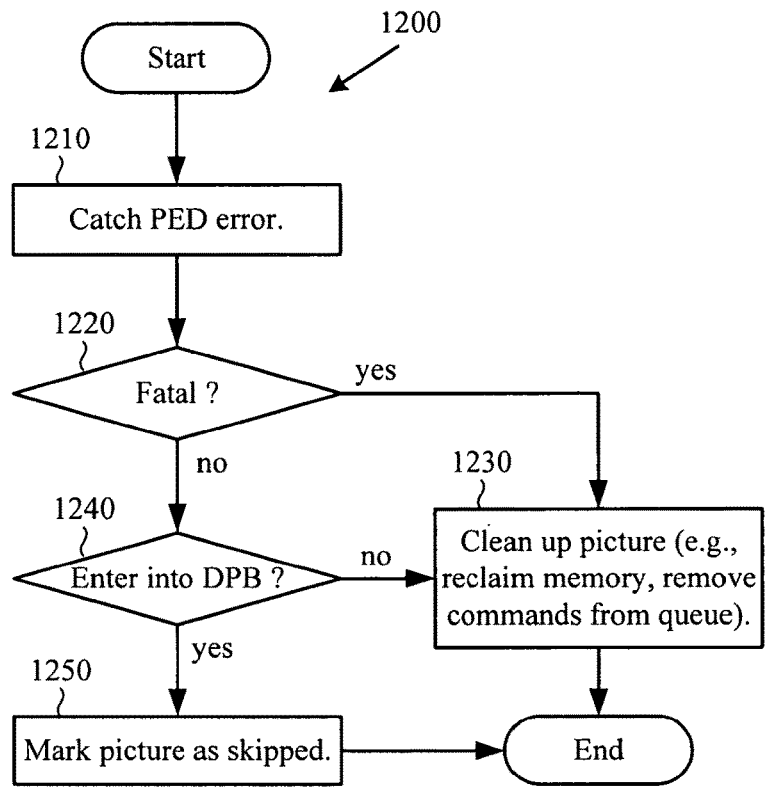

FIG. 12 shows a technique (1200) for handling errors identified during PED processing. A decoder such as the one described above with reference to FIG. 2 or other decoder performs the technique (1200). The decoder handles different kinds of PED errors differently. In the technique (1200), the handling of the error depends on several factors, including whether the error is fatal and whether the picture can be entered into a DPB.

The decoder catches (1210) an error and determines (1220) whether or not the error is fatal. If the PED error is a fatal, error (e.g., an "out of memory" error), the decoder cleans up (1230) the corrupted picture. For example, the decoder cleans up any commands in a picture command FIFO queue that are dependent on the corrupted picture, and the decoder releases memory for the structures for the picture back to a memory pool. The decoder also closes since the error was fatal.

If the PED error is not fatal, the decoder determines (1240) whether the current picture can successfully be entered into the DPB as an initialized picture. Some types of errors in slice headers cause errors in DPB management routines, preventing successful handling of the picture in the DPB. Other types of slice header errors do not interfere with DPB processing, however.

If the initialized picture successfully enters the DPB, the decoder enters the picture in the DPB but marks (1250) the picture as skipped. In some implementations, the decoder marks the corrupted picture as skipped by setting a flag bSkipDecodingPicture=TRUE. The decoder leaves the corrupted picture inside the DPB, but decoding of it is skipped and it is processed like a skipped picture. For example, the decoder causes display of a picture at the correct time for the corrupted picture by repeating the display of another picture. Alternatively, the decoder handles skipped pictures in another way.

If the initialized picture does not successfully enter the DPB, the decoder cleans up (1230) the corrupted picture. For example, the decoder cleans up any commands in a picture command FIFO queue that are dependent on the corrupted picture, and the decoder releases memory for the structures for the picture back to a memory pool. Sometimes, the PED module finds an error in slice header parameters that prevents DPB processing, so the whole picture is treated as corrupted and not entered in the DPB, even if other slices in the picture are decodable.

After the decoder processes a non-fatal PED error, the decoder continues by processing the next picture in coded order. The decoder continues until it finds a valid, error-free picture, reaches the end of the encoded video bit stream, or encounters a fatal error.

When the decoder encounters an error during a non-PED task (e.g., ED, MC, INTRA, or LF), the decoder marks the slice including the error as corrupted and performs error handling for it. For example, the decoder simply skips decoding of the slice but decodes other slices in the picture. Or, the decoder skips decoding of the slice and attempts to conceal the error using other decoded content. If the picture is decoded with a GPU that operates on whole pictures, however, the picture including the corrupted slice is skipped.

V. Innovations in Neighbor Determination.

In some embodiments, a decoder uses table-based mechanisms to determine the availability of neighboring macroblocks, blocks, and sub-blocks during decoding. The table-based neighbor availability determinations described herein, especially when used with state machine transitions, are both memory efficient and fast.

For many standards, decoding an encoded video bitstream uses availability and location information about neighboring macroblocks, sub-macroblocks, blocks and sub-blocks. Neighbor availability decisions affect numerous decoding operations. For example, in H.264 decoding, the decoder considers neighbor context in setting up context for entropy decoding with CABAC, entropy decoding with CAVLC, spatial intra prediction, and mode computation for intra prediction. Neighbor availability determinations may also be made as part of in-loop deblock filtering, motion vector prediction, and other operations.

Despite the prevalence of the operations, the H.264 standard specifies complex logic for determining available neighbors and neighbor positions. The logic is relatively slow, often resulting in inefficient memory switching. The reference software also provides unsatisfactory performance for neighbor availability and position determinations.

In contrast, table-based neighbor determination mechanisms described herein are efficient and fast. A decoder reuses tables that are pre-computed or computed a small number of times during a decoding session. The tables typically have a small memory footprint, and the table lookup operations are relatively fast.

A. Techniques for Table-Based Neighbor Availability Determination.

This section presents techniques for using table-based neighbor availability determinations during decoding. A decoder such as the one described with reference to FIG. 2 or other decoder performs one or more of the techniques.

Figure 13:
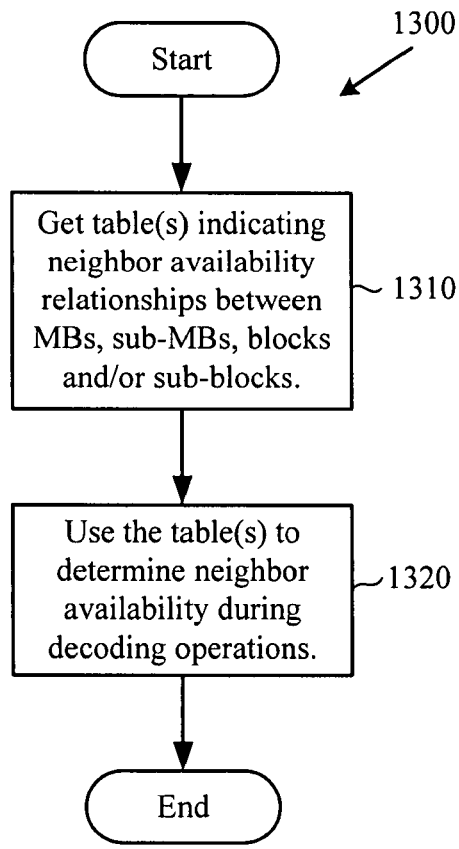
FIG. 13 is a flowchart illustrating a generalized technique for using one or more tables to determine neighbor availability during decoding.

FIG. 13 shows a generalized technique (1300) for using one or more tables to determine neighbor availability during decoding. To start, the decoder gets (1310) one or more tables indicating availability relationships between macroblocks, sub-macroblocks, blocks and/or sub-blocks. For example, the decoder gets tables as described in the example implementations section. Alternatively, the decoder gets tables having a different organization and/or storing different types of information.

In hierarchical approaches, the decoder gets tables that drill down from macroblock neighbor availability information to sub-macroblock neighbor availability information. For example, for a progressive picture or field picture, the decoder gets a first availability table indicating different macroblock (or macroblock pair) neighbor patterns and gets a second availability table indicating different sub-macroblock (e.g., block, sub-block) neighbor patterns. Certain tables can be pre-determined for certain configurations of video. Or, where the same table is reused throughout decoding, the decoder can compute the tables during initialization for a decoding session.

The decoder then uses (1320) the one or more tables to determine neighbor availability during decoding. For example, the decoder uses the tables as described in the example implementations section. Alternatively, the decoder uses the tables in different ways.

The way the decoder uses the tables can depend on whether the picture being decoded is a progressive picture, field picture, or MBAFF picture (generally, an interlaced frame with field/frame coding decisions within the frame). For example, for a progressive picture or field (non-MBAFF) picture in some embodiments, the decoder uses a first table to determine macroblock neighbor availability. For a MBAFF picture, the decoder uses a first table to determine macroblock pair neighbor availability. The decoder then determines sub-macroblock neighbor availability using a second table.

Figure 14:
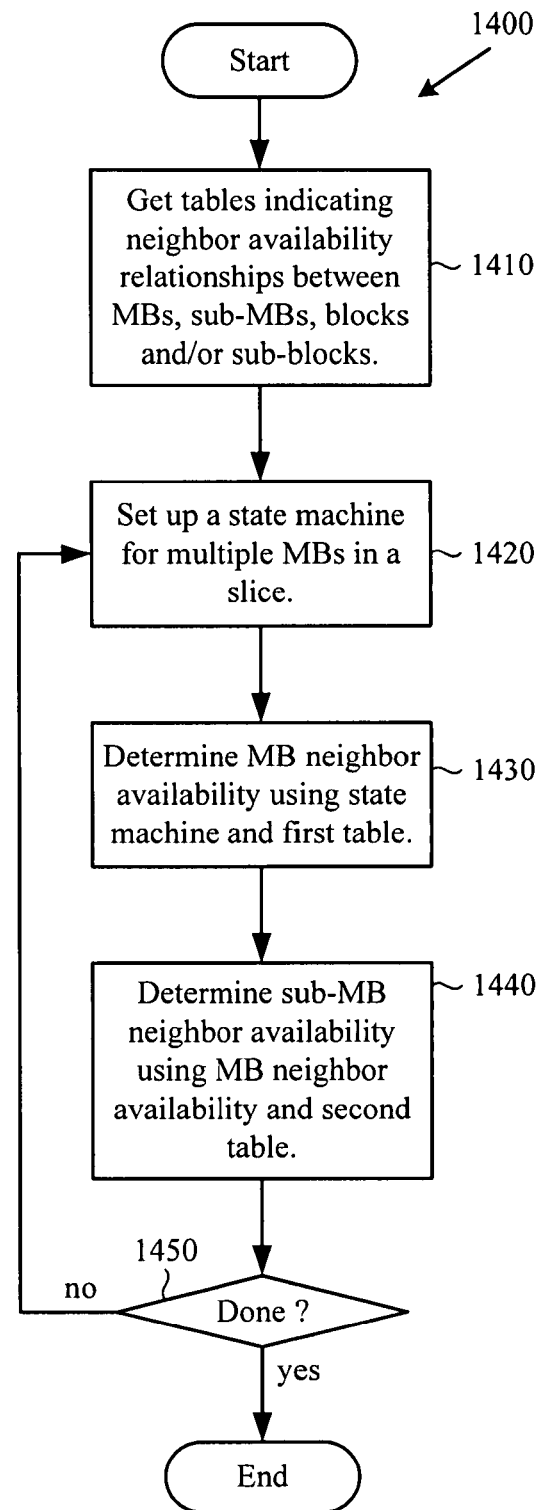
FIG. 14 is a flowchart illustrating a generalized technique for using a state machine and one or more tables to determine neighbor availability during decoding of a progressive or field picture.

When the decoder sets up a state machine, the decoder can use the state machine to quickly determine macroblock (or macroblock pair) information. FIG. 14 shows a generalized technique (1400) for using a state machine and one or more tables to determine neighbor availability during decoding of a progressive or field picture.

To start, the decoder gets (1410) two tables indicating availability relationships between macroblocks, sub-macroblocks, blocks and/or sub-blocks. For a particular slice in the picture, the decoder also sets (1420) up a state machine for the multiple macroblocks in the slice. A decoding task creates the state machine and uses the state machine for various decoding operations for the slice. For a given state, the state machine stores information indicating number of consecutive macroblocks in the state and an index to a first availability table indicating availability information for the state. Or, instead of storing indices for the respective states, the state machine directly stores macroblock availability information on a macroblock-by macroblock-basis, for example, as a bit field with four bits per macroblock, one bit for each possible neighbor macroblock. Alternatively, the decoder sets up a state machine on a picture-by-picture or some other basis.

A first availability table associates different states with different macroblock neighbor availability patterns. The decoder determines (1430) macroblock neighbor availability using the state machine and the first availability table (e.g., by lookup or writing values into the state machine). The decoder then determines (1440) sub-macroblock (e.g., 16×8, 8×16, 8×8, 4×8, 8×4, or 4×4 sizes) neighbor availability using the macroblock neighbor availability and a second availability table. The second availability table associates different macroblock neighbor availability patterns with different block/sub-block neighbor availability patterns. The decoder then decides (1450) whether to continue with the next slice (if any) in the picture or finish.

Or, for a MBAFF picture, the decoder sets up a state machine for multiple macroblocks in a slice. A decoding task creates the state machine and uses the state machine for various decoding operations for the slice. For a given state, the state machine stores information indicating number of consecutive macroblock pairs in the state and an index to a first availability table indicating macroblock pair neighbor availability information for the state. Or, instead of storing indices for the respective states, the state machine directly stores macroblock pair neighbor availability information on a macroblock pair-by-pair basis. The first availability table associates different states with different macroblock pair neighbor availability patterns. The decoder also sets up a neighbor context vector for each of the respective macroblocks of the pairs. The neighbor context vector indicates, for example, field or frame mode for a current macroblock, field or frame mode for each of plural neighbor macroblocks, and whether the current macroblock is a top or bottom macroblock in its macroblock pair. The decoder determines macroblock pair neighbor availability using the state machine and the first availability table. The decoder then determines sub-macroblock neighbor availability using the macroblock pair neighbor availability and a second availability table. The second availability table associates different macroblock pair neighbor availability patterns with different block/sub-block neighbor availability patterns.

Aside from computing neighbor availability information, the decoder also determines and stores neighbor locations for use in various decoding operations. In some implementations, the neighbor locations are stored as offsets relative to the current macroblock.

B. Example Implementations for Table-Based Neighbor Determination.

In some implementations, a decoder computes availability and location information via a hierarchical approach using a state machine and tables as described in this section.

In general, the decoder uses a state-machine to provide neighboring MB availability information (in a non-MBAFF picture) or neighboring MB-pair availability information (in a MBAFF picture). The decoder uses the availability information to index tables that provide availability information for MB, sub-MB, block, and/or sub-block levels. During decoding, the decoder deduces the availability of neighboring sample locations from the availability of neighboring partitions that contain those sample locations. The decoder uses additional tables to record offsets from the current MB/sub-MB/sub-block to neighboring MB/sub-MB/sub-block. The details of the table-based neighbor determination vary depending on whether the content being decoded is part of a MBAFF picture or non-MBAFF picture.

1. Determining Neighbor Availability for Non-MBAFF Pictures.

For a progressive picture or field picture, a decoder uses a state machine for MB-level neighbor availability determinations. The decoder sets up the state machine for each slice before entropy decoding. The state machine accounts for picture boundaries and slice boundaries, and it provides the "state" of availability of neighboring MBs (in the absence of flexible macroblock ordering). FIG. 15 shows a chart (1500) indicating MB neighbors to the left of a current MB, above the current MB, above and to the right of the current MB, and above and to the left of the current MB. For the sake of convention, these are labeled A, B, C and D, respectively.

The decoder uses two different state-machines, depending on whether the first MB in the slice is at the left edge of the picture. FIG. 16 shows macroblocks for an example state-machine (1600). For the state machine (1600), the current slice (shaded region) begins in the middle of the picture. (A simpler state machine can be used when the MB beginning the slice is at the left edge of the picture, omitting certain categories of states.) For a given state, the state machine stores the following information: (1) how long to stay in the current state (the number of consecutive MBs in raster order that share this state), (2) an index into an availability table that gives the availability information for this state (e.g., the table shown immediately below), and (3) the next state. For example, at the beginning of the slice, the state machine (1600) starts at state a, which has a length of one MB. For the rest of the MBs in the row, the state machine moves to state b. The next macroblock row begins with state c, and so on. The following table shows MB neighbor availability information (using labels A, B, C and D shown in FIG. 15) associated with the different states in the state machine.

| State | Available Neighbors |
|---|---|
| a | None |
| b, d (may be skipped) | A |
| c | None; |
| | or |
| | C (e.g., if first MB in slice is above right) |
| e (may be skipped) | A, C |
| f | A, B (e.g., if last MB in second row); |
| | or |
| | A, B, C |
| g, j | A, B, C, D |
| h, k | A, B, D |
| i | B, C |

For instance, state a corresponds to the case where none of the MB neighbors is available. In state b (which may be skipped if the first MB in the slice is the last MB in the row), the left neighbor is always available. Some states may be assigned different MB availability depending on the MB location. State c, for example, either has no available neighbors or has an available above-right neighbor (if the macroblock starting the slice is one MB position away in the horizontal direction). States i, j and k are repeated starting from the fourth row of MBs in the slice. The MB neighbor availability information for a particular state can be represented with 4 bits, one each for A, B, C and D, where the 0/1 values indicates whether the neighbor MB is or is not available.

The decoder uses the MB neighbor availability information for macroblocks to determine the sub-MB/sub-block neighbor availability using table lookups. Within a 16×16 MB, there may be partitions used at various stages of decoding, where the partitions have different sizes and appear at certain allowed locations. For example, in the H.264 standard, allowed sizes include 16×16 MB, 16×8 blocks at any of 2 defined locations in a MB, 8×16 blocks at any of 2 defined locations in a MB, 8×8 blocks at any of 4 defined locations in a MB, 8×4 blocks at any of 8 defined locations in a MB, 4×8 blocks at any of 8 defined locations in a MB, and 4×4 blocks at any of 16 defined locations in a MB. This yields 1+2+2+4+8+8+16=41 partition/location combinations.

A table maps the MB neighbor availability information to the sub-MB/sub-block neighbor availability information. For example, for a particular partition (e.g., 8×4 block at given location), the decoder maps the MB neighbor availability pattern to a sub-MB/sub-block neighbor availability pattern. Where there are four possible MB neighbors A, B, C and D, there are $2^4$=16 combinations and MB neighbor availability patterns. For the particular partition/location combination, where there are four possible partition neighbors A, B, C and D, the decoder determines which of 16 partition neighbor availability patterns applies.

As an example, a 4×4 block in the top row of a MB will not have an available 4×4 neighbor above it if the MB above the 4×4 block's MB is not available. On the other hand, a 4×4 block on the second row of the MB will have a 4×4 neighbor above (within the same MB). MBs, sub-MBs, and sub-blocks that occur later in decoding order are also considered to be unavailable. This includes MBs, sub-MBs, and sub-blocks that belong to MBs with bigger MB addresses compared to the current MB, as well as MBs, sub-MBs, and sub-blocks that occur later in the scan during the decoding of the current MB, where the scan order of partitions within a MB or block is generally left to right, top to bottom.

FIG. 17 shows a pseudocode listing (1700) for a data structure implementing a sub-MB availability table. The decoder creates the table, for example, at the start of a decoding session and reuses the table throughout decoding of a sequence having pictures with a particular MB width. For each of 41 possible partition/location combinations represented in the array rgBlockAvailable[ ], there is an array uiAvail[ ] with 16 elements. For a given partition/location combination, the decoder uses a 4-bit value indicating MB neighbor availability (1 bit for each of A, B, C and D neighbor MBs) as an index to the array uiAvail[ ]. The corresponding entry indicates the partition neighbor availability for the given partition/location combination, considering the MB neighbor availability. The corresponding entry can be, for example, a 4-bit value indicating whether A, B, C and D partition neighbors are available or not. For example, for a 16×8 partition at the bottom of the current macroblock, the entry indicates whether left, above, above-left and above-right neighbors are available. The above 16×8 neighbor is available, as it is in the same MB, and the above-right 16×8 neighbor is not available, as its MB is later in scan order.

The decoder also stores the locations of neighboring MBs for some sub-MBs and sub-blocks. The decoder stores the location information in the form of offsets from the current MB. The location of neighboring MBs is used during constrained intra prediction. In the progressive picture case, the locations of neighboring 4×4/8×8 blocks and sample locations may be directly computed, considering MB neighbor availability possibilities and whether positions are in the current MB. FIG. 18 shows a pseudocode listing (1800) for example data structures used to store neighboring MB information for 8×8 blocks and 4×4 sub-blocks.

2. Determining Neighbor Availability for MBAFF Pictures.

For an MBAFF picture, the decoder uses different tables and/or operations. The decoder sets up a state machine used to determine MB pair level neighbor availability. In a MBAFF frame, MB addresses (MBAddr) are ordered such that MBAddr/2 goes through MB pairs in raster scan order. Also, MBs within a MB pair are both available or both not available. The decoder uses a state machine analogous to the one used for non-MBAFF pictures, but the output is interpreted as MB pair neighbor availability instead of MB neighbor availability. The decoder similarly uses a table mapping states to MB pair neighbor availability (instead of MB neighbor availability).

The decoder also sets up a neighbor context bit vector for each MB. The vector indicates whether a given, current MB is encoded in field or frame mode. For each of the four neighbor MB pairs A, B, C and D, the vector also indicates whether the MB pair is encoded in field or frame mode. Finally, the vector indicates whether the current MB is the top MB or bottom MB of its MB pair. FIG. 19 shows an example neighbor context bit vector (1900) for an MB of an MBAFF picture.

The decoder uses MB pair neighbor information and current MB status information (from the bit vector for the current MB) to determine sub-MB partition information using a table. The table maps different MB pair neighbor/current MB patterns to different partition neighbor patterns. Within a 16×16 MB, the possible partitions and locations are typically the same as for non-MBAFF pictures (e.g., 41 combinations for H.264). Where there are four possible MB pair neighbors A, B, C and D, there are $2^4=16$ combinations and MB pair neighbor patterns. For each, there are 4 combinations for field/frame coding mode and top/bottom status for the current MB. This yields 64 possible combinations for MB neighbor availability for indices to the table. For a particular partition/location combination, where there are four possible partition neighbors A, B, C and D, the decoder determines which of 16 partition neighbor availability patterns applies.

An example data structure implementing a sub-MB neighbor availability table for MBAFF pictures is the two-dimensional array:

unsigned char rgrgbBlockAvailableMBAFF[16*4][41].

The decoder computes the values of the table, for example, during initialization for a decoding session for a sequence. The second dimension is indexed by the 41 partition/location combinations as in the non-MBAFF case, and the first dimension is indexed by a value from 0 to 63 given by:

4×MBPairAvail+NeighborContextVector & 0x03, where MBPairAvail is a 4-bit value indicating the MB-pair neighbor availability (1 bit for each of A, B, C and D) from the state machine, and NeighborContextVector & 0x03 implements a bit mask on a neighbor context bit vector to give the field/frame coding mode and top/bottom status for the current MB. The MB neighbor availability depends on the field/frame and top/bottom information for the current MB. The field/frame coding mode information for neighbor MB pairs is not considered when all pixels in a neighboring MB pair are either available or not available, regardless of whether the MB pair is field or frame coded.

The decoder stores location information for neighbor MBs for some sub-MB and sub-blocks. In an MBAFF frame, it is not as straightforward to compute the locations of the neighboring MBs, sub-MBs, and sub-blocks. Determining the location information is complicated by the possibility of different field/frame coding mode decisions for neighbor MB pairs.

FIG. 20 shows pseudocode (2000) for example data structures for storing location information for an MB, its 8×8 blocks, and its 4×4 sub-blocks. The location information is stored in a two-dimensional array, where the first dimension is indexed by the 6-bit value of a neighbor context bit vector and the second dimension is indexed by the partition and location combination (1 16×16 possibility, 4 8×8 possibilities, 16 4×4 possibilities).

In each vector/partition/location position of the array, MB neighbor locations and (if appropriate) 4×4 sub-block (or 8×8 block) neighbor locations are stored. The MB locations are stored as offsets from the current MB address. 4×4 sub-block neighbor locations store the vertical offsets in 4×4 sub-block units from the top-left 4×4 sub-block of the current MB. 8×8 block neighbor locations can also be stored as offsets from the top-left of the current MB. The horizontal offsets can be directly computed when needed as in the non-MBAFF case.

In intra prediction, the sample locations within each 4×4 or 8×8 block can have left neighbors belonging to two different MBs depending on whether the locations belong to the top or bottom field of the picture. This fact is especially important for constrained intra prediction where one of the neighboring MBs may be intra coded whereas the other is inter coded. Therefore, two offsets are stored for the left MB neighbors, for example, by packing two different offset values into the variable bMbOffsetLeft.

Furthermore, in intra prediction, table lookup of neighboring sample locations can be completely avoided via the following deductions. The left neighbor (if available) is the sample location immediately to the left of the current sample location in the picture. If the current MB is frame coded, the neighbor above (if available) is the sample location immediately above the current sample location in the picture. Otherwise (if the current MB is field coded), the neighbor above (if available) is the sample location immediately above the current sample location in the same field of the picture. The above-right and above-left neighbors (if available) can be derived in a similar manner.

VI. CABAC Decoding Innovations.

In some embodiments, when a decoder decodes CABAC-encoded video information, the decoder uses one or more innovations that improve the efficiency of the CABAC decoding. Many of the CABAC decoding innovations can be used in combination.

CABAC has remarkable compression properties but, in standard implementations, is computationally complex. CABAC encoding and decoding are notoriously slow and resistant to optimization for conventional architectures. These performance problems have several causes. First, the core CABAC decoding routine serially processes one bit at a time off of a bit stream, and decoding of some syntax elements does not advance the stream pointer at all. Second, in standard implementations, the decoder performs heavy processing for each bit, which typically involves multiple conditional branches and context switching. Third, in standard implementations, the decoder inefficiently calls the core decoding function (which is labeled biari_decode_symbol in many implementations). For example, in many decoding functions that compute syntax elements, calls to biari_decode_symbol are embedded in extensive conditional branches that are negotiated in order to select the appropriate situation. This organizational scheme leads to code that is not localized well. Based on what is happening at any given moment, the routines may jump all over, which results in incorrect loading of code into the instruction cache and leads to other inefficiencies. In practice, naïve implementations of CABAC decoding can slow down decoding to the extent that 10 frame per second video is displayed at less than 1 frame per second.

FIG. 21 shows a pseudocode listing for the core decoding function biari_decode_symbol from a reference implementation of CABAC decoding according to the H.264 standard. Generally, the stages of the algorithm are (1) initialize variables, (2) compare value to range and take appropriate action(s) based on results of the comparison (e.g., changing state, changing value, changing range), and (3) renormalize range. The decoding function decodes exactly one bit of information from n bits of data off of the stream, where n is often zero. Typically, the bit of information is the most probable symbol ("MPS"). Constraints on system memory hinder efforts to decode several bits at a time. Without feasible parallel processing opportunities, the goals become shortening the basic steps and reducing the performance impact of conditional logic.

Many of the CABAC decoding innovations described in this section are architecture independent, stemming from recurrent inefficiencies in the core decoding function. Other innovations are architecture dependent and work for an architecture such as the x86 architecture or a gaming console architecture. Different architectures have different characteristics and, correspondingly, different innovations are adapted for different architectures.

A. Higher Volume Loading of Stream Bits.

In the pseudocode decoding function (2100) shown in FIG. 21, during the renormalization of the range variable, bits are read from the bit stream as needed. The value variable is updated on a single bit-by-bit basis (indicated by the value:=updatevalue operation) from a variable DBuffer that holds 8 bits of data. The variable Dbits_to_go keeps track of how many of the bits of the DBuffer byte have been transferred into the value variable. The bit stream is considered an array of bytes, and when the DBuffer byte is used up, the decoder loads another byte from the bit stream (indicated by the get_a_byte function). This loading mechanism is inefficient in several respects. Loading bits from the bit stream on a byte-by-byte basis is inefficient. Moreover, loading a single byte is inefficient in many architectures, requiring mask, shift and load operations to get the single byte.

According to a first aspect of the CABAC decoding innovations, when a decoder performs context-adaptive binary arithmetic decoding, the decoder, as necessary, loads encoded video information from a bit stream on a machine word-by-machine word basis. The machine word is, for example, 32 bits or 64 bits. By loading bits on a machine word-by-word basis, the decoder makes fewer calls to the get_a_byte function. If the word size is 32 (or 64), the decoder makes ¼ (or ⅛) as many calls to the get_a_byte function. Moreover, in many architectures, loading an entire machine word is more efficient than loading a single byte, which requires additional operations.

In some implementations, the variable dBuffer holds the entire machine word. Updates are performed a word at a time.

B. Arithmetic with Left-Adjusted Integers.

In the reference pseudocode listing (2100) shown in FIG. 21, three variables value, DBuffer, and DBits_to_go are intimately involved in keeping the value being decoded updated with bits off of the bit stream, as needed. To update the value (indicated by the value:=updatevalue operation), the decoder performs a combination of instructions. The decoder shifts the value variable, then performs mask, shift, load and or instructions in order to load each new bit from the stream from Dbuffer into the value variable. Theoretically, the value is a 9 bit window on the bit stream, with DBuffer holding the next bits to be loaded into value.

According to another aspect of the CABAC decoding innovations, when a decoder performs context-adaptive binary arithmetic decoding, the decoder stores the value being decoded along with available stream bits together in a single variable. In a second variable, the decoder stores bit count information about the first variable. The decoder then uses the first and second variables in the context-adaptive binary arithmetic decoding.

In some implementations, the decoder shifts the 9 bits for value to the left of a single variable (e.g., 32-bit word) and puts available stream bits in the other bits of the variable. The decoder performs arithmetic with the left-adjusted integer for the value being decoded, keeping future bits to be decoded on the right side of the same term. This saves single-bit loading, shifting and masking instructions that existed in the original implementations of the reference pseudocode (2100). The value being decoded can be kept as the top x bits in a word (e.g., top 9 bits), with the rest of the word available for storing stream bits as they would otherwise be stored in DBuffer or the bit stream. For a 32-bit word (or 64-bit word), this leaves 23 (or 55) bit positions available.

For example, the decoder loads a word into the single variable directly from the bit stream. The top 9 bits are the value being decoded. When the value is updated, the single variable is bit shifted such that one or more bits of the value decoded are shifted out, and one or more available stream bits—previously to the right of the top 9 bits—in the single variable are shifted into the value being decoded. The decoder thus avoids time-consuming mask, shift and load instructions for bitwise updates to the value being decoded. Once every half-word of data (or at some other interval), the decoder reloads bits off of the bit stream into the single variable (e.g., into the lower half-word of bits in the single variable). The decoder thus uses two variables, which can be labeled value (the single variable for the value being decoded and some available stream bits) and Dbits_to_go (which tracks when there are no longer 9 stream bits available at the left part of the single variable). Compared to the reference pseudocode (2100), the variable DBuffer is not needed, which is an added efficiency gain.

C. Lookup Tables for Shift Amount.

In the reference pseudocode listing (2100) shown in FIG. 21, a loop in the renormalization stage includes conditional execution branches. Specifically, in a while loop the decoder checks a condition and left-shifts value and range one bit at a time. The value being decoded is also updated with new bits from the stream, one bit at a time, as needed. The point of the loop is to left-shift both value and range so that the top bit of range is a 1, and so that Value contains the current 9 bits off the stream that are being decoded.

According to another aspect of the CABAC decoding innovations, during renormalization in context-adaptive binary arithmetic decoding, a decoder determines a multiplication amount (e.g., based on a lookup of range in a table) and multiplies range by the multiplication amount (e.g., left shifting range by a left shift amount corresponding to the multiplication amount). The decoder can then also multiply value by the multiplication amount (e.g., by left shifting). This can eliminate performance penalty of the while loop and conditional execution branches in the renormalization, instead providing a simple, fast, and small footprint mechanism for renormalization.

In some architectures, multiplications are costly operations and shifts are not, so the decoder looks up shift amounts and performs left shifts. In other architectures, integer multiplications are not costly, and the decoder looks up multiplication amounts.

Figure 22A:
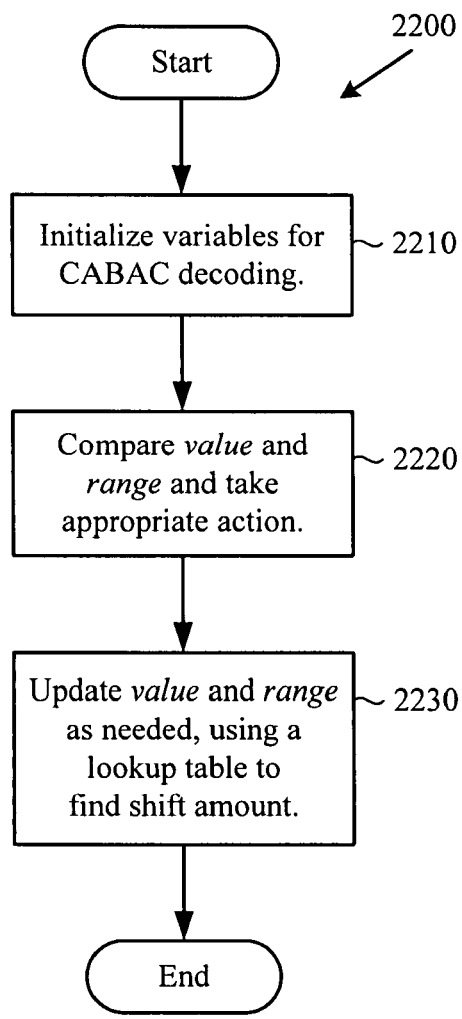
FIGS. 22a, 22b, 23 and 24 are flowcharts for context-adaptive binary arithmetic decoding innovations.

FIG. 22a shows a technique (2200) for performing context-adaptive binary arithmetic decoding with a range lookup table for dynamic shift amounts. A decoder such as the one described above with reference to FIG. 2 or other decoder performs the technique (2200).

To start, the decoder initializes (2210) variables for the context-adaptive binary arithmetic decoding, for example, initializing variables as shown in the reference pseudocode listing (2100) of FIG. 21. The decoder then compares (2220) value and range and takes an appropriate action, for example, setting a state variable and (if appropriate) adjusting range and value as shown in the reference pseudocode listing (2100) of FIG. 21. Then, the decoder (if appropriate) renormalizes (2230) range and adjusts value, using a lookup table that maps different values of range to different shift amounts. The decoder looks up the current range in the table and finds an appropriate dynamic shift amount. The decoder can then shift range and value by the shift amount. The following table shows an example range lookup table.

| Range | Dynamic Shift Amount |
|---|---|
| 1 | 8 |
| 2 | 7 |
| 3 | 7 |
| 4 | 6 |
| ... | |
| 7 | 6 |
| 8 | 5 |
| ... | |
| 15 | 5 |
| 16 | 4 |
| ... | |
| 31 | 4 |
| 32 | 3 |
| ... | |
| 63 | 3 |
| 64 | 2 |
| ... | |
| 127 | 2 |
| 128 | 1 |
| ... | |
| 255 | 1 |
| 256 | 0 |
| ... | |
| 511 | 0 |

Thus, the decoder uses the lookup table (instead of the while loop) and range to determine a dynamic shift amount. The table lookup is fast (no branches) and precise. Moreover, the number of shift operations per call to the core decoding function is reduced to one. The decoder performs one dynamic shift operation of x bits instead of x single-bit shift operations.

In alternative embodiments, the decoder uses multiple lookup tables. For example, the decoder uses a first lookup table for the first n bits (e.g., first 5 bits) of range, which addresses the most common cases for range. The smaller lookup table results in faster lookup operations most of the time. If the range is not in the first lookup table, the decoder uses a second lookup table for the remaining bits of range. Or, the decoder uses more lookup tables.

D. Unrolled Loop Logic.

A range lookup table provides satisfactory performance when dynamic shifts are inexpensive instructions. In some architectures, however, dynamic shifts have a high computational cost.

According to another aspect of the CABAC decoding innovations, a decoder uses unrolled loop logic when determining a shift amount for renormalization. In some implementations, the decoder uses a mixed approach with unrolled loop logic and, in place of some decision branches, a range lookup table. For example, during renormalization in context-adaptive binary arithmetic decoding, a decoder determines a multiplication amount (e.g., shift amount) using unrolled loop logic (and potentially also using a range lookup table). The decoder then multiplies range by the multiplication amount (e.g., by left shifting range). In some implementations, the decoder traverses the unrolled loop logic, checking common cases for range which have associated with them fixed shift amounts for fixed shift operations. If range is not one of the common cases, the decoder looks up range in the lookup table to determine a dynamic shift amount.

Figure 22B:
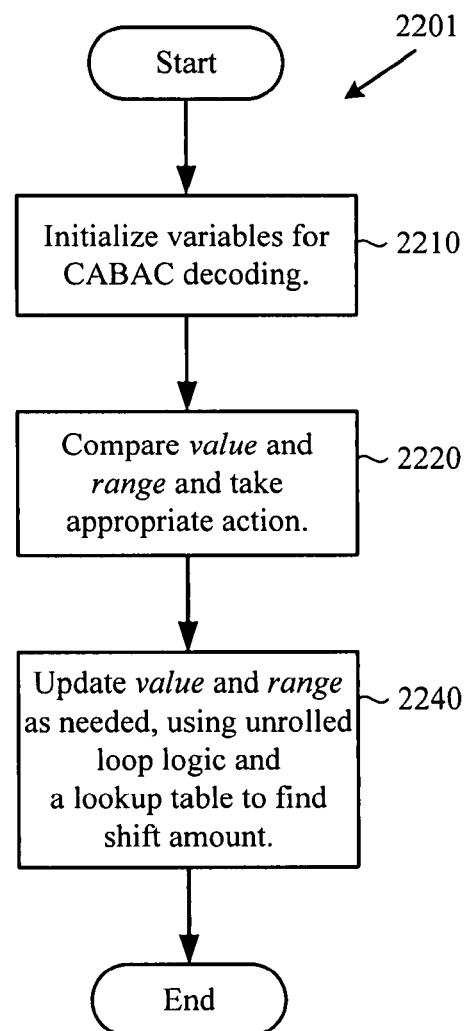

FIG. 22b shows a technique (2201) for performing context-adaptive binary arithmetic decoding with unrolled loop logic (and potentially a range lookup table) for shift amounts. A decoder such as the one described above with reference to FIG. 2 or other decoder performs the technique (2201).

To start, the decoder initializes (2210) variables for the context-adaptive binary arithmetic decoding, for example, initializing variables as shown in the reference pseudocode listing (2100) of FIG. 21. The decoder then compares (2220) value and range and takes an appropriate action, for example, setting a state variable and (if appropriate) adjusting range and value as shown in the reference pseudocode listing (2100) of FIG. 21. Then, the decoder (if appropriate) renormalizes (2240) range and adjusts value, using unrolled loop logic (and potentially a lookup table) that maps different values of range to different shift amounts. The decoder traverses the unrolled loop logic, checking various common cases for the current range to find an appropriate shift amount. The decoder can then shift range and value by the shift amount. If the current range is not one of the common cases and uncommon cases are addressed with a lookup table, the decoder looks up the range in the table.

In some implementations, the loop logic for the renormalization stage is at least partially unrolled and goto statements are inserted as needed to break out of the unrolled loop. In particular, the unrolled loop logic is structured (e.g., as a cascade of if/then statements or as a case statement) to exploit a nearly uniform probability distribution that CABAC produces in the respective bits of range in many coding scenarios. The range is represented as a 9-bit number, and the renormalization effectively shifts the range as needed to make range have a top bit of 1. Within range, there is a near uniform expected distribution of 1s and 0s, and each bit essentially has a 50% chance of being a 1. With this probability distribution pattern, about 50% of the time the top bit is 1 and there is no shift. Zero is the most common shift value. If the top bit is 0 (which happens about 50% of the time), the next bit is 1 about half that time (25%) and there is a shift of 1. Similarly, there is a shift of 2 about 12.5% of the time, and a shift by 3 about 6.25% of the time. More generally, there is a shift by n bits about $\frac{1}{2}^n$ of the time.

In practice, the actual probability distribution is rarely exactly uniform. The range is not allowed to be 0, and the shift is never by more than 7 bits at a time. The general distribution allows for design of efficient, partially unrolled loop logic addressing common cases (e.g., 97% of the time the shift will be 4 bits or less). The remaining cases can be addressed with a range lookup table indicating dynamic shift amounts. Mis-predicted branches are expensive, so after 4 mis-predicts the cost of the dynamic shift is more acceptable.

E. State Machines for Decision Trees.

The functions that call the core decoding function represented in FIG. 21 conventionally have complicated conditional logic around calls to the core decoding function. The complicated logic in the calling functions often results in cache misses and other performance inefficiencies due to lack of compact code.

According to another aspect of the CABAC decoding innovations, a decoder uses one or more state machines that call a core decoding function for context-adaptive binary arithmetic decoding. A state machine implements, for example, a cascade of conditional logic for a particular decoding function. In some implementations, a state machine uses a position state to effectively track position in the cases of conditional logic, and it uses a transition table to switch between states. For example, the transition table indicates a next state based at least in part upon a current state and results of a call to the core decoding function.

Figure 23:
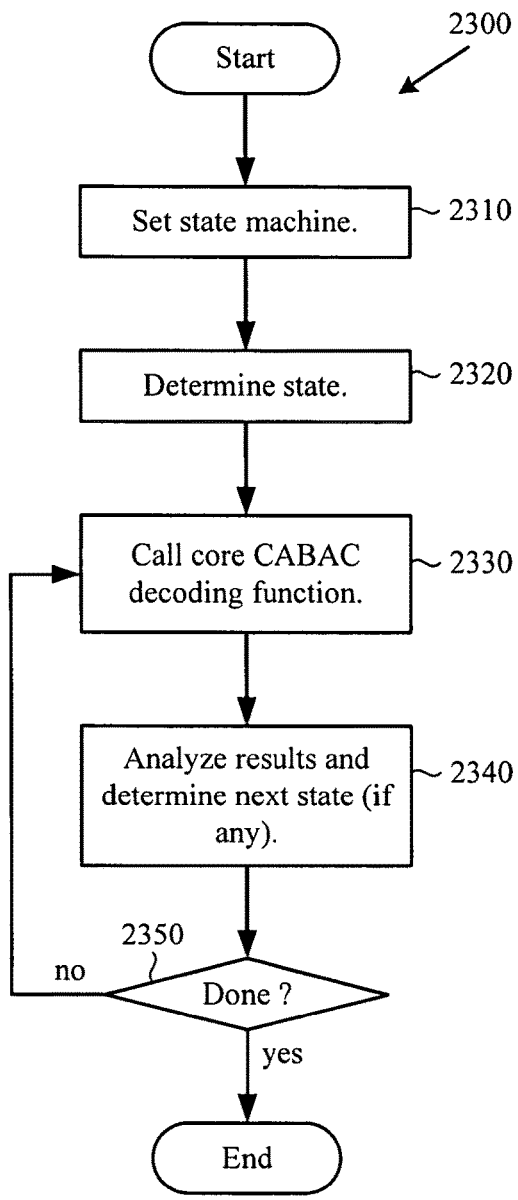

FIG. 23 shows a technique (2300) for performing context-adaptive binary arithmetic decoding using a state machine that implements a calling function. A decoder such as the one described above with reference to FIG. 2 or other decoder performs the technique (2300).

The decoder sets (2310) a state machine for the calling function, initializing it, and determines (2320) a state to be passed to the core decoding function. The decoder calls (2330) the core decoding function (e.g., the function shown in FIG. 21, or a modified version thereof incorporating one or more other CABAC implementations). The decoder then analyzes (2340) results of the core decoding function and determines a next state for CABAC decoding. For example, the decoder uses the current state and results of the core decoding function to determine a next state. The decoder determines (2350) whether or not to continue and, if so, continues by determining the next state, which is then used in calling the core decoding function.

In some implementations, the decoder replaces complicated cascades of conditional logic with straightforward loops in state machines. For a particular state machine, the decoder marks "position" in the cascade that is reflected in the state machine (where the position is effectively the state in the decision tree of the cascade) using a state variable. The state machine can have a two-dimensional transition table that indicates to the decoder a new state based on the current state and the results of the most recent call to the core decoding function. Replacing complicated conditional logic with a state machine typically improves the compactness of code. The branch that remains (the top of the loop) is more reliably predicted. This is especially valuable on processors that show a significant performance penalty for branch mis-predictions. For example, a 50-line cascade of conditional logic with 25 calls to the core decoding function is replaced with a 5-line loop and known number of calls for a state machine, resulting in much more compact code.

Moreover, in some implementations, the size of a state table is reduced by exploiting patterns within the state table. For example, for a state table with x entries, if entries 0 to 3 are the same, entries 4 to 7 are the same, and so on, the decoder masks off those bits and performs state transitions based on the remaining bits in a state table with x/4 entries.

F. Separate Decoding Units for Different Frequency Intervals.

Transform coefficients for motion-compensated prediction residuals tend to have non-zero values as the DC coefficient and low frequency AC coefficients, with higher frequency ranges being characterized by runs of zero-value coefficients. Therefore, transform coefficients are typically scanned according to a scan pattern which orders the coefficients to take advantage of run length coding or run level coding.

According to another aspect of the CABAC decoding innovations, a decoder splits context-adaptive binary arithmetic decoding for frequency coefficients into multiple decoding units, each of the units being adapted for a different frequency interval for the frequency coefficients. For example, the multiple decoding units include a first unit adapted for a low frequency range and a second unit adapted for higher frequency range. Alternatively, the decoder uses more decoding units and frequency ranges. The units call a core decoding function.

The different units differ in the probabilistic expectations incorporated into the logic for the units. For example, for a low frequency unit, code is adapted for the AC coefficients being non-zero. The non-zero cases are the first cases in the decision trees for the code. For a high frequency unit, code is adapted for AC coefficients being zero. These are the first cases in the decision trees for the code. More generally, low cost branches are followed for expected values, and higher cost branches are followed, as needed, when unexpected values are encountered. Splitting CABAC decoding into multiple units results in each unit being more compact and more efficient in processing of calls to the core decoding function.

Figure 24:
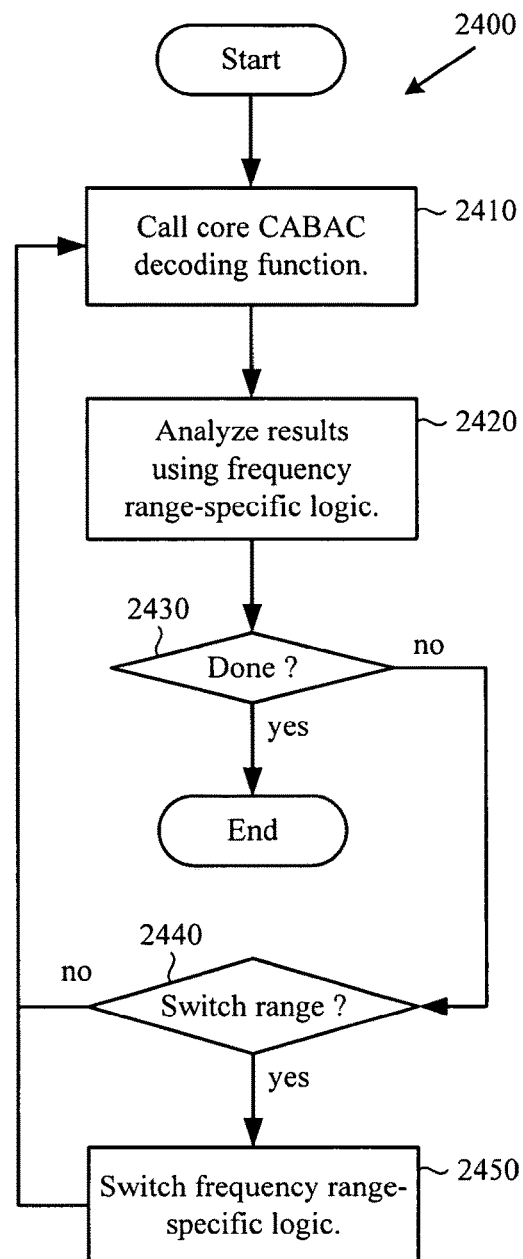

FIG. 24 shows a technique (2400) for performing context-adaptive binary arithmetic decoding split into different units for different frequency ranges of coefficients being decoded. A decoder such as the one described above with reference to FIG. 2 or other decoder performs the technique (2400).

The decoder calls (2410) a core decoding function (e.g., the function shown in FIG. 21, or a modified version thereof incorporating one or more other CABAC implementations) and analyzes (2420) results of the call using frequency range-specific logic. The decoder checks (2430) if it is done and, if not, checks (2440) whether to switch the range-specific logic used in CABAC decoding. If not, the decoder continues by calling (2410) the core decoding function. Otherwise, the decoder switches (2450) the range-specific logic used in CABAC decoding and continues by calling (2410) the core decoding function.

In one implementation, the decoder switches from low frequency coefficient decoding logic to higher frequency coefficient decoding logic after the decoder decodes a DC coefficient and the first three AC coefficients for a block. Alternatively, the decoder switches at a different position and/or dynamically varies the switchover point.

G. Hardware-Specific Optimizations.

In code for one implementation, developers may use preprocessor conditionals, macros and other standard mechanisms to switch between using different CABAC decoding features, and different combinations of CABAC decoding features, for different target architectures. One simple example of this is switching between using a lookup table and not using a lookup table when determining the result of processing a 5-bit input value. The relative speeds of the operations used for table lookups can vary depending on architecture; the decision about whether or not to use lookup tables can be architecture dependent. Moreover, when making such decisions, the primary consideration can be computational speed of decoding, memory footprint, or some combination of the two.

VII. Trick Play Mode Innovations.

Some playback devices provide only a simple playback mode at normal speed, along with controls like play, pause and stop. More advanced playback devices support trick play modes such as fast forward, fast backward (rewind), slow forward, slow backward, and chapter selection. The implementation of these trick play modes can vary from device to device. Chapter selection is typically handled by a parser module in the device. Slow forward mode can be implemented by timestamp management. Other playback modes may use support from the video decoder.

In some embodiments, a decoder supports one or more trick play modes (in addition to a normal play mode) using an innovative trick play mode framework. For example, the decoder supports fast forward and fast backward modes. In normal play mode, the decoder plays back video at the specified frame rate for the video. For fast forward trick play mode, the decoder skips decoding and displaying of selected pictures to achieve fast forward effects, which can allow users to have a quick view of the video. For fast backward trick play mode, the decoder seeks backward in the bit stream and selectively decodes and displays pictures to achieve fast backward effects, which allows users to view the video as it rewinds.

A. Example Frameworks for Playback Mode Transitions.

Figure 25:
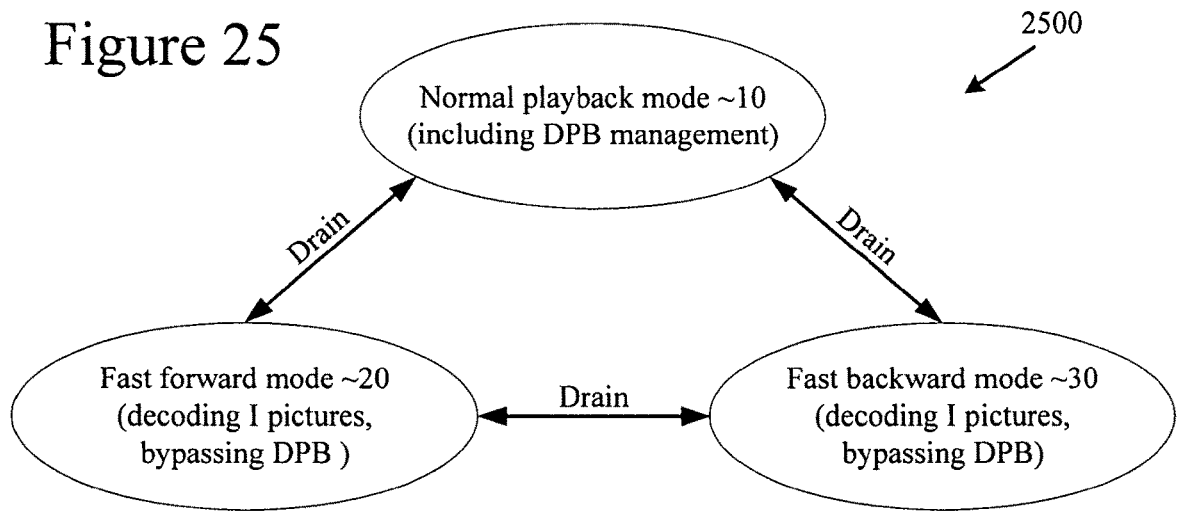
FIG. 25 is a diagram illustrating an example framework for switching between playback modes.

FIG. 25 shows a framework (2500) for playback mode transitions for a decoder that supports normal play mode (2510), fast forward mode (2520) and fast backward mode (2530). In the framework (2500), the decoder can switch from normal play mode (2510) to fast forward mode (2520), play in fast forward mode (2520), then switch back from fast forward mode (2520) to normal play mode (2510). The decoder can also switch between normal play mode (2510) and fast backward mode (2530), or switch between fast forward mode (2520) and fast backward mode (2530).

In the framework (2500) of FIG. 25, the decoder decodes and displays only I pictures in the fast forward mode (2520) and fast backward mode (2530). The I pictures are independently decodable, and their display order is the same as their order in the coded video bit stream. At a basic fast forward (or fast backward) rate, the decoder decodes and displays regularly spaced I pictures in the bit stream. Or, for a different fast forward (or fast backward) rate, the decoder skips the decoding and display of some proportion of I pictures. For example, the decoder decodes/displays alternating, regularly spaced I pictures for 2× fast forward (or fast backward) effect. Or, the decoder decodes/displays every fourth I picture in a series with regularly spaced I pictures for 4× fast forward (or fast backward) effect. The decoder can similarly selectively decode/display pictures for 3×, 8× or other speedup effects.

Figure 26:
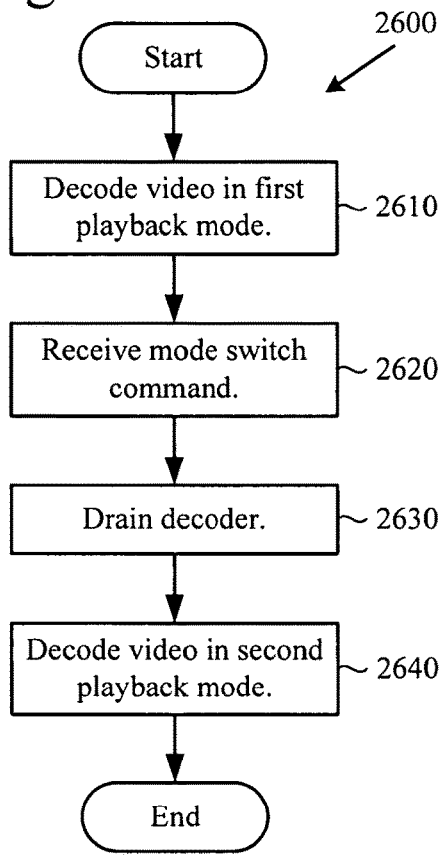
FIG. 26 is a flowchart illustrating a generalized technique for switching between playback modes.

According to the framework (2500) shown in FIG. 25, when the decoder transitions between modes, the decoder "drains" so as to facilitate the transfer. FIG. 26 shows a generalized technique (2600) for switching playback modes. A decoder such as the one described above with reference to FIG. 2 or other decoder performs the technique (2600).

The decoder decodes (2610) video in a first playback mode and receives (2620) a mode switch command. For example, while decoding video in normal play mode, the decoder receives a command to switch to fast forward or fast backward mode. Or, while decoding video in fast forward mode, the decoder receives a command to switch to normal play or fast backward mode. Alternatively, the decoder switches between other and/or different play modes.

The decoder drains (2630) the decoder. This involves using up previously received input, releasing decoder resources, and/or completing in-process tasks. For example, the decoder stops input to the decoder and consumes the input it has previously accepted in the first playback mode. As another example, the decoder releases memory used for decoding in the first playback mode and/or waits for working threads for the first playback mode decoding to complete their processing and rest. In some implementations, the draining is partial in that the decoder maintains resources (e.g., allocated structures, previously decoded pictures) from the first playback mode that can be reused in the second playback mode.

After the decoder at least partially drains (2630), the decoder decodes (2640) video in the second playback mode. Example transition mechanisms and playback mechanisms are now described.

B. Example Playback Mode Transitions.

In some implementations, the decoder switches from normal play mode to fast forward mode as follows. The decoder is drained by not feeding any more bits from the coded video bit stream to the decoder, and letting the decoder decode the data already received in normal play mode. The working threads automatically die when there are no more decoding tasks to perform in the decoder. The decoder is not closed, however, even though the working threads are at rest, so at least some of the memory pools available to the decoder can be used when the decoder starts again. One the working threads are dead or there are no more decoding tasks to perform in the decoder, the decoder restarts the working threads.

The decoder (or a parser outside the decoder) parses new input from the coded video bit stream. When the fast forward mode is implemented by decoding and displaying only I pictures, the decoder gets access units that are used for I pictures. According to the H.264 standard, this includes SPS NALUs, SEI NALUs, PPS NALUs and slice NALUs.

After restarting working threads and accepting access units for the video to be decoded, the decoder finds complete pictures to decode in the fast forward mode. For example, the decoder process NALUs for I slices to find complete I pictures using a PED module such as described above. The decoder then decodes the complete pictures.

When the fast forward mode is implemented by decoding and displaying only I pictures, the decoder can simplify processing by bypassing certain DPB management routines. The decoding order of the I pictures is the same as their output/display order, and I pictures do not use other pictures for reference. Therefore, the decoder need not buffer I pictures in the DPB in the fast forward mode. Decoded I pictures are simply output and deleted. For example, when PED finds a complete I picture, output and delete picture commands are recorded in the picture command queue. Generally, picture commands have corresponding dependent pictures entered in a DPB, and the commands are executed when decoding is completed the respective dependent pictures. In fast forward mode, however, picture commands for I pictures need not have corresponding pictures in a DPB, and DPB management routines can be bypassed. When an I picture is decoded, the output and delete commands for it are executed. Or, the decoder skips the use of the picture command queue and just outputs and deletes the I picture upon completion of decoding.

In some implementations, the decoder switches from fast forward mode to normal play mode as follows. The decoder is drained, finishing decoding for the fast forward mode data. The decoder then starts accepting data from the bit stream in normal play mode and begins decoding. For a transition period, there may be problems decoding and displaying certain types of content. The decoder can use special transition mechanisms to smooth and otherwise improve the quality of playback across the transition.

Macroblocks in some pictures after an I picture in coded/decoding order may reference pictures that were not decoded because they were skipped in the fast forward mode or transition. For example, a B picture (or P picture) after the I picture in coded order can reference a I or P picture before the I picture in presentation order, which is not currently available. If a B picture (or P picture) follows the first I picture in coded order, for example, but references a picture that is non available, the B picture (or P picture) will have corrupted blocks if the decoder attempts to decode it. Rather than attempt to render corrupted blocks, the decoder detects whether a picture being decoded uses any unavailable pictures for reference. If so, the decoder skips decoding and displaying the picture. If another, later picture in coded order uses the skipped picture for reference, the decoder also skips decoding and display of that other picture. B and P pictures having available reference pictures are decoded and displayed as normal.

There may also be P pictures in the coded video bit stream that reference a first I picture but have presentation times before the first I picture. According to the H.264 standard, presentation time stamps ("PTSs") accompany I slice NALUs, and picture display order may be different from coded order for I and P pictures. For such a P picture, the decoder performs backward interpolation using the PTS of the first I picture and the current playback rate.

In some implementations, the decoder switches between normal play mode and fast backward mode using mechanisms analogous to those described for normal play/fast forward mode transitions. When switching to fast backward mode, the decoder drains and starts to input data for fast backward mode, in effect "rewind" seeking through the coded video bit stream. In fast backward mode, the decoder uses mechanisms analogous to those used in fast forward mode, for example, decoding and displaying I pictures, and the decoder can use analogous mechanisms to switch from fast backward mode back to normal play mode.

In some implementations, the decoder switches between trick play modes (e.g., fast forward to fast backward, or vice versa) using analogous mechanisms. For example, when switching, the decoder drains and starts to input data for the other trick play mode.

C. Reducing Delay in Playback Mode Transitions.

Another aspect of the trick play mode innovations is reduction of latency when switching from normal play mode to trick play mode. When switching to a trick play mode, a long delay (e.g., 4-5 seconds) might irritate the user. The decoder uses any of several different mechanisms to reduce delay when transitioning to a trick play mode. Collectively, these mechanisms can significantly reduce delay when switching from normal play mode to a trick play mode (e.g., reducing a 4-5 second delay to a less than 2 second delay).

For one mechanism, when the trick play mode decodes only I pictures, the decoder reduces the amount of time it takes to identify complete I pictures. In some implementations, there is a significant time interval (e.g., 300 ms) between reading the data for different I pictures, due to delays in reading and parsing. The decoder typically identifies (e.g., during PED) the end of a complete I picture after the decoder parses the first slice of the picture following the I picture. According to the first delay-reduction mechanism, however, the decoder receives information from decoder wrapper layer software (e.g., MF pipeline software) that indicates where pictures end and facilitates identification of I pictures. The decoder wrapper layer software might get this information, for example, from extra bit stream delimiters before and after I pictures. The decoder can begin decoding of the complete I picture without waiting for the first slice of the next picture, which reduce overall latency (e.g., saving 300 ms).

According to a second delay-reduction mechanism, the decoder bypasses the DPB for decoded pictures. Instead, decoded pictures are put directly in an output buffer.

According to other delay-reduction mechanisms, the decoder changes system parameters to tune performance for the trick play mode. In the trick play mode, the decoder typically attempts to reduce delay between the completion of decoding and output. So, the decoder can reduce the output buffer size. For example, the decoder reduces the output buffer size from 8 pictures to 2 pictures. The decoder can also reduce the maximum number of pictures in flight during multithreaded decoding.

Figure 27:
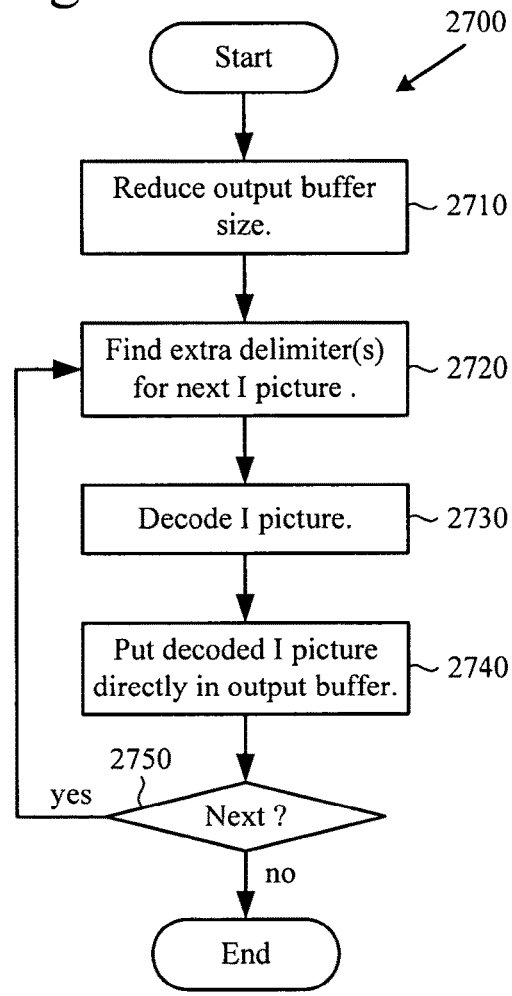
FIG. 27 is a flowchart illustrating a generalized technique for reduced-latency switching to a trick play mode.

FIG. 27 shows a generalized technique (2700) for reduced-latency switching to a trick play mode. A decoder such as the one described above with reference to FIG. 2 or other decoder performs the technique (2700).

The decoder reduces (2710) output buffer size. For example, the decoder changes the output buffer to hold 2 pictures instead of 8 pictures, which speeds up the processes of writing to and reading from the buffer. When finding an I picture to display, the decoder uses (2720) extra delimiters in the bit stream to find complete I pictures faster. The decoder then decodes (2730) the complete I picture and puts (2740) the decoded I picture directly in the output buffer, skipping the DPB. The decoder determines (2750) whether to continue and, if so, continues by finding (2720) the next I picture. Alternatively, the decoder uses other and/or additional mechanisms to reduce latency when switching to a trick play mode.

VIII. Innovations in Recovery Using Picture Dropping.

Many video decoders drop pictures in stress conditions such as those occurring when a decoder falls behind during real-time decoding. Software decoders, in particular, usually support picture dropping since the software may be used on hardware configurations of varying capabilities, including hardware configurations likely to encounter stress conditions during decoding.

In decoders operating according to some standards (e.g., MPEG1, MPEG2), simple picture dropping strategies select pictures to drop based on picture type. In such standards, picture dependencies tend to be simpler and short term. Typically, P pictures depend on I pictures or other P pictures, and B pictures depend on I pictures and/or P pictures but not on other B pictures. Moreover, the reference pictures used for a given P or B picture are implied or selected from very limited set of available pictures. According to one simple picture dropping strategy, a decoder drops B pictures to reduce decoding complexity when the decoder falls behind in real-time decoding.

On the other hand, in decoders operating according to other standards (e.g., H.264), simple picture dropping strategies may be inadequate. The H.264 standard allows complex picture dependencies. An 8×8 block in a picture can use up to two different reference pictures, and the picture collectively can use up to 16 frames in a DPB as reference pictures. Moreover, the H.264 standard also allows extensive temporal prediction support. The H.264 standard recognizes two kinds of reference pictures, long term and short term. Long term reference pictures can be stored in a DPB and used as reference pictures indefinitely (or at least until explicitly removed from the DPB by changing how flags for the long term reference pictures are marked).

A. Example Frameworks for Switching Picture Dropping Modes.

In some embodiments, a decoder uses picture dropping schemes that work for bit streams with complex reference picture dependencies and/or work for multithreaded decoding.

Figure 28:
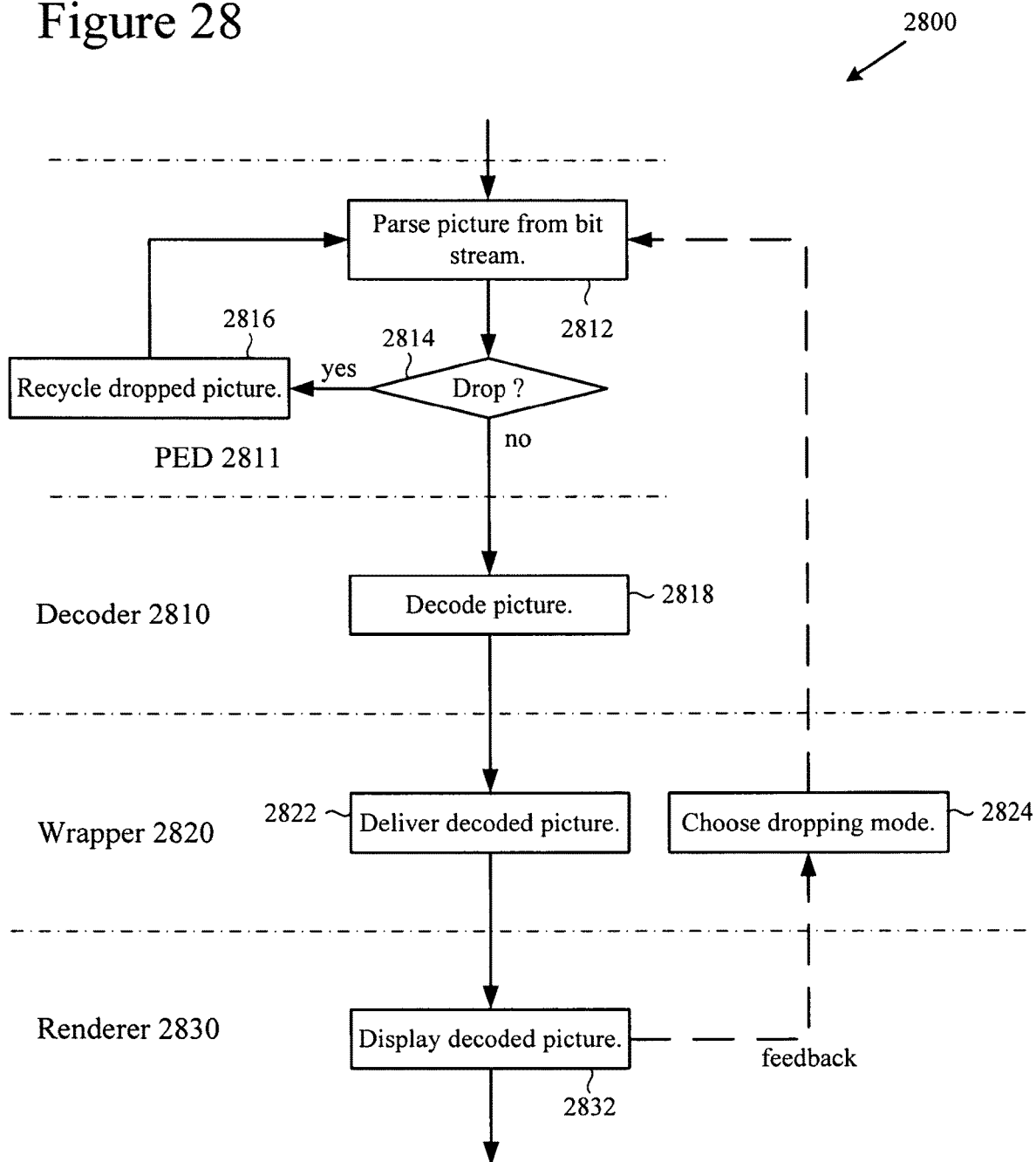
FIG. 28 is a diagram illustrating layers of software implementing an example picture dropping approach.

FIG. 28 illustrates a software architecture (2800) for an example picture dropping approach. The architecture (2800) includes a decoder (2810), wrapper software (2820), and a renderer (2830). The decoder (2810) can include a PED module (2811) as well as other decoding modules. FIG. 28 shows a processing path for a single picture. In practice, the decoder traverses the path on a picture-by-picture basis.

In the architecture (2800), the decoder (2810) (e.g., PED module (2811)) parses (2812) a picture from a coded video bit stream. For example, the PED module (2811) finds a complete picture as described above using a lightweight scan through the bit stream, initializing structures for the parameters and data for the picture and entering an initialized picture into the DPB. Alternatively, the decoder finds the picture in some other way.

The decoder also determines (2814) whether to drop the picture. In FIG. 28, the PED module (2811) receives a control signal that indicates a picture dropping mode, and the PED module (2811) determines whether to drop the picture according to the picture dropping mode. Example picture dropping modes (including no picture dropping) are described below. Alternatively, the decoder uses other and/or additional picture dropping modes.

If the picture is dropped, the decoder recycles (2816) the dropped picture. For example, the decoder releases memory used for at least some of the structures initialized for decoding the dropped picture. Dropping a picture may cause one or more other pictures to get dropped, if those other pictures are dependent on the first dropped picture.

If the picture is not dropped, the decoder decodes (2818) the picture. In the wrapper (2820), which may provided by DirectShow or Media Foundation Transform software, the decoded picture is delivered (2822) to the renderer (2830), which displays (2832) the decoded picture.

The renderer (2830) and wrapper (2820) software also cooperate to provide feedback to the decoder (2810) for selection of a picture dropping mode. For example, decoder wrapper software (in a decoder DLL along with the decoder) checks timestamps in an output pipeline and, over time, tracks whether the decoder's output rate is keeping up with the desired presentation rate. The decoder wrapper instructs the decoder about how late pictures are being output by the decoder (e.g., with messages that the decoder is not late, 50 ms late, 100 ms late, etc.). Alternatively, the decoder receives feedback or measures progress using another mechanism.

When decoding and/or rendering speed does not support the required display/output speed, the decoder starts to drop pictures. Depending on how slow the decoding and/or rendering speed is (e.g., how late pictures are being delivered to the renderer), different picture dropping schemes can be selected. The decoder does not decode dropped pictures, so the decoder tends to catch up to the display/output speed (or, equivalently, catch up to the render clock) when pictures are dropped. More aggressive picture dropping schemes more quickly help the decoder catch up, but do so at a higher cost to temporal quality. Less aggressive picture dropping schemes have a smaller quality penalty but do not help the decoder catch up as quickly. As a theoretically matter, the decoder balances the goals of minimizing the quality penalty for frame dropping and trying to make the decoder return to normal speed playback as soon as possible.

B. Example Picture Dropping Mode Switching Techniques.

Figure 29:
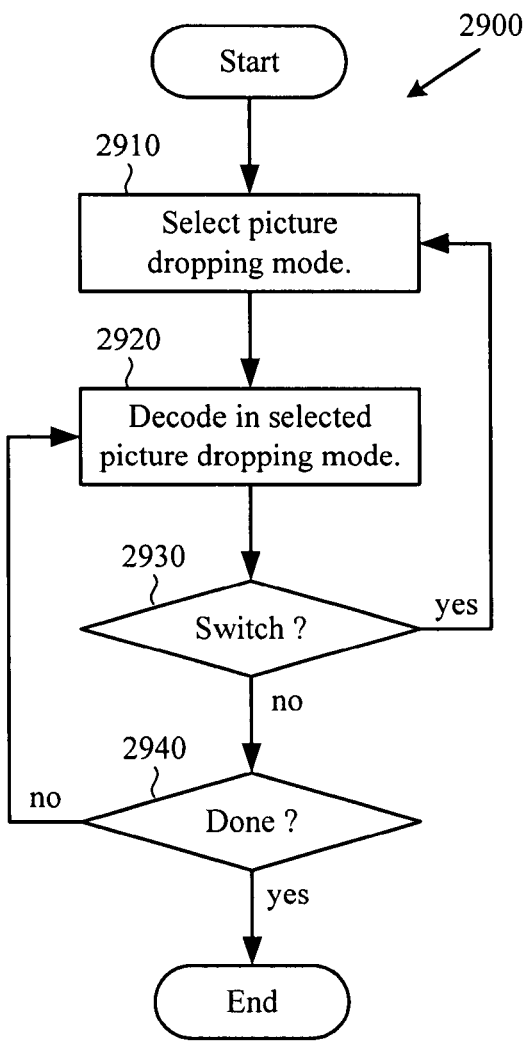
FIG. 29 is a flowchart illustrating a generalized technique for switching picture dropping modes during playback.

FIG. 29 shows a generalized technique (2900) for switching picture dropping modes. A decoder such as the one described above with reference to FIG. 2 or other decoder performs the technique (2900).

The decoder selects (2910) a picture dropping mode and decodes (2920) in the selected picture dropping mode. Initially, the decoder can select a "no dropping" mode. The decoder continues decoding for a fixed number of pictures in the selected mode. Alternatively, the decoder continues decoding indefinitely until interrupted by a control signal or the end of the bit stream.

Eventually, the decoder determines (2930) whether to switch modes. For example, the decoder receives a control signal and decides whether to change picture dropping mode to another mode indicated by the control signal. Or, the control signal indicates a latency value or other metric, and the decoder switches selects the picture dropping mode based upon the control signal, more aggressively dropping pictures as needed. The decoder can gradually switch modes from less aggressive to more aggressive, for example, switching one mode at a time, or the decoder can switch in proportion to the extent the decoder needs to catch up. Alternatively, the decoder makes the switching decision in some other way.

If the decoder decides to continue but switch picture dropping modes, the decoder selects (2910) the new picture dropping mode. Otherwise, the decoder determines (2940) whether to continue at all. If the decoder decides to continue in the same picture dropping mode, the decoder decodes (2920) more video in the same picture dropping mode.

C. Example Picture Dropping Modes.

In some implementations, the decoder selects from among the following available picture dropping modes. Alternatively, the decoder selects from among other and/or additional picture dropping modes.

In "no dropping" mode, the decoder does not drop any pictures. If decoding speed is fast enough, the decoder does not drop any pictures; it tries to decode and display all of the pictures.

The decoder may tolerate some consistent amount of delay. In view of the long latency between the start of decoding of a picture and the sending the decoded picture to render, the decoder may keep output pictures in a circular buffer. When the output circular buffer is initially filled, the decoder sends decoded pictures as output for display. Keeping pictures in the output circular buffer can improve the user experience by ironing out short term variations between decoding speed and output/display speed.

In "drop non-reference pictures" mode, the decoder drops pictures that are not used as reference pictures. If decoding speed is slower than required, the "drop non-referenced pictures" mode provides a gradual way to start dropping pictures. An H.264 decoder can use information in the coded video bit stream for a picture/slice to determine whether or not the picture/slice is used for reference. For example, after the decoder parses the data/NALU for the picture/slice, the decoder evaluates the used_for_reference flag for the picture/slice and drops the picture/slice if used_for_reference is false. For a picture that includes multiple slices, the picture is not used for reference if none of the multiple slices is used for reference.

Figure 30:
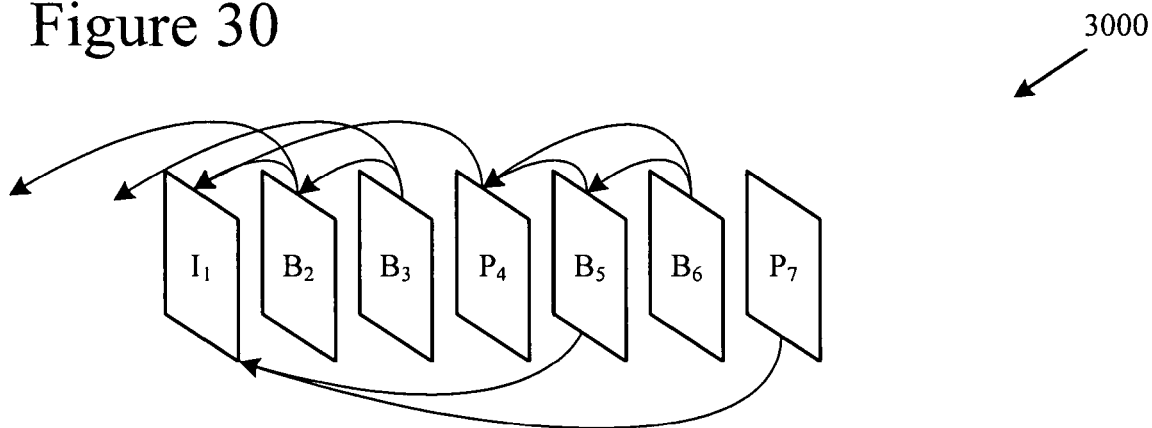
FIG. 30 is a diagram illustrating dependencies for an example group of pictures.

In "drop B pictures and dependents" mode, the decoder drops B pictures as well as pictures that depend on the B pictures for reference. For example, if the decoding speed in "drop non-reference pictures" mode still does not catch up to the desired output/display speed, the decoder drops B pictures and their dependents. For an H.264 decoder, a B picture is a picture where all of the slices in the picture are B slices, and a B picture-dependent picture uses at least one B picture as reference. In most coding scenarios, B pictures are rarely used as references for other pictures. B pictures are common, however, for patterns such as the group of pictures (3000) shown in FIG. 30. Thus, dropping B pictures and their dependents more aggressively helps the decoding sped catch up to the output/display speed.

In "drop P pictures and dependents" mode, the decoder drops P pictures as well as pictures that depend on the P pictures for reference. For example, if, after trying the "drop B pictures and dependents" mode, the decoding speed is still too slow, the decoder drops P pictures and their dependents. For an H.264 decoder, a P picture is a picture where all of the slices in the picture are P slices, and a P picture-dependent picture uses at least one P picture as reference. In typical coding scenarios, P pictures and their dependents are common, and many pictures are usually dropped in this mode.

In "I pictures only" mode, the decoder decodes only I pictures and drops all other pictures. For an H.264 decoder, an I picture is a picture where all of the slices in the picture are I slices. In typical coding scenarios, I pictures occur periodically (e.g., every 12 or 15 pictures), and many pictures are dropped in this mode.

Finally, in an "IDR pictures only" mode, the decoder only decodes I pictures that are also IDR pictures, and the decoder drops non-IDR pictures. For an H.264 decoder, an IDR picture is a special I picture that effectively acts as the beginning of a new sequence. When the decoder encounters an IDR picture (e.g., from the flag idr_flag), it signals to the decoder that none of the previously decoded pictures is used as a reference picture going forward. In some coding scenarios, an IDR picture appears every 5 seconds. In other coding scenarios, however, IDR pictures are not used.

D. Example Dependency Tracking for Picture Dropping Decisions.

In some implementations, a decoder creates a dependency tracking structure (e.g., a task dependency graph) to track reference relationships for picture dropping schemes. For example, the decoder uses a task dependency graph that associates decoding stages with segments of video for nodes and tracks dependencies between the decoding stages for the segments. Some of the tracked dependencies indicate reference picture relationships. Alternatively, the decoder uses another type of dependency tracking structure.

The decoder uses the dependency tracking structure for some types of picture dropping decisions. In the "drop B pictures and dependents" mode (or "drop P pictures and dependents" mode), the decoder identifies pictures that use B (or P) pictures as reference pictures. When a decoder builds a dependency tracking structure, dropped B pictures (or P pictures) are marked as skipped or dropped in the tracking structure, and the decoder propagates the skipped/dropped status to pictures that would otherwise attempt to use a dropped picture as a reference picture. The decoder skips decoding of dropped/skipped pictures, but decodes and outputs other pictures.

E. Using DPB in Picture Dropping Modes.

According to another aspect of the picture dropping innovations, a decoder integrates its picture dropping approach with DPB management. For example, the decoder tracks the pictures in a coded video bit stream, regardless of whether they are eventually decoded or skipped, in a DPB and picture command queue. This helps the decoder maintain proper output timing even when pictures are dropping in different picture dropping modes.

Figure 31:
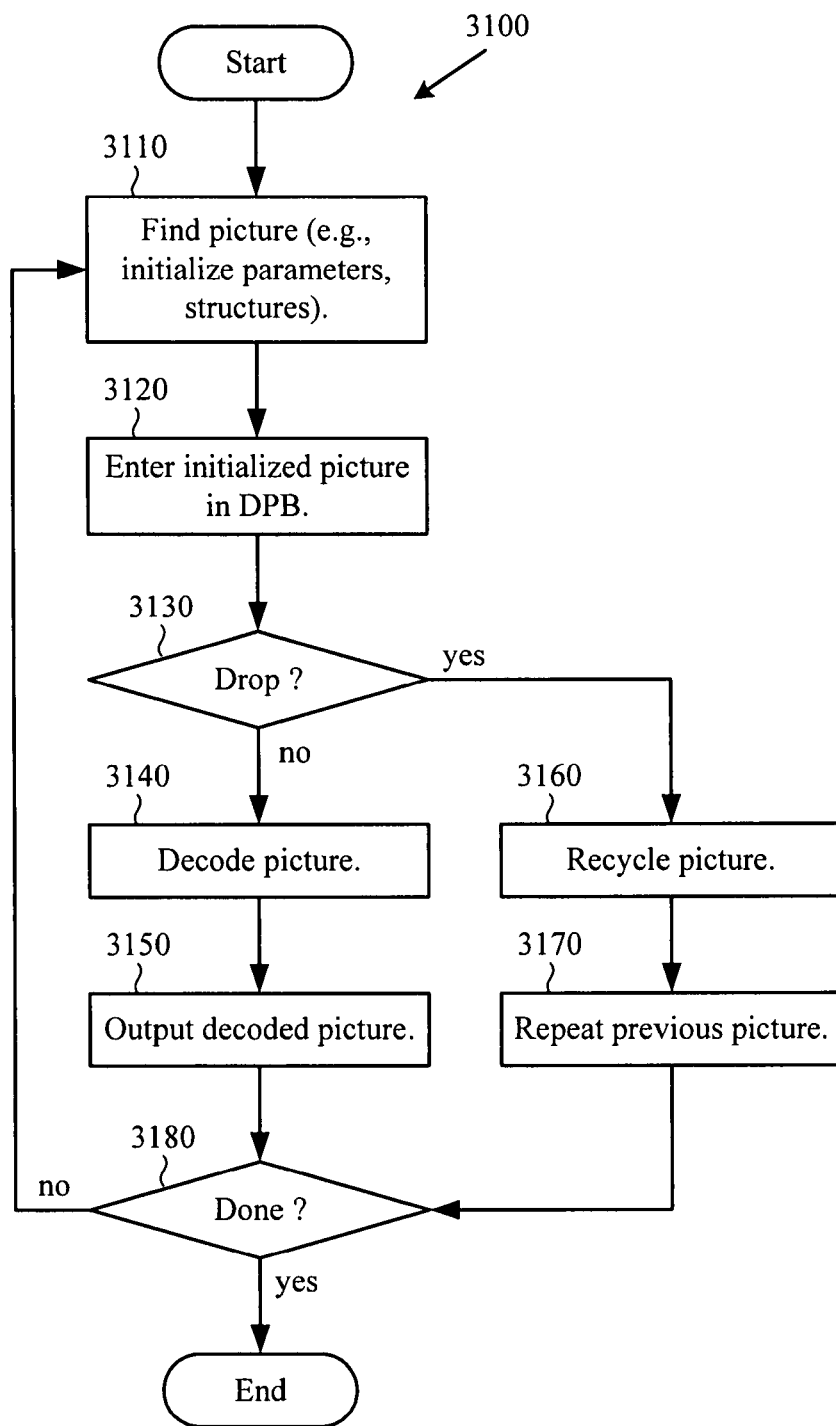
FIG. 31 is a flowchart illustrating a generalized technique for managing a DPB while selectively dropping pictures.

FIG. 31 shows a generalized technique (3100) for managing a DPB while selectively dropping pictures. A decoder such as the one described above with reference to FIG. 2 or other decoder performs the technique (3100).

During decoding (e.g., during PED), the decoder finds (3110) a complete picture and enters (3120) the initialized picture in a DPB. For example, the decoder parses the coded video bit stream for parameters for the picture, initializes structures for the parameters and data for the picture, and puts an initialized picture container entry for the picture in the DPB, as described above. The decoder can also put picture command queues associated with the picture in a FIFO queue.

The decoder (e.g., during PED) determines (3130) whether the picture is dropped/skipped or not. If the picture is not skipped/dropped, the decoder decodes (3140) the picture and outputs (3150) the decoded picture. The non-dropped picture is processed as normal during decoding and DPB management, with the non-dropped picture having a regular entry in the DPB.

If the picture is to be skipped or otherwise designated as a dropped picture, the decoder need not decode the picture. The decoder marks the picture as skipped in the DPB and other tracking structures, as needed, and recycles (3160) at least some of the resources allocated to the picture for decoding, so the resources can be reused. For example, the decoder releases temporary memory and structures (e.g., PictureHolder structures) for a skipped picture after the skipped picture is found during PED, but the decoder maintains other structures (e.g., the initialized picture entry in the DPB, a structure holding invalid YUV data) that are still used for DPB management for picture "bumping" and/or output timing, DPB list formulation, and DPB indexing. For output after PED, the skipped/dropped picture is treated is skipped picture are normally treated, for example, by repeating (3170) another, previously decoded picture in place of the skipped picture.

The decoder then determines (3180) whether it should continue with the next picture and, if so, finds (3110) the next picture. For example, after the decoder finishes PED for a skipped picture, the decoder starts PED again for the next picture in the coded video bit stream. To process a long series of skipped pictures, the decoder effectively calls PED again and again until a non-dropped picture is found, at which point the decoder decodes (3140) the non-dropped picture.

Thus, in some implementations, the DPB stores entries for non-dropped decoded pictures as well as entries for dropped/skipped pictures. The DPB maintains entries for pictures regardless of whether the pictures are skipped or not. The decoder performs full PED analysis and recycles resources to improve performance, but also marks dropped pictures as skipped and reserves enough resources to handle dropped pictures as skipped pictures. The decoder does not provide the dropped/skipped pictures to other decoding tasks, since skipped pictures are not decoded.

IX. Innovations in Computing Contextual Information for Direct Mode Macroblocks.

A direct mode macroblock uses information from a corresponding macroblock in a collocated picture when determining which motion vectors to apply in motion compensation. The information from the corresponding macroblock is an example of collocated macroblock information. In many encoding scenarios, more than half of the macroblocks in B slices are direct mode macroblocks, and efficient determination of collocated macroblock information is important to performance.

In some embodiments, a decoder uses one or more mechanisms to improve the efficiency of determining collocated macroblock information. The mechanisms can be used separately or in combination, and several improve performance in multithreaded decoding.

A. Determining Collocated Macroblock Information as Needed.

According to the H.264 standard, a collocated picture is the first picture in a particular reference picture list (namely, LIST1) for a B slice. The H.264 standard provides algorithmic details about finding collocated pictures and computing collocated macroblock information, which includes motion vectors and reference indices for macroblocks, as well as scaling information that applies to macroblocks in a slice. According to the reference software for the H.264 standard, the decoder computes collocated macroblock information for a picture whether or not any direct mode macroblock actually uses the collocated macroblock information from the picture. For example, when a P picture is reconstructed and enters the DPB, the decoder reorders the side information for the picture and makes the side information usable as collocated macroblock information. This is often an inefficient use of resources because not all pictures are used as collocated pictures, and because collocated macroblock information is computed for a picture but the picture may never be used as a collocated picture.

In some embodiments, a decoder computes collocated macroblock information as needed. For example, the decoder computes collocated information (e.g., retrieves and reorders side information) for a picture when the picture is used as a collocated picture. Moreover, the decoder can determine whether or not a macroblock of a B slice is a direct mode macroblock and, if so, compute the collocated macroblock information (e.g., retrieve and reorder side information) in the collocated macroblock accessed by the direct mode macroblock. The decoder thus retrieves collocated macroblock information that the decoder will use for the direct mode macroblocks. Computing collocated macroblock information as needed for a direct mode macroblock potentially saves memory compared to approaches in which collocated macroblock information is computed for an entire picture or slice.

B. Separating Code to Handle Different Cases of Collocated MB Information.

In the H.264 reference software, a single routine addresses all cases of computing collocated macroblock information. The logic depends on many factors, including the format of the current picture (with the B slice including the direct mode macroblock), the format of the collocated picture (with the collocated macroblock), and the direct motion vector prediction mode (spatial motion vector prediction or temporal motion vector prediction, indicated by the slice-level flag direct_spatial_mv_pred_flag). For MBAFF frames, in which macroblocks are organized as macroblock pairs, the logic also depends on the format of the MB pair including the direct mode macroblock (field or frame) and the position of the direct mode macroblock in the MB pair (top or bottom). Given these possibilities, the routine in the H.264 reference software includes too many paths, resulting in too many branches.

In some embodiments, the code that handles different cases for computing collocated macroblock information is separated. When decoding progressive video, for example, the decoder determines which routine to call depending on whether a direct mode macroblock uses spatial motion vector prediction or temporal motion vector prediction. For pictures that can be fields or frames, the code is split into routines optimized for different current picture format/collocated picture format/direct prediction mode cases.

The decoder can select and call routines as needed during decoding to compute collocated macroblock information. For example, the decoder selects and calls an appropriate routine when it identifies a direct mode macroblock in a B slice. The decoder thus avoids unnecessary calculations of collocated macroblock information for a whole collocated picture.

FIG. 32 shows routines for computing collocated macroblock information in PROG and PICAFF code paths in some implementations. The decoder selects a function depending on current picture format (PROG or FIELD), collocated picture format (PROG or FIELD), and direct motion vector prediction mode (spatial or temporal), then calls the selected function. In the PROG code path, the current and collocated pictures are in frame format. So, there are only two collocated macroblock information functions, (1) the current PROG picture refers to a PROG picture as collocated picture and direct mode MBs use spatial motion vector prediction, and (2) the current PROG picture refers to a PROG picture and direct mode MBs use temporal motion vector prediction. Similarly, in the PICAFF code path, there are 6 collocated macroblock information functions covering different permutations.

FIG. 33 shows routines for computing collocated macroblock information in the MBAFF code path in some implementations. The decoder selects a function depending on current picture format (MBAFF or FIELD), current MB pair format (frame or field), position of the direct mode macroblock in the current MB pair (top or bottom), collocated picture format (MBAFF or FIELD), and direct motion vector prediction mode (spatial or temporal). The decoder then calls the selected function. For the MBAFF code path, there are 16 collocated functions handling different permutations of these factors. An X indicates a factor does not change which function is called for some combination of other factors.

Alternatively, the code for computing collocated macroblock information is separated in other and/or different ways to partition the code to handle different cases.

C. Computing Collocated MB Information in Multithreaded Decoding.

When computing collocated macroblock information, the decoder uses side information previously reconstructed for the collocated picture. As such the retrieval of the collocated macroblock information depends on the successful reconstruction of the information for the collocated picture.

In some embodiments, the decoder puts computation of collocated macroblock information in an appropriate stage of the decoding pipeline to improve parallelism for multithreaded decoding. In particular, the decoder separates computation of collocated macroblock information from entropy decoding tasks to facilitate multithreaded decoding. A task in which collocated macroblock information is computed can thus be scheduled separately from ED tasks.

To compute collocated information for a direct mode macroblock in a B slice, an H.264 decoder gets side information (motion vectors, reference indices, etc.) from the first picture in reference picture list LIST1. If the computation of collocated macroblock information is part of an ED task for the B slice, the ED task for the B slice will have a dependency on the ED task for the relevant part of the first picture in LIST1 (which provides the side information for the first picture). Creating dependencies between two ED tasks hurts parallelism, however, since ED tasks usually do not have dependencies between them. As another consideration, an MC task for the B slice uses collocated macroblock information, so it should be computed before the MC task.

In some implementations, computation of collocated macroblock information for a B slice occurs as at the beginning of a MC task for the B slice. The MC task already has a dependency on an LF task (and, indirectly, MC and ED tasks) for the relevant part of the collocated picture.

Figure 34:
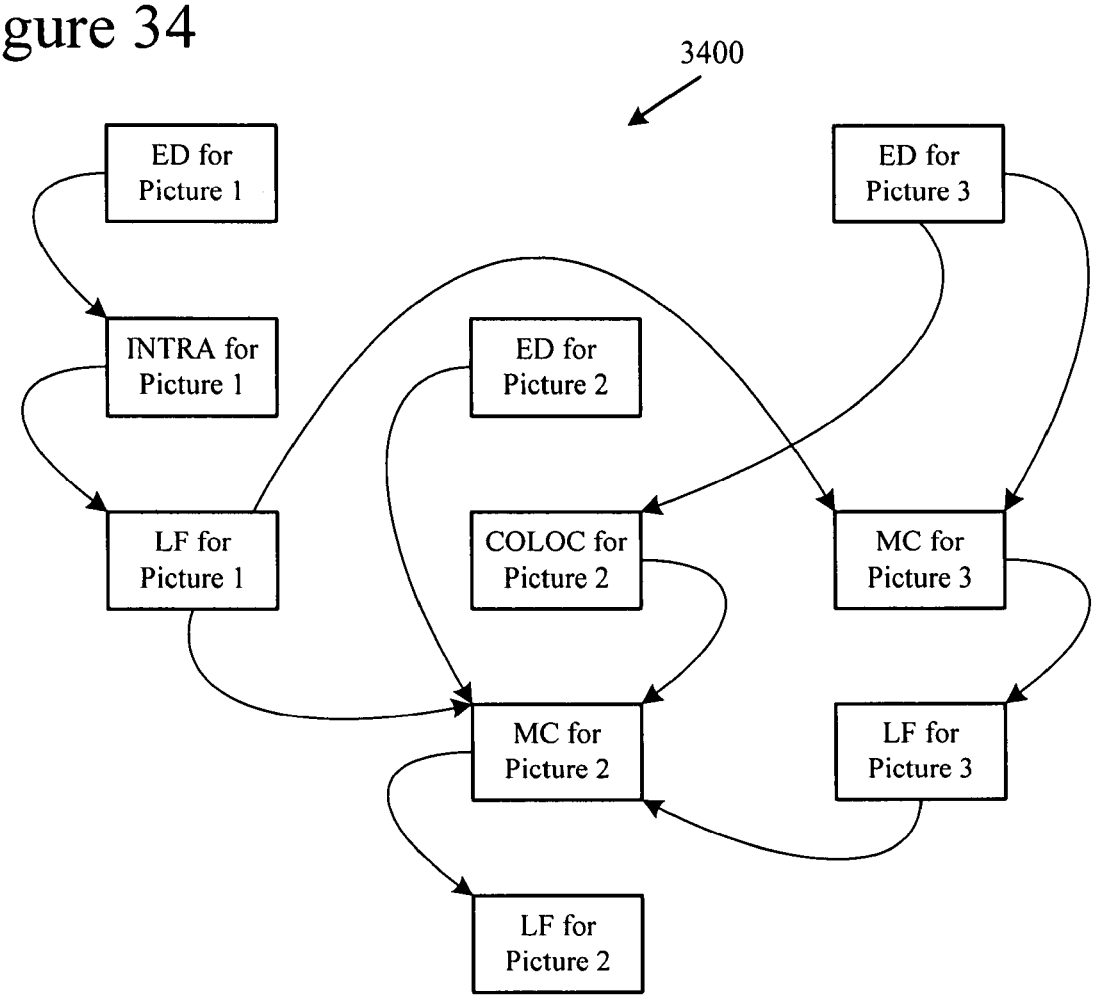
FIG. 34 is a diagram illustrating an example task dependency graph including a task for computing collocated macroblock information.

In other implementations, computation of collocated macroblock information for a B slice occurs as part of a separate task for the B slice. For example, in a GPU architecture, the COLOC task includes computation of collocated side information (e.g., by retrieving side information) and other GPU setup tasks. The COLOC task can be implemented, for example, as part of an MV setup task. FIG. 34 shows an example task dependency graph (3400) that includes tasks for an I picture (picture 1), P picture (picture 3) and B picture (picture 2). In many respects, the task dependency graph (3400) resembles the graph (1000) of FIG. 10. The graph (3400) also includes a COLOC task for picture 2, however, which depends on the ED task for picture 3. If needed, the COLOC task for picture 2 can also depend on the ED task for picture 2. The MC task for picture 2, in turn, depends on the COLOC task for picture 2. More generally, the decoder generates a task dependency graph for segments (which may be pictures) and, in some implementations, separates computation of collocated macroblock information and other GPU setup operations for scheduling as a separate task.

D. Separately Computing Slice-Level and MB-Level Collocated MB Information.

In some embodiments, the decoder separates computation of slice-level collocated macroblock information from computation of macroblock level-collocated macroblock information. This improves performance when multiple direct mode macroblocks use the same slice-level collocated macroblock information.

Figure 35:
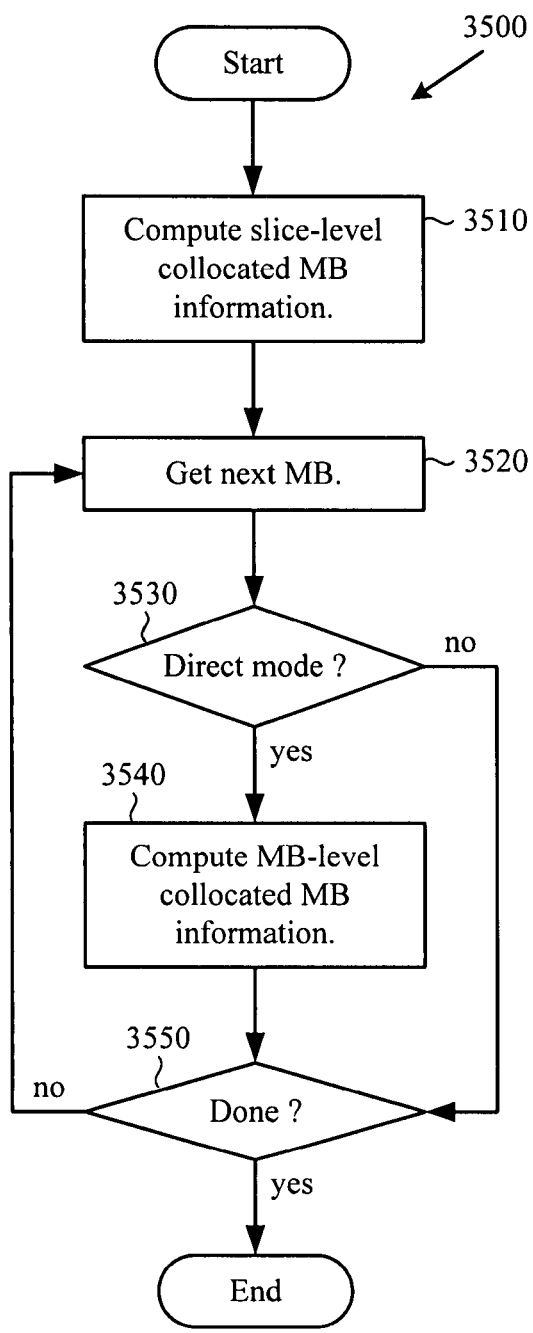
FIG. 35 is a flowchart illustrating a generalized technique for computing slice-level and macroblock-level collocated macroblock information.

FIG. 35 shows a technique (3500) for separately computing slice-level collocated macroblock information and macroblock-level collocated macroblock information. A decoder such as the one described above with reference to FIG. 2 or other decoder performs the technique (3500).

When processing a B slice, the decoder computes (3510) slice-level collocated macroblock information. For example, the decoder retrieves common side information among the direct mode macroblocks of the B slice. The common side information can include motion vector scaling factors, which are the same for the direct mode macroblocks in the slice, and which are used in temporal direct mode. The common side information can also include a field picture selection (which field should be chosen as the collocated picture). Alternatively, the decoder computes other and/or additional slice-level information.

The decoder then computes macroblock-level collocated macroblock information for the direct mode macroblocks in the picture. For example, according to the technique (3500) shown in FIG. 35, the decoder computes such information as needed during decoding. The decoder gets (3520) the next macroblock in the slice. The decoder determines (3530) whether the macroblock is a direct mode macroblock and, if so, computes (3540) macroblock-level collocated macroblock information such as motion vectors and reference indices. The decoder determines (3550) whether there any other macroblocks in the slice and, if so, continues by getting (3520) the next macroblock.

The decoder stores the slice-level collocated macroblock information and macroblock-level collocated macroblock information for use in later decoding.

E. Remapping Reference Picture Indices.

A reference index (ref_idx in H.264) in a slice is an index to a picture in a reference picture list of the slice. In different slices, reference indices with the same value (e.g., 3) may refer to different pictures because the reference picture lists for the different slices can be different. When the decoder retrieves collocated macroblock information for a direct mode macroblock in a B slice, the decoder determines which picture (if any) in the B slice's reference picture list corresponds to the reference picture used for reference by the collocated macroblock that provides the collocated macroblock information.

A "per macroblock" way to find the correct reference picture is to determine a reference picture identifier of the reference picture for the collocated macroblock when computing the collocated macroblock information for a direct mode macroblock. (For example, the decoder determines the reference picture identifier using the reference picture index for the collocated macroblock.) The decoder compares the reference picture identifier with the reference picture identifiers of the pictures in the B slices reference picture list. The decoder stops the comparison when is finds the reference picture used by the collocated macroblock. In the worst case in some implementations, if the size of the reference picture list is $LIST_{size}$, this involves $4 \times LIST_{size}$ 64-bit integer comparisons for each direct mode macroblock. In many scenarios, about 50% of the macroblocks in a B slice are direct mode macroblocks, and performing comparisons for every direct mode macroblock is too computationally intensive.

In some embodiments, on a slice-by-slice basis, the decoder uses remapping techniques to re-enable the reference indices in collocated pictures to reduce computations and save memory. For example, reference indices that refer to reference pictures for a collocated slice (which includes at least one collocated macroblock for a corresponding direct mode macroblock of a B slice) are replaced with reference indices for a B slice that refer to the same reference pictures. The remapped reference picture indices are then stored for use in motion compensation for the direct mode macroblocks.

For example, when the decoder computes collocated macroblock information for a B slice, for each collocated slice in the collocated picture, the decoder remaps the reference indices for the collocated slice in terms of the reference indices for the B slice. For a reference index of the collocated slice, the decoder can do this by (a) finding the corresponding reference picture identifier for the reference picture index of the collocated slice, (b) comparing the reference picture identifier with identifiers for pictures in the B slice's reference picture list, and (c) when a matching reference picture identifier is found in the list, remapping the reference index of the collocated slice to the reference index of the matching reference picture identifier for the B slice (e.g., replacing the reference index of the collocated slice with the corresponding reference index of the B slice). If no match is found, the reference picture index of the collocated slice is invalid for direct mode MB motion compensation.

In some implementations, reference picture list size is limited to a maximum of 16 frame pictures or 32 field pictures. The number of comparisons is thus limited, and the overall number of comparisons is reduced for typical sizes of B slices with expected proportions of direct mode macroblocks.

X. Innovations in Reducing Memory Consumption During Decoding.

Decoding video can consume large amounts of memory resources, especially for multithreaded decoding. In some embodiments, a decoder uses one or more mechanisms to reduce memory consumption during decoding, including:

1. packing entropy decoded transform coefficient levels for efficient buffering;
2. dynamically growing packed buffers that stored entropy decoded transform coefficient levels;
3. pairing field pictures to associate the two field pictures with a piece of frame size memory before decoding them;
4. efficiently allocating GPU memory; and/or
5. efficiently managing memory pools.

A. Packing Entropy Decoding Coefficient Levels.

After entropy decoding, one way to store entropy decoded coefficient levels is to store all coefficient levels, whether zero-value or non-zero-value level, in order in memory. In typical cases, this is inefficient because much storage is spent buffering zero-value levels.

In some embodiments, a decoder "packs" (or "compresses") entropy decoded transform coefficient levels for efficient intermediate storage. This typically reduces the memory consumed storing the entropy decoded coefficient levels for a given picture. The aggregate savings in memory can be dramatic where there are multiple pictures in flight during decoding.

When multiple pictures are in flight, the coefficient levels are kept in packed format until the decoding stage in which the coefficient levels are further processed. In later decoding processes such as inverse scanning, inverse quantization, and inverse transform, the entropy decoded coefficients are unpacked into a less compact representation that is easier to manipulate for those operations. The unpacking can be implemented in conjunction with inverse scanning and/or inverse quantization.

In some implementations, the decoder packs entropy decoded coefficient levels into data structures by storing a block position together with a non-zero level value for each non-zero coefficient level. The decoder packs the block position and non-zero level value into a single multi-bit value to save memory. Arrays of the single multi-bit values stored multiple non-zero coefficient levels for a block, macroblock, or other unit. Non-zero values are not explicitly represented in the intermediate storage. Instead, the zero-value levels are implied at particular block positions where no values are stored for those particular block positions. In typical coding scenarios, in which high frequency coefficients are often zero, this representation can dramatically reduce intermediate storage requirements.

If the single multi-bit value does not include enough bits to store some possible value, the single multi-bit value can include an extension flag that indicates whether an extension value is used for the coefficient level. If an extension value is used, part of the non-zero coefficient level is stored in the single multi-bit value, and the rest is stored in the extension value. To simplify manipulation of the coefficient levels, the extension value can follow the single multi-bit value and have the same size.

With another option, the decoder stores a count value for a block (e.g., 4×4 or 8×8 transform block) that tracks how many non-zero coefficient levels are in the block. The decoder can store the non-zero coefficient count values for the blocks in a macroblock in an auxiliary buffer, together with the count values for blocks of other macroblocks. Using non-zero coefficient count values provides an efficient way to represent zero-value blocks. It also can help the decoder access packed coefficient levels more efficiently by skipping ahead to the start of a particular block. If extension values can be interspersed with other values in the packed data, however, the decoder still traverses the packed data in a coefficient-by-coefficient manner to get the start of a block.

With another option, the decoder sets a flag per macroblock indicating whether extension flags are set for any coefficient levels in the macroblock. If no extension flags are set in the macroblock, no extension values are used, and the decoder can skip checking for extension flags in individual non-zero coefficient levels. The decoder can also make simplifying assumptions about block start locations in the packed data, for example, using counts of non-zero coefficient values for blocks in the macroblock.

Figure 37:
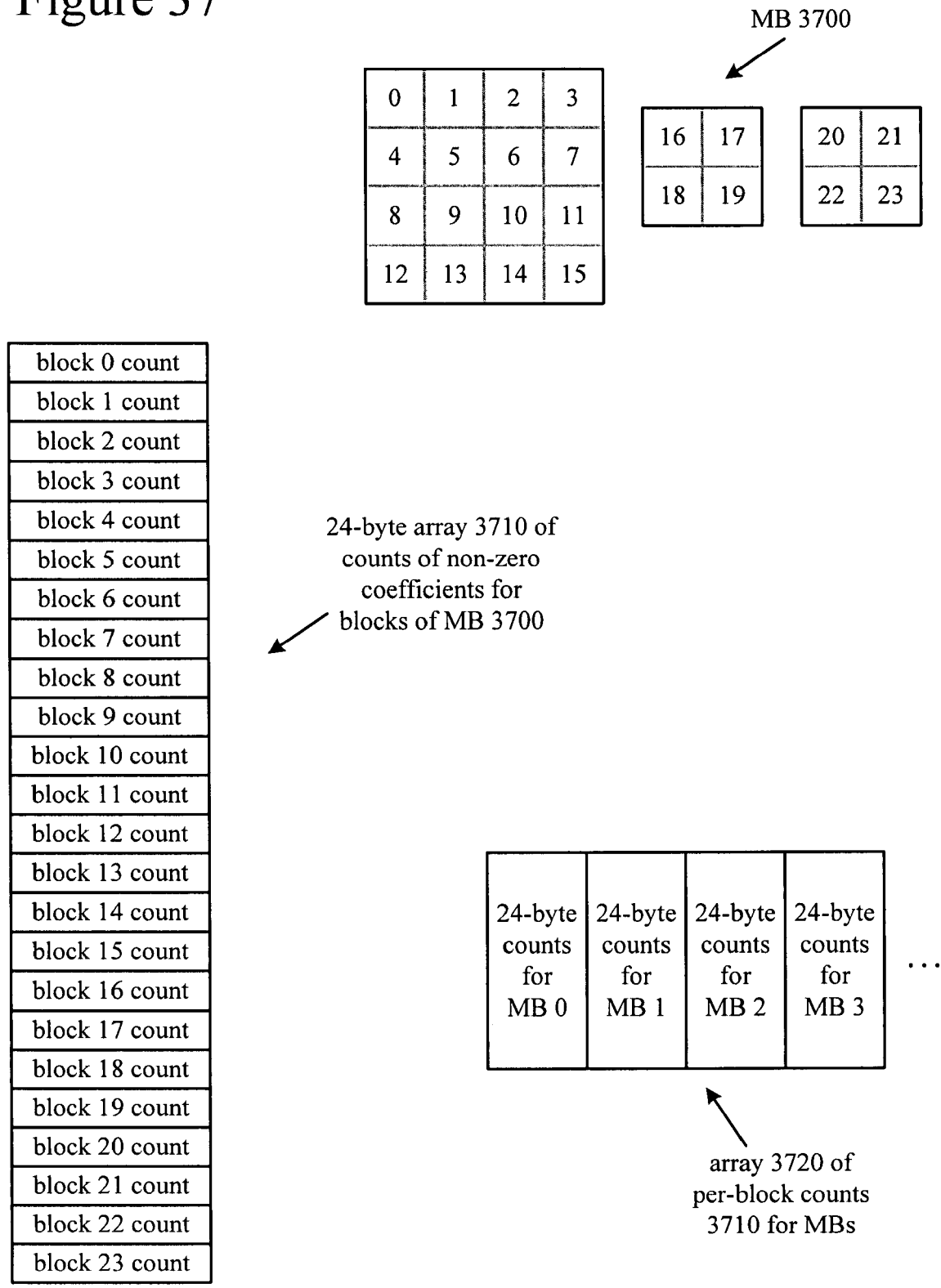

FIGS. 36 and 37 show example data structures for packing entropy decoded coefficient levels. In FIG. 36, the 16-bit short (3600) stores a packed coefficient level for a CABAC decoded transform coefficient level that has a non-zero value. The packed buffer fragment array (3610) is an array of such short values.

The multi-bit value (3600) includes a 6-bit position value, extension flag, and 9-bit non-extended, non-zero value of the coefficient. The lower 6 bits of the value (3600) store the location of the coefficient within a 4×4 or 8×8 block. (Six bits are enough to store the 64 possible location values of an 8×8 block.) The seventh bit is an extension bit that stores a 0 or 1 value indicating whether this coefficient has an extension value. The remaining 9 bits of the value (3600) store the 9 least significant bits of the coefficient level. In case 9 bits are not enough to store the coefficient level, the extension bit is set to 1, and 16 additional bits are used to store the remaining bits required to represent the coefficient value. 16 additional bits may be more than are needed, but using the same number of bits as the value (3600) facilitates representation as an array (3610) of shorts with extension values interspersed as needed.

FIG. 37 shows an auxiliary array (3710) of block count values for the macroblock (3700). A block count values indicates the count of non-zero coefficient levels in a corresponding block of the macroblock (3700). For example, the block 5 count indicates the number of non-zero coefficient levels of 4×4 block 5 in the macroblock (3700). The array (3710) can be implemented as a char buffer. There are a maximum of 24 possible blocks within a macroblock (16 4×4 luma blocks and 8 4×4 chroma blocks, assuming 4:2:0 macroblock format; for 8×8 blocks there are 6 blocks in a macroblock).

An array (3720) of block count auxiliary arrays (such as the array (3710)) stores non-zero coefficient count values for multiple macroblocks. For an entire picture, the auxiliary buffer array (3720) is at least as large as 24×MB_IN_PIC bytes, where MB_IN_PIC is the number of macroblocks in the picture. The auxiliary buffer array (3720) for a picture can be partitioned at the slice/segment-level and navigated to a current location by: current location=auxiliary buffer base location+24*(starting macroblock address of slice/segment). This facilitates access by multiple ED threads to the buffer at the same time.

After CABAC decoding of the coefficient levels within the sub-blocks and blocks of the macroblock (3700) in a given plane (Y, U or V), an additional bit is set to indicate whether any coefficients within the blocks uses an extension value. This flag makes decoding much faster when none of the coefficients uses an extension value.

Using compressed storage as shown in FIGS. 36 and 37 can provide substantial memory savings. These savings are especially important for multithreaded decoding when multiple frames are in flight. For example, for test sequences of high-definition content at 1920×1088 spatial resolution, the storage requirements are cut down from 6 megabytes (uncompressed storage) to about 0.75 megabytes (compressed, packed storage) per picture. A large proportion of this reduction is due to skipping of storage for insignificant, zero-value coefficient levels, which are common. Moreover, in practice, most coefficient levels fit within 9 bits—the use of extensions is rare.

In the worst case, if every coefficient level has a non-zero value and needs an extension, there are 64 non-zero levels per 8×8 block and 64 extension values. The amount of storage used is double the amount used for uncompressed storage. Such situations are extremely rare, but the decoder keeps memory available in case it is needed.

B. Dynamically Growing Packed Buffers.

The amount of intermediate storage needed for packed, decoded coefficient levels varies depending on the complexity of the encoded video as well as bit rate and quality considerations. Allocating enough memory to a handle worst-case situation is wasteful most of the time, when far less memory is actually used.

In some embodiments, a decoder dynamically grows the buffers used to store packed coefficient levels. The decoder fills a buffer fragment, for example, level-after-level for a block, block-after-block for a macroblock, and macroblock-after-macroblock for a segment. The decoder checks for the end of a packed buffer fragment periodically (e.g., by checking every macroblock whether enough space remains for worst-case macroblock storage) or otherwise tracks available space in the fragment. If needed, the decoder adds another buffer fragment to fill.

The decoder can allocate buffers on a slice-by-slice basis. If slices are small and the buffers are mostly unused, however, this is wasteful. Alternatively, the decoder allocates buffers on a picture-by-picture basis, segment-by-segment basis or other basis.

Figure 38:
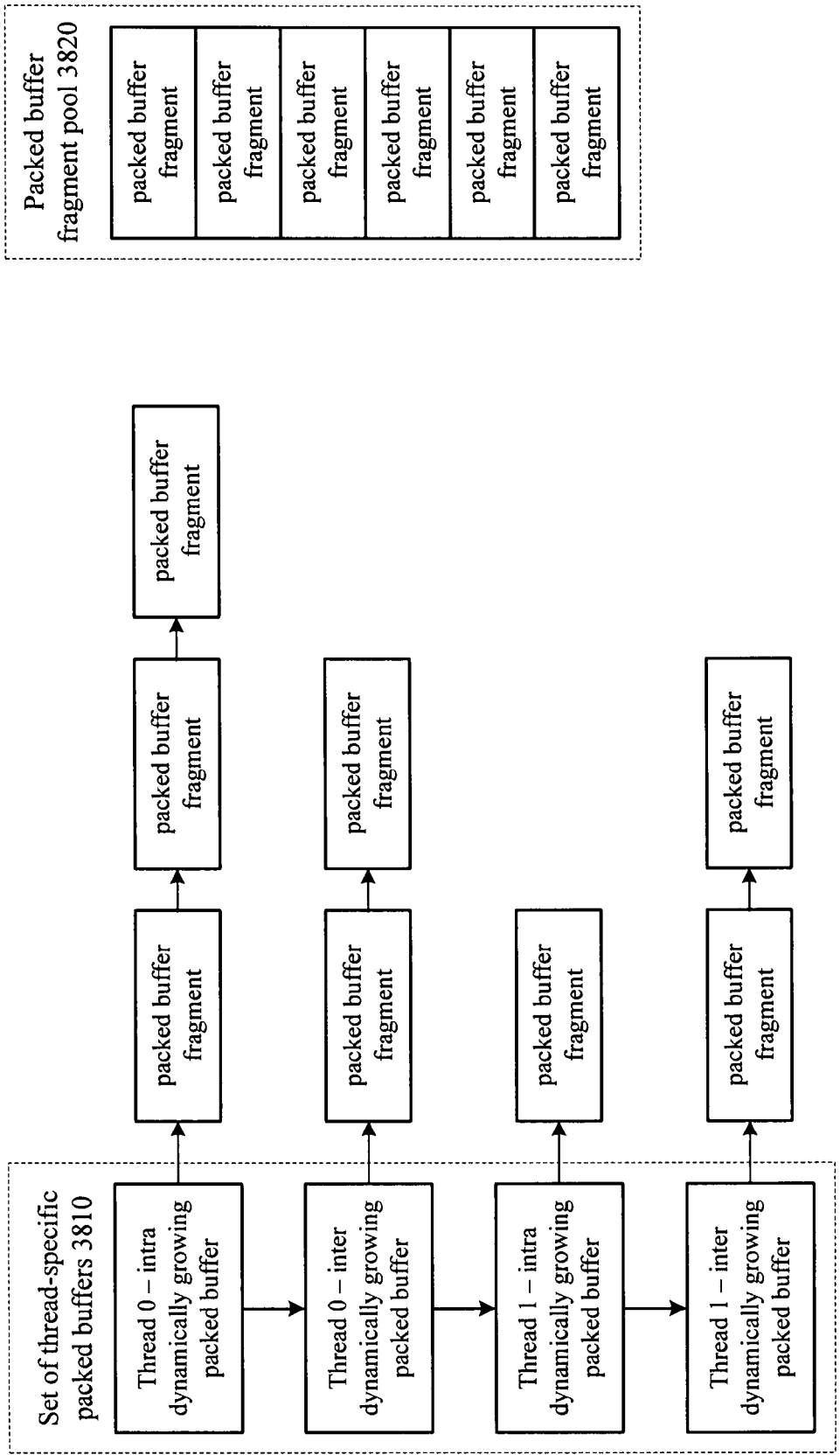
FIG. 38 is a diagram illustrating thread-specific dynamically growing buffers for packed coefficient levels.

FIG. 38 shows an example approach (3800) with a set of thread-specific packed buffers (3810) for segments of a picture and a packed buffer fragment pool (3820). The buffers (3810) handle the storage of packed, compressed coefficient levels for the picture.

The pool (3820) of packed buffer fragments includes fragments such as the fragment array (3610) of FIG. 36, which is an array of "shorts" that store packed coefficient levels. The fragments can all have the same size, or they can have different sizes. In some implementations, the packed buffer fragment size is set so that, in most cases, one fragment is enough to store the coefficient levels decoded in an ED task for a segment.

The pool (3820) includes free fragments available for adding to dynamically growing buffers. For example, packed buffer fragments are allocated from the pool (3820) when necessary. When fragments are freed, they are returned to the pool (3820) so that they can be reused for other packed buffers across multiple pictures.

In FIG. 38, a buffer is implemented as a linked list of buffer fragments from the pool (3820). Separate buffers are created for separate intra and inter passes of decoding. The intra buffer stores intra coefficient levels, and the inter buffer stores inter coefficient levels. Alternatively, a single buffer stores intra coefficient levels and inter coefficient levels.

In a single threaded mode, two packed buffers (1 intra, 1 inter) per picture store the coefficient levels. In multi-threaded mode, the decoder may decode multiple segments in a picture in parallel. So, the set of buffers (3810) includes two packed buffers (1 intra, 1 inter) associated with each of multiple worker threads. During an ED task, for example, a thread writes only to the buffers associated with it. For other decoding tasks (e.g., MC, INTRA, LF), multiple threads may read from a single buffer.

Using thread-specific packed buffers helps delimit different portions of a packed buffer for different slices in a picture in advance, without wasting storage as could easily be the case with slice-specific buffers. Using separate thread-specific packed buffers for segments also facilitates segment-level multithreading. The number of threads is smaller than the number of possible slices; organizing buffers in a thread-specific manner gives an upper bound on the number of buffers that are used.

C. Pairing Field Pictures in Frame Memory Buffers

In H.264 reference model software, when a decoder splits a decoded frame picture into field pictures (e.g., to use in later decoding of other pictures), the decoder allocates memory for the two split field pictures and performs expensive memory copy operations. This is an inefficient use of memory. A similar problem occurs when two decoded field pictures are combined into a single frame picture for output by allocating memory for the frame picture and performing expensive memory copy operations.

Figure 39:
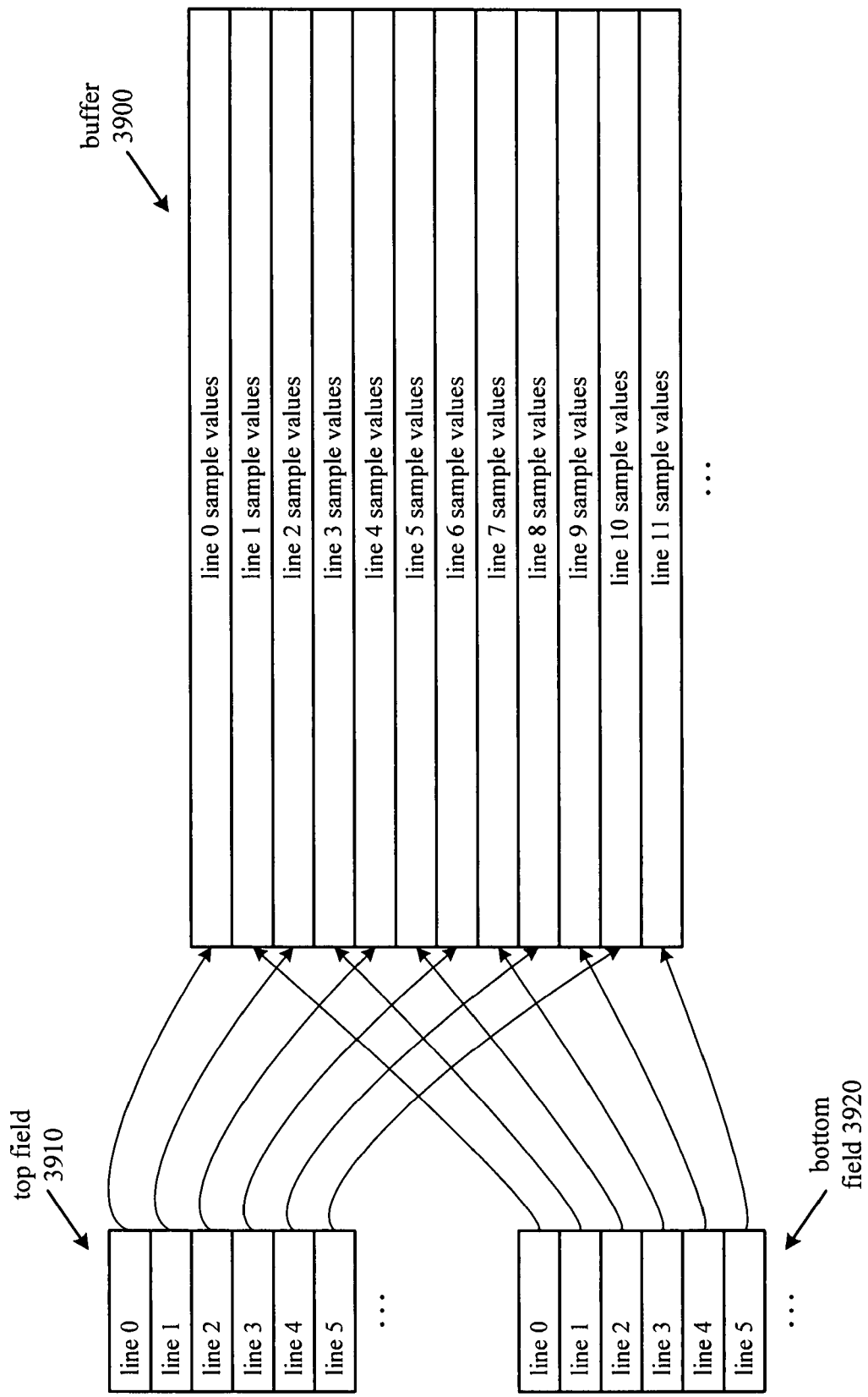
FIG. 39 is a diagram illustrating field pictures stored in a frame memory buffer.

In some embodiments, a decoder uses a single frame memory buffer to represent a video frame as well as two complementary top and bottom fields of the video frame. FIG. 39 shows an example frame memory buffer (3900) for a frame. The frame buffer (3900) includes lines of sample values. A buffer structure for the top field (3910) includes pointers to the even lines of the frame in the frame buffer (3900), which facilitates access to the buffered top field. A buffer structure for the bottom field (3920) includes pointers to the odd lines of the frame in the frame buffer (3900), which facilitates access to the buffered bottom field. Another buffer structure (not shown) for the entire frame can include pointers to all lines of the frame in the frame buffer (3900), facilitating access to the frame as a whole.

The decoder writes fields into an appropriate frame buffer, interleaving the lines of the field with lines of the complementary field from the start. This avoids extra memory copy operations from frames to fields, and vice versa, and conserves memory.

When the decoder decodes two complementary field pictures but outputs a single frame picture, the decoder uses the single frame memory buffer (3900) to efficiently represent the field pictures and frame picture. An H.264 decoder generally outputs frame pictures even when the frame pictures are decoded as field pictures. Parameters in slice headers for the field pictures indicate whether the two field pictures are a pair of complementary fields. Two field pictures that are a pair are interleaved and put together as a frame picture, not only for output purposes but also for reference. In some implementations, the function Detect_Field_Picture_Pair( ) is used to detect whether two fields are a pair. When two field pictures are a pair, they satisfy the logic in this function and are adjacent to each other in decoding order.

When two field pictures will share the same frame memory, and the decoder "pre-interleaves" them. The decoder makes pointers for the top field picture and bottom field picture point to the even and odd lines, respectively, in the frame size memory. This not only saves the additional memory for the combined frame picture but also avoids the memory copy operations.

When the decoder decodes a frame picture but splits it into complementary field pictures (e.g., in the MBAFF or PICAFF code path, to split the frame into reference fields), the decoder uses the single frame memory buffer (3900) to efficiently represent the field pictures and frame picture. The decoder sets up pointers in the split field pictures and makes them point to the even and odd lines in the frame picture. This saves memory for the two split field pictures and save two substantial memory copy operations.

D. Efficiently Allocating GPU Memory.

In some embodiments, a decoder (with GPU) uses one or more memory usage innovations during GPU decoding. Some of these innovations relate to how reference pictures are represented in memory, including:
representing a reference picture as a texture in memory and accessing it using texture operations;
representing multiple reference pictures as a 3D texture in memory; and
representing complementary field pictures as interleaved lines of a texture in memory.

Other innovations relate to the timing of memory management in GPU decoding, including:
having multiple memory partitions in flight during GPU decoding for different formats of pictures;
having multiple image array slot assignments in flight during GPU decoding; and
more generally, having multiple (potentially inconsistent) resource usage patterns in flight during GPU decoding.

Alternatively, a decoder uses other and/or different memory usage innovations during GPU decoding.

1. Innovations in Storing Reference Pictures for GPU Decoding.

One way to represent reference pictures in memory for GPU decoding is to simply allocate memory and organize the reference pictures in adjacent extents of memory. The reference pictures can then be accessed with normal memory access operations at their respective locations. For some GPU architectures, this is an inefficient use of memory.

According to one reference picture storage innovation, a decoder (with GPU) represents a reference picture as a texture in memory. Using a texture facilitates hardware support for fast, random access texture operations across the horizontal (x) and vertical (y) dimensions of a reference picture image plane. When the decoder decodes a picture, for example, the decoder can use the fast texture operations to access the reference picture in memory during motion compensation.

When a decoder (with GPU) uses multiple reference pictures, if the multiple reference pictures are simply put in memory, memory access patterns may be inefficient. In one approach to addressing this problem, the decoder sorts the blocks of a current picture being decoded according to reference picture used. The decoder performs motion compensation in multiple passes for the different reference pictures used, one pass per reference picture. For example, in a first pass the decoder performs motion compensation for blocks that use a first reference picture, in a second pass the decoder performs motion compensation for blocks that use a second reference picture, and so on. While this improves memory access patterns, it also involves additional computation and switching between passes.

According to another reference picture storage innovation, a decoder (with GPU) represents multiple reference pictures in an image array as a 3D texture. The 3D texture supports fast random access to different reference pictures along its depth (z) dimension and also supports fast random access within individual reference pictures. When the decoder decodes a picture, for example, the decoder can use the fast texture operations to access any of the reference picture in memory during motion compensation.

According to another reference picture storage innovation, for GPU decoding, complementary reference fields are stored as alternating rows of an image plane in a 3D texture. The GPU uses texture operations to access the top field (even lines), the bottom field (odd lines), and/or a reference frame including the top and bottom fields (even and odd lines). For example, given a starting row y, the GPU accesses rows in increments of two (y+2, y+4, etc.) to retrieve sample values for an individual field. Or, to retrieve sample values for the reference frame, the GPU accesses rows in order from the starting row. In some implementations, when the GPU performs decoding operations for a given picture type (frame or field) or macroblock type (field-coded or frame coded), it automatically accesses the correct rows of the field/frame representation to retrieve sample values, incrementing the rows to access them appropriately. The field/frame representation efficiently uses memory for reference pictures by avoiding redundant storage of fields and frames (as in the non-GPU implementations). Moreover, when the fields/frame are stored as an image plane in a 3D texture for GPU decoding, it also improves the efficiency of motion compensation by making access operations simpler and faster.

2. Innovations in Timing of Memory Management in GPU Decoding.

In many implementations, a GPU (unlike a CPU) is single threaded. The GPU decodes pictures in coded video bit stream order. The GPU can employ parallel processing by splitting up certain decoding tasks (such as an inverse transform) and performing them in parallel for a particular segment or picture, but from picture-to-picture the decoding occurs in serial order.

For purposes such as resource allocation, even though pictures are decoded in serial order by the GPU, the decoder scans ahead (e.g., with a CPU using PED) in the coded video bit stream. In some implementations, the decoder orders tasks in a FIFO GPU command queue. Various commands in the GPU command queue can affect how the GPU uses memory or other resources. One task at a time and in serial order, the GPU removes tasks and executes primitives for the tasks, potentially changing how the GPU uses memory or other resources.

The GPU command queue can include commands with potentially inconsistent resource usage patterns for multiple pictures in flight during decoding. For example, the decoder can scan ahead in the bit stream through pictures having different formats (e.g., resolutions), different ways of identifying reference pictures in memory, or other different patterns of using resources. Resource usage patterns can be inconsistent from picture to picture, in that they cause the GPU to use the same resource in different, conflicting ways. Since the GPU removes commands one at a time in serial order, however, the GPU uses memory and other resources consistently for any given task/primitive.

According to one aspect of the GPU resource management innovations, a decoder represents multiple resource usage patterns for multiple commands in a GPU unit command queue for multiple pictures in flight during decoding. For example, the resource usage patterns are memory partitions or slot assignments for reference pictures. The decoder decodes pictures in serial coded order with a GPU, regulating memory based at least in part upon the multiple resource usage patterns.

According to another aspect of the GPU resource management innovations, a decoder receives a coded video bit stream that includes encoded video for multiple pictures in serial coded order. The decoder scans ahead in the coded video bit stream to determine multiple resource usage patterns for the pictures and tracks the resource usage patterns (e.g., in a GPU command queue that tracks commands and represents the resource usage patterns). The tracked resource usage patterns include at least some inconsistent patterns in flight during decoding. Typically, each of such inconsistent patterns is valid during one part of decoding but invalid during a different part of decoding. For example, the inconsistent patterns include different memory partitions for reference pictures. Or, the inconsistent patterns include different slot assignments for reference pictures. The decoder (with GPU) performs decoding operations on the pictures in serial coded order (e.g., as reflected in the GPU command queue).

As another example of resource usage patterns, the decoder allocates different data structures for different formats/resolutions of pictures. When decoding finishes for the last picture encountered thus far for a particular format, the decoder can free memory used for the structures for pictures of that format.

a. Multiple Partitions in Flight.

In some embodiments, for memory used by a GPU to store reference pictures, a GPU command queue represents different memory partitions in flight, including potentially inconsistent memory partitions. The decoder efficiently allocates and partitions GPU memory based on information in a GPU command queue.

In some implementations, a GPU uses an image array to store reference pictures and, potentially, other decoded pictures as well. For example, the decoder allocates an extent of memory to the GPU, and the memory is partitioned to store 16 standard-definition reference pictures and one standard-definition picture being decoded. The decoder uses the partitioned memory when decoding standard-definition pictures of a video sequence, potentially having multiple pictures in flight. Later, the pictures switch to high-definition, and the memory is partitioned to store four high-definition reference pictures and one high-definition picture being decoded. The decoder uses the re-partitioned memory when decoding the high-definition pictures.

The GPU uses the same image array for either standard-definition or high-definition decoding, re-partitioning the memory as appropriate when a new format is encountered. The decoder (e.g., a CPU in a PED stage) tracks format changes and manages the GPU command queue to reflect the changes. The GPU command queue, which typically includes commands for multiple pictures in flight, can thus include memory partitions for pictures in different formats. The memory partitions may be inconsistent, but the GPU only uses memory partitioned one way (the correct partition for current decoding) at a time due to serial execution of commands from the GPU command queue.

In theory, for some number (e.g., 32) of pictures in flight, the resolution might change several times, even on a picture-by-picture basis. If pictures could be decoded in any order by the GPU, this would complicate the management of memory used by the GPU when the memory is partitioned in different ways for different resolutions of reference pictures. Since the GPU decodes a single picture at a time in coded order, however, the decoder can more aggressively prune pictures from memory, compared to multithreaded decoding approaches in which more pictures are buffered.

b. Multiple Slot Assignments in Flight.

In some implementations, the GPU maintains separate reference and output pictures. The reference pictures are used by the GPU and not output.

When driving a pipelined GPU (multiple pictures in flight), the decoder (e.g., with a CPU in a PED stage) can determine which reference pictures are reused from picture to picture as pictures are scanned and assimilated into the GPU command buffer. When a picture is scanned, the decoder considers, for example, the picture's private DPB. Work for multiple pictures can be enqueued at one time in the GPU command buffer, and the work can use memory inconsistently. Different commands can involve writes to or reads from the same memory location but relate to work for different pictures at the location. The decoder can effectively handle this potential inconsistency because the GPU processes commands in the GPU command queue in serial, coded order, and there is a maximum number of reference pictures (e.g., four for high-definition or 16 for QCIF). Changes to reference picture ordering or assignment are processed serially and according to expected limits on buffer size, which facilitates pruning of reference pictures from memory.

In particular, reference indices typically differ at different times during decoding. For pictures 0, 1 and 2, for example, picture 0 can use reference pictures A, B, C and D. When work for picture 0 is passed to the GPU, the decoder marks where picture 0 will be stored after it is decoded. When picture 0 is decoded, if reference picture A is no longer used in decoding, the GPU writes picture 0 to where picture A was. Because the GPU processes pictures in serial order, the decoder can safely determine when no other picture relies on reference picture A and reference picture A can be overwritten.

For example, a decoder (with CPU) using PED tracks the state of a DPB at the point it is parsing in a coded video bit stream. A picture, in effect, has its own view of the DPB, and the PED stage tracks the live DPB. With this information, the decoder pre-assigns image array slots for pictures for the GPU to use. The decoder essentially decides where a next picture will be stored when it is decoded (e.g., to slot 0, 1, 2, 3, 4 or 5). The decoder can also determine when a reference picture is no longer used and thus determine when the reference picture can be overwritten during serial-order decoding by the GPU. The GPU command queue in effect stores references to memory that the GPU will write to, which the GPU may or may not have already written to, but which will be available to the GPU when the command in question can execute and calls are made to the memory. The GPU performs work using the prospectively assigned slots in the image array, at the appropriate times storing pictures in the appropriate slots in the memory array, accessing the pictures, and overwriting the pictures. This efficient reuse of image array slots, as determined by DPB bumping logic in the PED stage, facilitates memory management for the GPU.

E. Efficient Memory Pooling for Multithreaded Decoding.

When a decoder is allocated memory from system heap (e.g., with the memory allocation routine malloc( )), the system heap often becomes fragmented over time. With multithreaded decoding, the problem of gradual fragmentation can be even worse.

In some embodiments, a decoder imposes memory pool organization on top of a memory heap to reduce fragmentation. When the decoder processes the coded video bit stream or performs other decoding tasks, it uses memory fragments of the same size for a particular type of operation. When done with the data in a memory fragment, the decoder releases the memory fragment back to the pool.

In some implementations, the decoder uses different pools for different data structures, sets of data structures, or decoding tasks. For example, suppose that, for a GPU setup task for a picture, the decoder needs 1 MB of memory for the structures used. Instead of using malloc( ), the decoder requests and is allocated an appropriately sized memory fragment from a pool of such memory fragments for GPU setup tasks. The GPU task populates the structures in the memory fragment and various other decoding tasks use the structures. Eventually, the decoder releases the memory fragment back to the pool, invalidating the data in it. From the pool, the memory fragment can be allocated in later decoding. Allocation through such memory pools helps reduce memory fragmentation.

Example memory fragment sizes for PED and ED are 3 MB and 8 MB, respectively. More generally, different pools are specialized for different tasks and types of structures. For the memory fragments, structure lifetime is mapped to lifetime of the data in the structures in the memory fragment.

XI. Other Innovations.

In some embodiments, a decoder uses other optimizations to improve performance in certain scenarios. These optimizations have some general themes but often are targeted to specific platforms or applications.

According to one optimization, in some implementations, the decoder uses a single-instruction-multiple-data ("SIMD") structure for an inverse transform according to the H.264 standard. In the H.264 standard, a 4×4 inverse transform consists of the same set of instructions being executed on each of the four rows/columns of the block. The transform can be carried out using 16-bit addition, subtraction and shift arithmetic.

A 128-bit SIMD performs a maximum of 4 32-bit instructions, 8 16-bit instructions, or 16 8-bit instructions in parallel. To enhance parallelism, an entire SIMD vector is used. Since the SIMD vectors can perform 8 16-bit operations at once but the inverse transform uses only four parallel operations for four rows or columns, the decoder combines two 4×4 transforms into a single 8×4 inverse transform that uses one set of vector instructions.

Regardless of whether each block consists of sub-blocks of 4×4, 4×8, 8×4, or 8×8, the inverse transform is done on the entire 8×8 block. By combining the inverse transforms of two 4×X sub-blocks, the number of transforms done can be reduced by half. Furthermore, because there is no dependency between two adjacent X×4 sub-blocks within a block, they can be combined into a single function for more efficient scheduling and less function call overhead. Combining these optimizations allows calls to a single 8×8 inverse transform function for each block, regardless of type of sub-blocks within each block.

For the memory layout of the buffers used in the inverse transform, a single vector load per row loads both 4×X sub-blocks in the correct layout. This reduces the number of vector loads needed for the combined 8×8 transform. It also helps avoid additional vector loads and manipulation for setting the vectors up correctly, which would result in performance loss.

According to another category of optimizations, branches are eliminated in the code base of the decoder to improve memory performance. This is done, for example, by identifying code with numerous branches and replacing such code with a state machine or table-based lookup mechanism.

According to still another category of optimizations, dynamic shifts (which are costly operations in some architectures) are replaced with other operations. For example, dynamic shifts are identified in the code and replaced by unrolling conditional logic and/or using a state table.

XII. Parallel Processing Innovations for GPU Platforms.

In some embodiments, a decoder operates on GPU-platform or combined CPU-GPU platform. Various decoding processes are mapped to the GPU, including inverse transform, inverse quantization, motion compensation, intra prediction, deblocking, and film grain noise addition.

In general, a given decoding process can be mapped onto the GPU according to the following guidelines. The smallest unit (or quantum) of work for the decoding process is defined. The quantum does not depend on other quanta. Having small independent units for the quanta helps increase parallel processing in the GPU.

The inputs to the quantum for the decoding process are then defined. The inputs can include data streams, images and/or constants. In many implementations, defining inputs as sequential reads improves performance. The outputs of the quantum are also defined. In some implementations, the outputs are limited to four separate buffers, and defining outputs as sequential writes improves performance (even more than sequential reads).

Then, an optimal balance between register usage, memory access patterns, and the number of passes through the data is found for the decoding process, depending on target architecture and/or expected usage patterns. For example, an ideal shader program is configured to have minimal register usage, minimal passes through the data, and sequential memory access patterns in both input and output. In practice, one or more of such constraints may be loosened. Where available, native SIMD operations can be used to improve performance. Branches (such as conditional logic) can be replaced with other logic (such as table lookups) to improve performance.

Finally, if data processed in the decoding process have data dependencies, a wave approach can be applied to increase parallelism in processing with the GPU. The wave approach can be static or dynamic.

In particular, the decoder uses one or more of the following innovations to enhance GPU decoding.

1. inverse transform implementations adapted for GPU platforms;
2. inverse quantization implementations adapted for GPU platforms;
3. fractional interpolation innovations for GPU platforms;
4. intra prediction using waves for GPU platforms;
5. loop filtering using waves for GPU platforms;
6. memory usage innovations for GPU platforms;
7. film grain noise generation innovations for GPU platforms;
8. asynchronous decoding by the GPU and CPU(s);
9. a GPU command buffer filled by CPU(s) and emptied by the GPU; and
10. a synchronization interface between the GPU and CPU(s).

The intra prediction and loop filtering innovations (using waves) address dependencies that complicate parallel decoding with a GPU. The other innovations address memory consumption and other resource issues. In one H.264 implementation, the GPU innovations collectively facilitate real-time H.264 decoding of high-definition content with a software-only decoder. Before describing these innovations, however, example GPU architectures and CPU/GPU interfaces are described.

A. Example Architectures for GPU-Platform Decoding.

Figure 40:
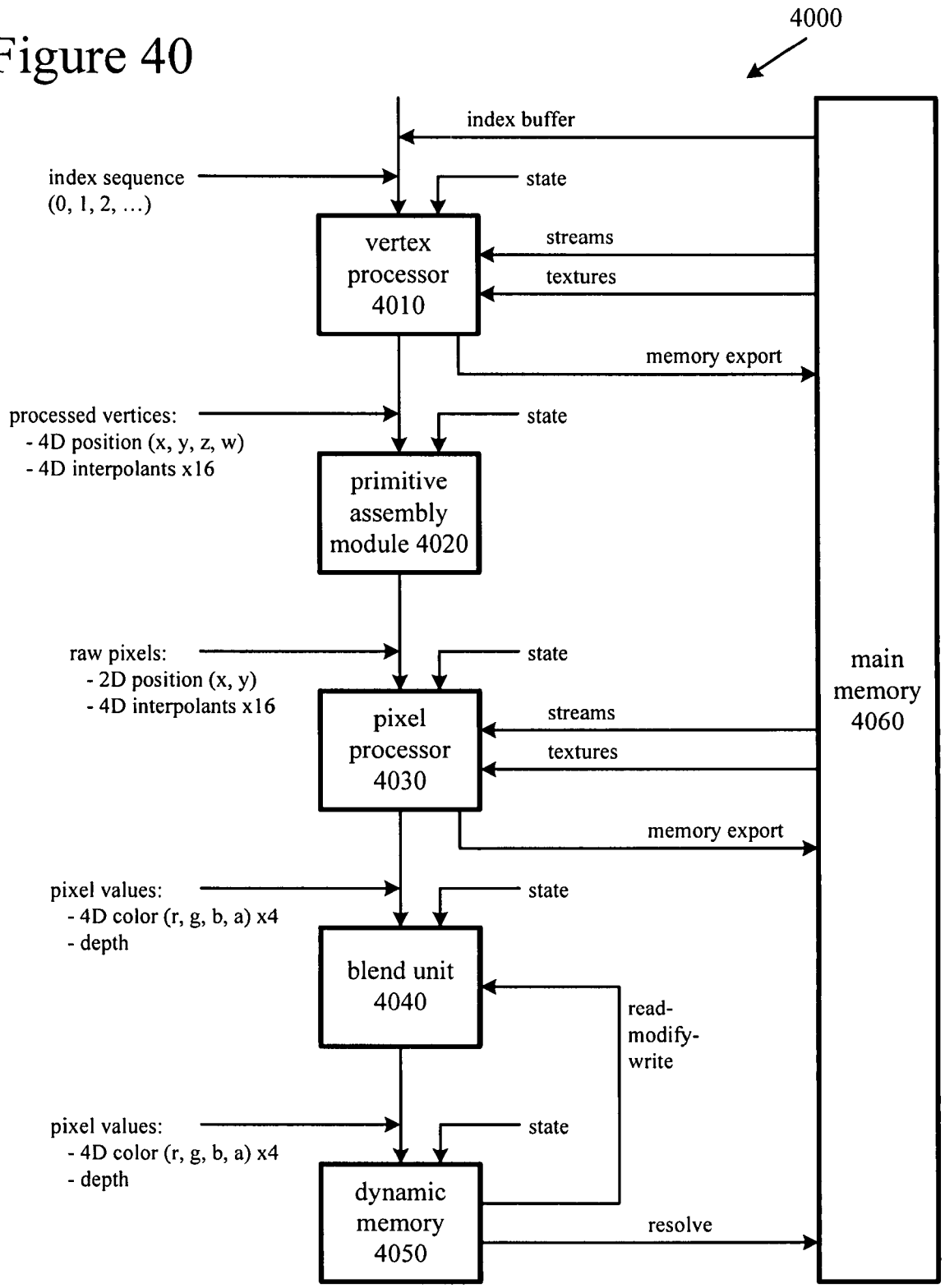
FIG. 40 is a diagram of a GPU architecture used in some embodiments.
Figure 41:
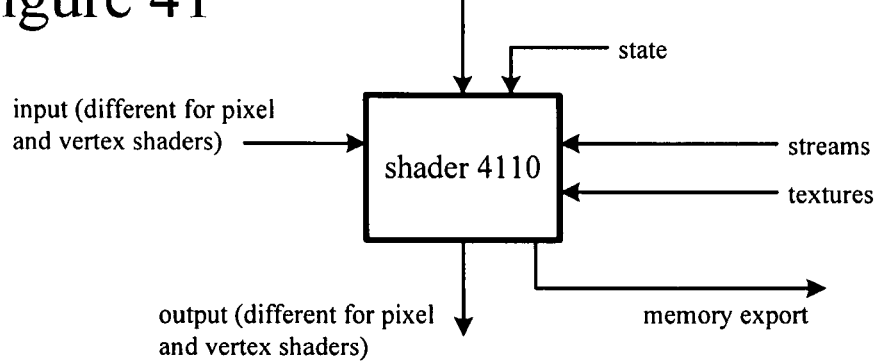
FIG. 41 is a diagram of a shader functional model used in some embodiments.

In some embodiments, the decoder operates in conjunction with a graphics processing unit in an architecture such as described herein. For purposes of video decoding, the graphics processing unit is in some respects used as a general purpose unit. FIGS. 40 and 41, and the accompanying description, illustrate features of example GPU architectures. Alternatively, a decoder runs on a GPU architecture having other and/or addition features.

FIG. 40 shows an example high-level GPU architecture (4000) used in some embodiments. To map a decoding process (such as an inverse transform or loop filtering) to the GPU architecture (4000) involves several steps. The GPU architecture (4000) was designed for use by graphics programmers to create real-time 2D and 3D graphics, not for real-time video decoding. A preliminary step in mapping video decoding processes to the GPU architecture (4000) is to understand how GPU terms (e.g., shader, primitive, stream, texture) relate to terms conventionally used to describe parts of the video decoding processes.

The details of the GPU architecture (4000) vary depending on implementation. For example, different implementations have different numbers of arithmetic logic units ("ALUs"), different numbers of registers, different instructions, different cycle timing and/or different memory configurations.

The GPU architecture (4000) includes a shader processor with vertex fetch registers and ALUs shared between the vertex processor (4010) and pixel processor (4030). The vertex fetch registers can be converted to texture fetch registers. Each of the ALUs is capable of running x identical instructions (from x contexts executing in lockstep) every y cycles.

Conventionally, a "shader" is a graphics program that runs on the shader processor. For video decoding, a shader is a simple program that runs on either the vertex processor (4010) or pixel processor (4030). Shader programming is done, for example, using a high-level shader language or microcode assembly language.

A "primitive" is a single set of data for a decoding pipeline. The pipeline is, for example, one vertex shader plus one pixel shader, plus state for the shader units, primitive assembly, and blend unit, etc. Even when a primitive includes two shaders, the shader for the pixel processor (4030) can be a dummy no-op shader when only the vertex processor (4010) is used.

In the GPU architecture (4000), a shader reads its input directly from main memory through a set of streams or textures. A pixel shader can also read data from the outputs of a primitive assembly module (4020). A shader can accept as input various combinations of streams and textures. In general, streams are useful for reading arrays of data structures, where a given data structure can consist of heterogeneous data types. On the other hand, textures are useful for reading 1D, 2D or 3D images, or arrays (sometimes termed stacks) of 2D images, or cubic images, where an image consists of homogeneous data types.

A shader can write its results directly to main memory using a memory export command. The memory export function allows the shader to write final or partial results to main memory (4060) without going through the more expensive dynamic memory (4050) to the main memory (4060).

The vertex processor (4010) and pixel processor (4030), for practical purposes, can be treated as a series of highly parallel execution units. Two features of the architecture (4000) facilitate parallelism. First, the shared ALUs can operate as parallel execution units because of a deep pipeline and multithreading capability in each of the vector processor (4010) and pixel processor (4030). The pipeline can effectively convert the ALUs, with many execution units each, to behave like ALUs with even more execution units each. The multithreading capability allows resources freed up by one primitive to be used by the next primitive, which helps to hide memory latency from reads and writes. Second, each of the execution units is capable of executing SIMD-like instructions. Given this potential for parallel processing across execution units, the GPU runs efficiently when each primitive runs the same shader on hundreds, or even thousands, of pieces of data simultaneously. When this parallel processing capacity is coupled with high memory bandwidth, a single GPU completes some tasks quicker than three CPU cores working in unison on the same tasks.

FIG. 41 shows an example shader functional model (4100) used in some embodiments. The details of the shader model (4100) vary depending on implementation. For example, different implementations have different numbers of registers, different native operations and/or different cycle timing.

The shader functional model (4100) applies for either a vertex processor (4010) or a pixel processor (4030). The vertex processor (4010) and pixel processor (4030) can be implemented separately. Or, they can share hardware that is reconfigured by the GPU on the fly to perform vertex processing or pixel processing, in which case fetch units and ALUs are shared by the processors (4010, 4030) and dynamically allocated based on current workload. The main differences between the processors (4010, 4030) relate to how they input and output data. In example implementations, decoding processes are mapped to a vertex shader (running on the vertex processor (4010)) to take advantage of how the vertex processor (4010) handles input. A vertex shader can be programmed using a high-level shader language or microcode assembly language.

Calculations in an example shader use floating-point representation and floating-point arithmetic. Typical video decoding processes (e.g., inverse transform or motion compensation as in the H.264 standard) call for pixel manipulation and integer operations, however. A set of integer functions (macros) facilitate pixel manipulation for the video decoding processes.

In addition, the example shader use registers. All shaders in a shader unit (ALU) share these registers, however; as more registers are used to run a single shader, fewer shaders in the unit run in parallel.

The example shader also supports static and dynamic branches, functions, and loops. Dynamic predication, branches, and loops are very costly, however. For example, in some cases, a shader will take both branches of an "if-else" statement, thereby doubling the workload of the shader. Dynamic predication, branches and loop are thus replaced in many cases, for example, with table lookups.

Finally, one pair of vector and scalar instructions is executed per cycle. The number of instruction pairs in a shader is limited in some implementations. Complex functions such as deblocking can be written as several "smaller" shaders (e.g., CalcBoundaryStrength, DeblockVerticalEdges, DeblockHorizontalEdges, etc.) to fit in program memory or, as is more often the case, for performance reasons. For example, a long process can be split into sub-processes that are parallelizable.

The example shader can use a table of constants. This is particularly useful for static tables such as user-defined scaling lists used in inverse quantization. Finally, a vertex shader has pointers to streams and/or textures.

A vertex shader reads from memory (4060) using a stream and/or texture. Streams and textures flexibly support a variety of formats (e.g., float, integer, short, sign, scaled, etc.). In particular, streams are useful for reading arrays of data structures in which each data structure may hold heterogeneous elements. For example, a shader can stream in macroblock data, where each macroblock element consists of a mixture of unsigned chars and shorts for the parameters mb_type, mb_field, cbp, etc. Textures, on the other hand, are useful for reading arrays of homogeneous data, such as arrays of unsigned chars. For example, a shader reads pixel data, such as references images from the decoded picture buffer, as texture.

A texture is specified by a texture sampler (3 pointers). Textures support wrapping, clamping, and mirroring at the hardware level. Automatic clamping can be used to handle unrestricted motion vectors in motion compensation. If an unrestricted motion vector points to a region outside the bounds of the reference picture, the texture can automatically clamp the return results without the need to pad the reference picture. Textures also automatically support bilinear and anisotropic filtering. Bilinear filtering can be used for fast ½-pel and ¼-pel interpolation in motion compensation. A cache supports reads from textures and is optimized for localized random access reads.

The example vertex shader can directly write to main memory (4060) using a specialized function, MemExport. Writes using MemExport are especially effective if done sequentially. MemExport writes directly to main memory (4060) and does not automatically maintain cache coherency between the GPU read cache and CPU caches. It is up to the programmer to maintain this cache coherency, using flush and store commands for the CPU caches and invalidate commands for the GPU caches.

As for shader hardware implementation, an example shader processor contains vertex fetch units and ALUs shared between the vertex and pixel processors (4010, 4030). The ALUs are also known as shader units, and each contains execution units. The shader units run in parallel to each other. Within a given shader unit, x simultaneous threads run in lockstep, even if not used. Execution units are fully independent and do not use feedback from other execution units. For branches and loops, the threads typically execute all the branches and loop iterations to finish all of them. It is efficient if all threads follow the same path (branches can skip quickly).

In many decoding processes, one tradeoff is to use simpler shaders that use fewer registers but make more passes through the input data. For example, a shader for ½-pel and ¼-pel interpolation in motion compensation can be implemented using large tables to hold 2D filter values, running a 2D convolution on input pixel data in a single pass but using lots of registers to hold the input data and the 2D filter values. Alternatively, the shader uses multiple passes for motion compensation and breaks the interpolation into several dependent passes, one for ¼-pel interpolation and another one for ¼-pel interpolation. This illustrates the tradeoff between register usage (parallelism) and multi-pass processing (multiple reads/writes). As a general rule, as long as the number of passes is small, gains in parallelism trump the greater number of dependent read/writes, and the shader will run faster on the GPU.

B. Example GPU Interfaces for GPU-Platform Decoding.

In some embodiments, a CPU and GPU coordinate across a communications interface to decode video. Performance improves when decoding work is effectively partitioned between CPU core processors and the GPU, with CPU processes and GPU processes running asynchronously.

In an example implementation, decoding tasks are partitioned such that threads on CPU cores perform entropy decoding, and the GPU performs remaining decoding tasks such as inverse transform, inverse quantization, motion compensation, intra prediction, deblocking, and film grain noise addition. Entropy decoding, especially CABAC decoding, is serial in nature, involving decisions and tables updated on a bit-by-bit basis. A CPU that contains a built-in branch predictor and can handle read-modify-write operations on main memory millions of times per second is well suited for this serial processing. On the other hand, the GPU is well suited for inverse transform operations that can be easily parallelized over an entire image of transform coefficients (e.g., since each 4×4 (or 8×8) inverse transform is independent to each other). The GPU can efficiently operate on multiple 4×4 (or 8×8) blocks of data simultaneously.

In some implementations, the GPU is a FIFO device. The CPU generates tasks (corresponding to primitives for the GPU) and inserts them in a FIFO command buffer queue. The GPU extracts primitives from the command buffer, one at a time, and executes them in serial order. The CPU and GPU maintain synchronization, for example, using "fences." A fence is a marker inserted into the command buffer by the CPU. The fence is triggered once the GPU reaches it. Synchronization helps the CPU track when a picture has been completely processed by the GPU in order to reuse resources (e.g., PicHolder structures) and output the picture, subject to display ordering constraints. When a fence is signaled, the picture has been completely decoded. The fence is inserted after the last video decode algorithm, e.g., film grain noise addition. The picture is then copied into an output buffer and marked as available for reference in the decoded picture buffer.

In some implementations, the GPU is limited in how it uses memory. The GPU cannot do read-modify-write operations on main memory or read from memory a value that has been written by the same primitive. Working data is stored in the registers of each execution unit, and there are not transfers of data between the execution units. When reading from memory, the GPU has two small caches. Reading contiguous chunks of memory make effective use of the caches. The GPU reads directly from main RAM, bypassing CPU caches. When writing to memory, the GPU uses a write-combine strategy, bypassing the GPU read caches and the CPU caches. When implementing an algorithm for the GPU, care is taken to understand what memory is resident in which cache and act accordingly (flush or store) to avoid data corruption.

C. Inverse Transform Innovations for GPU-Platform Decoding.

In some embodiments, a decoder uses inverse transform operations mapped to a GPU platform. For example, integer transforms according to the H.264 standard are mapped to a GPU that natively supports floating point operations and matrix operations. The H.264 standard specifies two types of transforms, a 4×4 transform used in luma 4×4 and chroma_4×4 modes and an 8×8 transform used in luma_8×8 mode. Features of the example H.264-GPU mapping include:

1. classifying the transform coefficients into three types: luma_4×4, chroma_4×4 and luma_8×8;
2. defining the GPU quantum of work for luma_4×4 blocks as four 4×4 sub-blocks of transform coefficients;
3. defining the GPU quantum of work for luma_8×8 blocks as one 8×8 sub-block of transform coefficients;
4. defining the quantum of work for chroma_4×4 as two 4×4 sub-blocks of transform coefficients; and
5. using native matrix multiplication and matrix addition to calculate inverse transform.

Alternatively, the H.264-GPU mapping includes other and/or additional features. For another type of transform or other type of GPU, the mapping can include more or fewer types, different types, different quanta of work, and/or different operations.

1. Example H.264-GPU Mapping.

Figure 42:
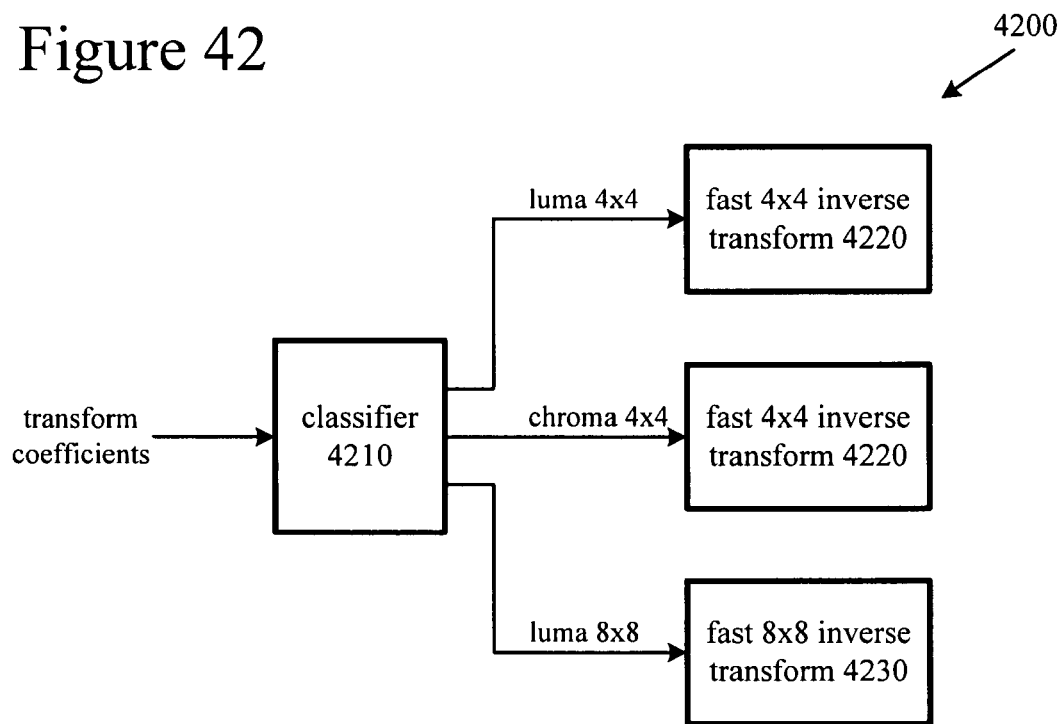
FIG. 42 is a diagram of an example of separate processing paths for different inverse transform types.

FIG. 42 shows an example framework (4200) with separate processing paths for inverse transform types according to the H.264 standard. In the framework (4200), a decoder classifies transform coefficients for a picture into three types for the GPU. In particular, a classifier module (4210) classifies transform coefficients for the picture into luma 4×4, chroma 4×4, and luma 8×8 types.

The decoder then performs a three-pass inverse transform with the GPU, one pass for each transform coefficient type. The order of the three passes depends on implementation. Different shaders can implement the inverse transforms for the different passes.

In the luma 4×4 pass, the decoder performs a fast 4×4 inverse transform (4220) on the luma 4×4 blocks in a picture. For example, the decoder uses a 4×4 inverse transform implementation as shown in FIG. 45 and described below. Alternatively, the decoder uses another inverse transform implementation. For the luma 4×4 pass, the quantum of work is four 4×4 blocks of transform coefficients.

In the chroma 4×4 pass, the decoder performs a fast 4×4 inverse transform (4220) on the chroma 4×4 blocks in a picture. For the chroma 4×4 pass, the quantum of work is two 4×4 blocks at a time, one from the U channel and one from the V channel.

In the luma 8×4 pass, the decoder performs a fast 8×8 inverse transform (4230) on the luma 8×8 blocks in a picture. For example, the decoder uses an inverse transform implementation with matrix multiplications and matrix additions. Alternatively, the decoder uses another inverse transform implementation. For the luma 8×8 pass, the quantum of work is one 8×8 sub-block of transform coefficients.

Alternatively, instead of classifying transform coefficients for a picture and performing multiple passes across the picture, the decoder operates on a slice-by-slice or other basis.

2. Multi-Pass Inverse Transforms with GPU.

Figure 43:
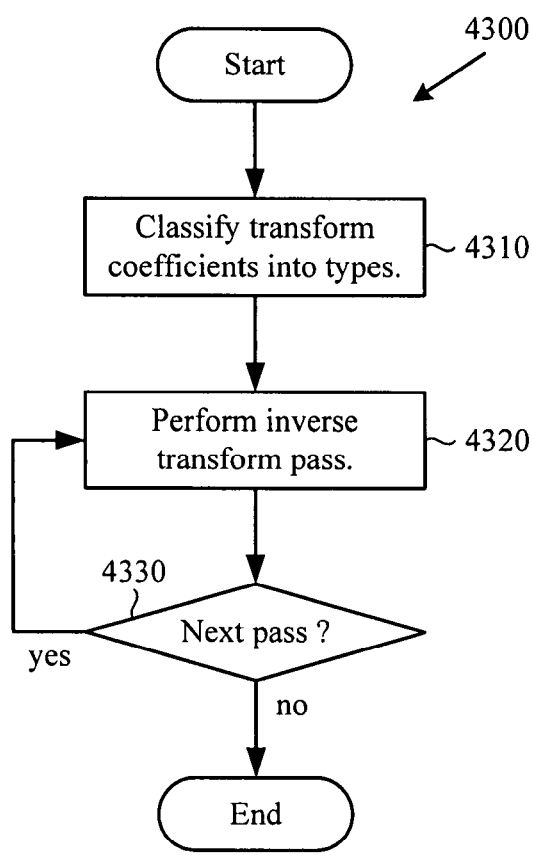
FIG. 43 is a flowchart of a generalized technique for performing inverse transforms in separate passes for different inverse transform types.

FIG. 43 shows a generalized technique (4300) for performing inverse transforms in multiple passes with a GPU. A decoder such as the one described above with reference to FIG. 2 or other decoder performs the technique (4300).

The decoder receives transform coefficients from video (e.g., from inverse quantization) and classifies (4310) the transform coefficients into multiple types. For example, an H.264 decoder classifies the coefficients into luma 4×4, chroma 4×4 and luma 8×8 types. Alternatively (e.g., for a different standard), the decoder classifies the transform coefficients into other and/or additional types.

The decoder (with a GPU) then performs (4320) inverse transforms on the transform coefficients in one of multiple passes that correspond to the multiple types, respectively. Each of the multiple types has a quantum of work associated with it. Example quanta for an H.264-GPU mapping are described above. Alternatively (e.g., for a different type of GPU), the quanta are different to more efficiently use a different number of registers. For a different transform and/or GPU, the quanta are defined to be small independent units that increase parallelism on the architecture. The decoder determines (4330) whether to continue with another pass and, if so, performs (4320) the next inverse transform pass.

3. Example GPU Implementation of 4×4 Transform.

In some implementations, a GPU uses an implementation of 4×4 inverse transform as follows for luma 4×4 blocks. The decoder (with the GPU) partitions a picture into 16×16 macroblocks and partitions the macroblocks into 4×4 blocks. For the inverse transform, each of the 4×4 blocks is independent of the other 4×4 blocks, and the GPU can perform the inverse transforms for different blocks in parallel.

FIG. 44 shows the input 4×4 block order (4410) and the output 4×4 block order (4420) in the example implementation. The luma 4×4 inverse transform shader fetches four sub-blocks at a time. As shown in FIG. 44, the shader fetches 64 non-contiguous signed shorts from a 2D texture of transform coefficients (e.g., fetching blocks 0 . . . 3 in column order, or fetching blocks 4 . . . 7 in column order). This involves fetching four contiguous values from the 2D texture, skipping 12 values, fetching four more, and so on. Although the shader could fetch more blocks at a time (e.g., an entire macroblock with blocks 0 . . . 15), this would increase register usage for the input data and hurt parallelism.

The shader then performs an inverse transform, scaling, and transpose on each block. The GPU shaders natively support 4×4 matrixes and fast 4×4 matrix operations such as addition, multiplication, and transposition. As such, the 4×4 fast inverse transform mode is implemented in terms of 4×4 matrix multiplications and additions. FIG. 45 shows pseudo-code (4500) for example bit-exact matrix equations for the 4×4 inverse transform mode.

To start, the input matrix A is multiplied by the transform matrix T using a native matrix multiplication, and the result is stored in the intermediate matrix M0. Rows 2 and 3 of the intermediate matrix M0 are adjusted by a constant matrix factor [1, 1, 1, 1] before scaling the results by a factor of ½ and flooring the scaled values. This essentially results in integer values in the intermediate matrix M1.

Next, the decoder multiplies a transpose of intermediate matrix M1 with the matrix T using a native matrix multiplication, and the result is stored in the intermediate matrix M2. The transpose operation completes the pre- and post-multiplication of the input data with the 4×4 transform basis vectors. Rows 2 and 3 of M2 are adjusted by the constant matrix factor before scaling by a factor of ½ and flooring the final 4×4 results, which are put in the output matrix B.

As shown in FIG. 44, the decoder exports output data as 64 contiguous signed shorts (e.g., blocks 0 . . . 3 in row order). Either the input reads or output writes can be sequential. For the architecture of the GPU in the example implementation, making the writes sequential has greater performance benefits than making the reads sequential.

The GPU uses an analogous inverse transform implementation for 4×4 chroma blocks, with a smaller input quantum but correspondingly higher parallelism. The GPU uses native matrix multiplication operations and native matrix addition operations for 4×4 chroma blocks and for luma 8×8 blocks.

D. Inverse Quantization Innovations for GPU-Platform Decoding.

In some embodiments, a decoder uses inverse quantization operations mapped to a GPU platform. For example, inverse quantization operations according to the H.264 standard are mapped to a GPU with constant registers that can hold user-defined scaling lists. Features of the example H.264-GPU mapping include:

1. classifying inverse quantizations into five types: luma_DC, chroma_DC, luma_4×4, luma_8×8, and chroma_4×4;
2. defining the GPU quantum of work for the luma_DC type as one 4×4 block of DC coefficients;
3. defining the GPU quantum of work for chroma_DC type as one 2×2 block of DC coefficients;
4. defining the GPU quantum of work for luma_4×4 type as one 1×16 row of AC coefficients;
5. defining the GPU quantum of work for luma_8×8 type as one 4×16 block of AC coefficients;
6. defining the GPU quantum of work for chroma_4×4 type as two 2×4 blocks of AC coefficients (one from U, one from V); and
7. using constant registers to hold user-defined scaling lists and normalization adjustment matrix.

Alternatively, the H.264-GPU mapping includes other and/or additional features. For another type of quantization operation or other type of GPU, the mapping can include more or fewer types, different types, different quanta of work, and/or different operations.

1. Example H.264-GPU Mapping.

In the example H.264-GPU mapping, a decoder performs inverse quantization in a framework with separate processing paths for different inverse quantization types according to the H.264 standard. In the framework, a decoder classifies inverse quantization operations for a picture into five types for the GPU. In particular, a classifier module classifies inverse quantization operations for the picture into luma DC coefficient, chroma DC coefficient, luma 4×4 block AC coefficient, luma 8×8 block, and chroma 4×4 block AC coefficients types.

The decoder then performs five-pass inverse quantization with the GPU, one pass for each inverse quantization operations type. The order of the five passes depends on implementation. Different shaders can implement the inverse quantization for the different passes.

In each of the respective passes, the decoder implements the inverse quantization operations generally as specified in the H.264 standard, potentially using floating point operations and matrix operations in places to expedite processing with the GPU.

In some GPU implementations, the decoder uses a set of constant registers to hold a scaling list and/or normalization adjustment matrix for inverse quantization operations. The H.264 standard (and some other standards) allow a user to define perceptual weights for transform coefficients. The scaling list is, for example, a user-defined perceptual quantization matrix signaled in a picture header. Or, the scaling list is a default scaling list having default perceptual weights. In some GPU implementations, the set of constant registers is an array of 256 4D registers.

The quanta of work for the respective inverse quantization types facilitate parallel processing in each of the respective passes. Thus, in the luma DC pass, the GPU performs inverse quantization in parallel on different 4×4 blocks of DC coefficients. In the chroma DC pass, the GPU performs inverse quantization in parallel on different 2×2 blocks of DC coefficients. The GPU similarly performs inverse quantization in parallel on multiple blocks of AC coefficients (having the defined quantum size) within the luma 4×4 pass, luma 8×8 pass or chroma 4×4 pass.

Alternatively, instead of classifying inverse quantization operations for a picture and performing multiple passes across the picture, the decoder operates on a slice-by-slice or other basis.

2. Multi-Pass Inverse Quantization with GPU.

Figure 46:
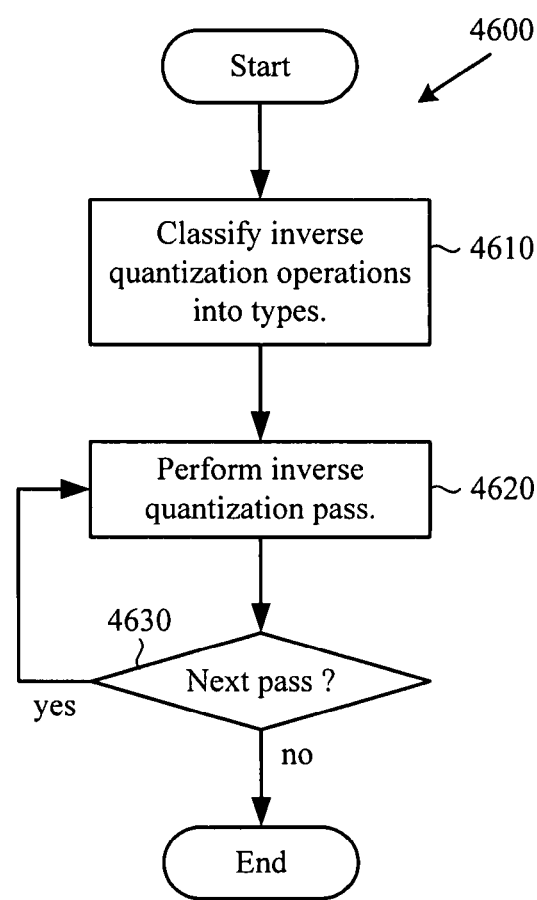
FIG. 46 is a flowchart of a generalized technique for performing inverse quantization in separate passes for different inverse quantization types.

FIG. 46 shows a generalized technique (4600) for performing inverse quantization in multiple passes with a GPU. A decoder such as the one described above with reference to FIG. 2 or other decoder performs the technique (4600).

The decoder receives transform coefficients from video (e.g., from an entropy decoding task) and classifies (4610) inverse quantization operations for the transform coefficients into multiple types. For example, an H.264 decoder classifies the inverse quantization operations into luma DC, chroma DC, luma 4×4 AC, luma 8×8, and chroma 4×4 AC types. Alternatively (e.g., for a different standard), the decoder classifies the inverse quantization operations into other and/or additional types.

The decoder (with a GPU) then performs (4620) inverse quantization on the transform coefficients in one of multiple passes that correspond to the multiple types, respectively. Each of the multiple types has a quantum of work associated with it. Example quanta for an H.264-GPU mapping are described above. Alternatively (e.g., for a different type of GPU), the quanta are different to more efficiently use a different number of registers. For a different inverse quantization operation and/or GPU, the quanta are defined to be small independent units that increase parallelism on the architecture. The decoder determines (4630) whether to continue with another pass and, if so, performs (4620) the next inverse quantization pass.

E. Fractional Interpolation Innovations for GPU-Platform Decoding.

In some embodiments, a decoder uses motion compensation and fractional interpolation operations mapped to a GPU platform. For example, fractional interpolation operations according to the H.264 standard are mapped to multiple passes with a GPU. Features of the example H.264-GPU mapping include:

1. classifying motion vectors into three types: integer, center-pel, and off-center pel;
2. defining the GPU quantum of work for the motion compensation shaders for the three types as 8×8 block;
3. using a fast off-center pel motion compensation shader that calculates fractional positions not dependent on a center location with reduced register usage; and
4. using a fast center-pel motion compensation shader that calculates fractional positions dependent on a center location fetching a small 9×9 block region.

Alternatively, the H.264-GPU mapping includes other and/or additional features. For another type of interpolation operations or other type of GPU, the mapping can include more or fewer types, different types, different quanta of work, and/or different operations.

1. Example H.264-GPU Mapping.

Motion compensation according to the H.264 standard is computationally complex and has high memory access requirements. A 4×4 block can be assigned a unique motion vector that has a horizontal (x) component and vertical (y) component. The two rightmost bits of each motion vector component indicate the fractional sample position in the reference picture: the value 0 for the two bits indicates an integer position, the value 2 indicates a half-pel position, and the value 1 or 3 indicates a quarter-pel position. The high computational complexity of motion compensation is due largely to the interpolation used to generate sample values at fractional sample positions in reference pictures. For example, half-pel offset positions are calculated by convolving the reference picture with a separable, one-dimensional 6-tap filter {1 −5 20 20 −5 1} in the horizontal direction and in the vertical direction.

Figure 47:
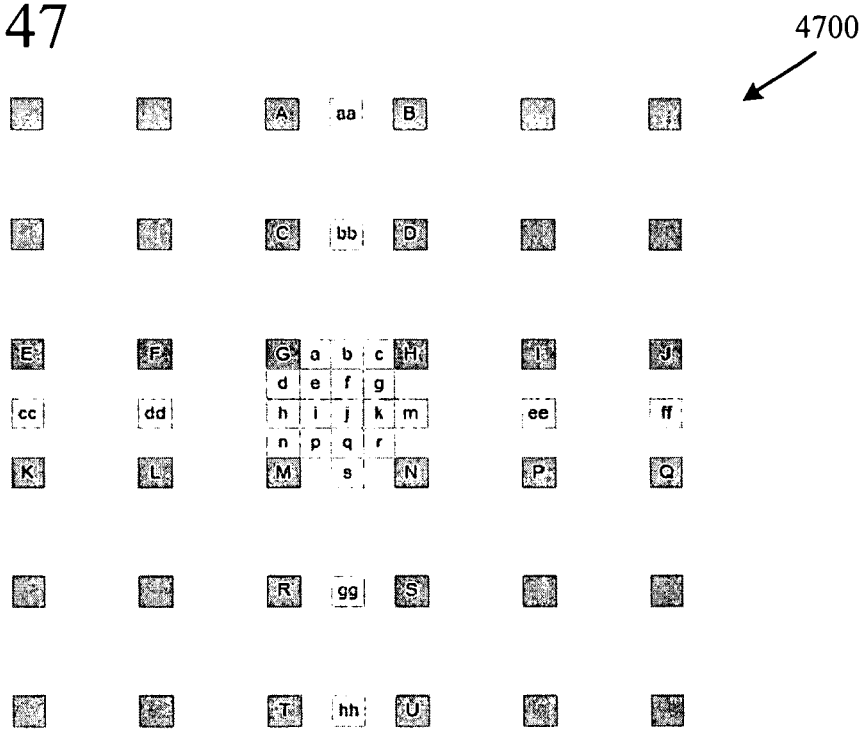
FIG. 47 is a diagram of sample positions referenced in example interpolation operations.

FIG. 47 shows a chart (4700) indicating integer sample positions and fractional sample positions for interpolation operations according to the H.264 standard. Integer sample positions are shown in capital letters, and fractional sample positions are shown in lower-case letters for a block in an image plane (e.g., the luma plane). The sample value at a ½-pel position in one dimension (e.g., b, h, m, s) is computed by applying the 6-tap filter {1 −5 20 20 −5 1} to sample values at integer positions and normalizing the result. The sample value at center position j (½-pel horizontal offset, ½-pel vertical offset) is computed by applying the 6-tap filter {1 −5 20 20 −5 1} to sample values at integer positions to compute sample values at aa, bb, b, s, gg and hh, then applying the 6-tap filter to the un-normalized sample values at half-pel positions aa, bb, b, s, gg and hh. (Alternatively, the sample value at j is computed by applying the 6-tap filter to compute values at half-pel positions cc, dd, h, m, ee and ff, then applying the filter to the un-normalized sample values at those half-pel positions.) Values at ¼-pel offset positions (e.g., positions a, c, d, e, f, g, i, k, n, p, q, and r) are computed by averaging two integer or half-pel position values in the vertical, horizontal or diagonal direction.

To complicate matters in H.264, different 8×8 blocks can be assigned different reference picture indices referencing different reference pictures. This can result in high memory access costs and inefficient memory access patterns when, for example, many different 8×8 blocks point to many different reference picture in a decoded picture buffer. In a worst case scenario, a motion compensation shader fetches pixel data from two vastly different positions in memory for each adjacent 8×8 block in a series of blocks, with the random memory access pattern effectively thrashing the GPU read cache.

In the example H.264-GPU mapping, the quantum of work for GPU motion compensation is a single 8×8 block. For motion compensation and fractional interpolation, an 8×8 block is independent from other blocks. An 8×8 block uses one motion vector for each of its four 4×4 blocks (up to four different motion vectors) and uses a single reference picture index, regardless of how the block and its containing macroblock are internally partitioned for motion compensation. The GPU effectively performs parallel processing across different 8×8 blocks in motion compensation tasks such as fractional interpolation. Alternatively, for a different motion compensation operation, fractional interpolation operation, and/or GPU, the decoder uses a different quantum of work.

In the example H.264-GPU mapping, the decoder allocates a contiguous image array to hold the decoded picture buffer. A given motion compensation shader maps the image array to a 3D texture. Using a 3D texture facilitates hardware support for fast random memory access across the horizontal (x) and vertical (y) dimensions of a reference picture image plane, and it also facilitates hardware support for fast random memory access to different reference picture image planes along the depth (z) dimension of the 3D texture for the decoded picture buffer. Alternatively, the decoder maps reference pictures to a different memory configuration.

Figure 48:
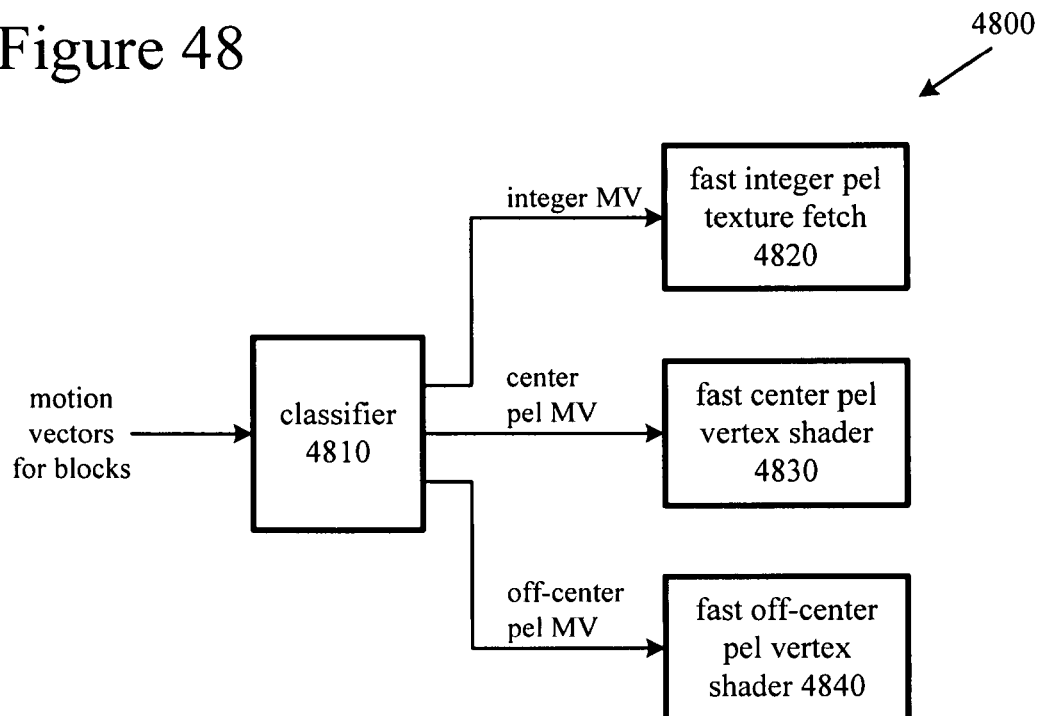
FIG. 48 is a diagram of an example of separate processing paths for different motion vector types.

FIG. 48 shows an example framework (4800) with separate processing paths for motion vector types according to the H.264 standard. In the framework (4800), a decoder classifies blocks in a picture into three motion vector types for the GPU. In particular, a classifier module (4810) classifies blocks for the picture into integer MV, center-pel MV and off-center-pel MV types. The blocks are, for example, 8×8 blocks, corresponding to the quanta of the different motion vector types.

In some implementations, integer MV block, center-pel MV block, and off-center-pel MV block types are used as follows. An integer MV block is an 8×8 block with motion vector(s) (e.g., for the 4×4 blocks) that reference integer sample positions (e.g., G, H, M and N in FIG. 47). An off-center MV block is an 8×8 block with motion vector(s) (e.g., for the 4×4 blocks) that reference certain fractional sample positions not dependent on the value at position j. This includes positions a, b, c, d, e, g, h, m, n, p, r, and s. A center MV block is an 8×8 block for remaining cases. For these remaining cases, at least one motion vector for an 8×8 block (e.g., internal 4×4 block) references sample values at position f, i, j, k or q. So, an 8×8 block for which each 4×4 block points to position f, i, j, k, or q is classified as a center MV block. An 8×8 block for which different 4×4 blocks point to a mixture of integer positions, center positions (such as j), and off-center positions (such as c) is also classified as a center MV block. Alternatively, the MV block types have different definitions.

The decoder then performs three-pass motion compensation with the GPU, one pass for each motion vector type. The order of the three passes depends on implementation. Different shaders can implement the motion compensation and fractional interpolation for the different passes.

In the integer MV pass, the decoder (with GPU) performs fast integer pel fetches (4820) from reference pictures in memory. For example, for 4×4 blocks of an 8×8 block, the decoder simply fetches sample values from a reference picture stored as an image plane in a 3D texture. Alternatively, the decoder uses another implementation.

In the center MV pass, the decoder (with GPU) performs fast center MV motion compensation (4830). For example, the decoder uses a fast center MV vertex shader as described below. Alternatively, the decoder uses another shader for center MV motion compensation.

In the off-center MV pass, the decoder (with GPU) performs fast off-center MV motion compensation (4840). For example, the decoder uses a fast off-center MV vertex shader as described below. Alternatively, the decoder uses another shader for off-center MV motion compensation.

Alternatively, instead of classifying blocks for a picture and performing multiple passes across the picture, the decoder operates on a slice-by-slice or other basis.

Tests involving the sample video sequences Yozakura, Tallships and Choochoo illustrate benefits of a multi-pass approach that separates types of fractional sample interpolation. Yozakura is a high-definition H.264 MBAFF bit stream that is difficult to decode in real-time on many hardware architectures. The number of ½-pel and ¼-pel motion vectors decoded per frame for Yozakura is much higher than Tallships and Choochoo. One reason Yozakura is tough to decode is the large number of interpolation operations needed for motion compensation per frame. For typical frames, Yozakura uses twice as many interpolation operations per frame than Tallships, and it uses 3 times as many interpolation operations per frame as Choochoo. Not all interpolation operations are the same in complexity for the GPU, however. In particular, off-center pel interpolation can be performed much faster than center-pel interpolation, which illustrates a benefit of separating these two types of operations.

2. Multi-Pass Motion Compensation/Fractional Interpolation with GPU.

Figure 49:
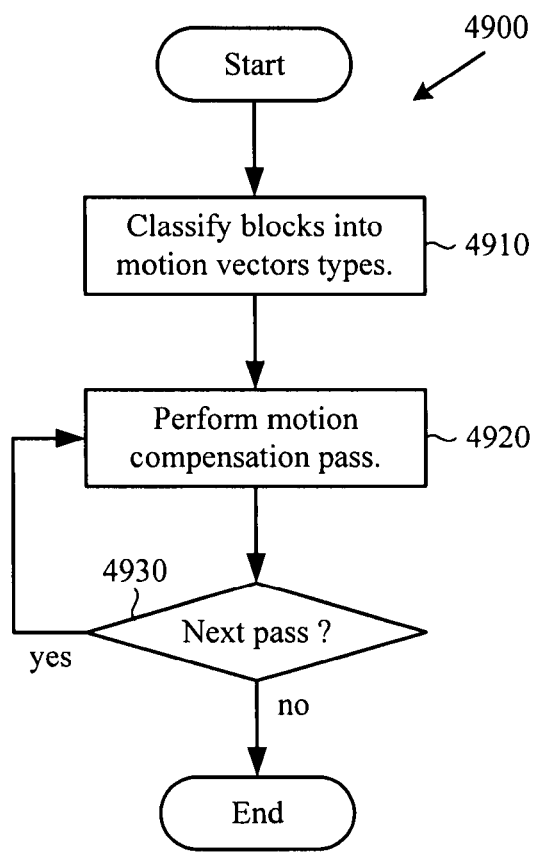
FIG. 49 is a flowchart of a generalized technique for performing motion compensation in separate passes for different motion vector types.

FIG. 49 shows a generalized technique (4900) for performing motion compensation/fractional interpolation in multiple passes with a GPU. A decoder such as the one described above with reference to FIG. 2 or other decoder performs the technique (4900).

The decoder receives motion vectors for blocks and classifies (4910) the blocks into multiple motion vector types. For example, an H.264 decoder classifies the blocks into integer MV, center-pel MV and off-center-pel MV types. Alternatively (e.g., for interpolation according to a different standard), the decoder classifies the blocks into other and/or additional motion vector types.

The decoder (with a GPU) then performs (4920) motion compensation for the blocks in one of multiple passes that correspond to the multiple motion vector types, respectively. Each of the multiple motion vector types has a quantum of work associated with it. Example quanta for an H.264-GPU mapping are described above. Alternatively (e.g., for a different type of GPU), the quanta are different to more efficiently use a different number of registers. For a different interpolation and/or GPU, the quanta are defined to be small independent units that increase parallelism on the architecture. The decoder determines (4930) whether to continue with another pass and, if so, performs (4920) the next motion compensation pass.

In some implementations, the decoder runs a GPU shader for integer MV blocks, using reference picture indices to identify image planes in a 3D texture for the decoded picture buffer, fetching sample values as texture fetch operations, and returning results in arrays of predicted blocks. The GPU shader for integer MVs is fast, not performing sample interpolation. The decoder then runs a GPU shader that implements motion compensation and fractional interpolation for center MV blocks, returning results in arrays of predicted blocks. Finally, the decoder runs a GPU shader that implements motion compensation and fractional interpolation for off-center MV blocks, returning results in arrays of predicted blocks.

3. Example GPU Implementation of Fractional Interpolation and Motion Compensation.

In some implementations, a GPU uses a specialized vertex shader routine for off-center MV motion compensation/fractional interpolation and uses a specialized vertex shader routine for center MV motion compensation/fractional interpolation.

An example vertex shader for center MV motion compensation performs motion compensation and fractional interpolation on a block-by-block basis for multiple 4×4 blocks in parallel. For a given 4×4 block, the shader uses a 9×9 block of sample values to have the support for filtering with the 6-tap filter. The 9×9 block includes the 4×4 block starting on the third row down, third column from the left, to support the 6-tap filter at the 16 j positions throughout the 4×4 block. The shader loads the 9×9 block of sample values as needed.

In terms of FIG. 47, when computing a sample value at position j (or position f, i, k or q, which depends on the value at j), the shader computes sample values at positions aa, bb, b, s, gg and hh (or cc, dd, h, m, ee and ff) in a first stage, then computes the value for position j using un-normalized first stage values. The shader can store intermediate, first stage values (e.g., un-normalized, intermediate ½-pel offset values) to use in other interpolation operations.

An example vertex shader for off-center MV motion compensation performs motion compensation and fractional interpolation on a block-by-block basis for multiple 4×4 blocks in parallel. For a given 4×4 block, the shader uses 78 input samples and does not buffer intermediate results.

Generally, reference pictures are stored in an array of buffers indexed in memory. When a decoder adds or deletes a reference image, the data in the buffer changes. When the decoder performs other DPB management tasks, it reorders pointers to the buffers. The example shaders organize reference pictures as image planes in a 3D texture and access the reference picture data using texture fetch operations.

In some implementations, the decoder (with GPU) tiles data for 4×4 blocks. In motion compensation, the decoder computes sample values for 4×4 blocks in memory, not rows of sample values. Tiling of 4×4 blocks in intermediate processing can help improve cache locality. Reference field data can be kept in an interleaved manner in a single frame buffer, or reference fields can be buffered separately from corresponding reference frames.

F. Intra Prediction Innovations Using Waves for GPU-Platform Decoding.

In some embodiments, a decoder uses intra prediction operations mapped to a GPU platform. For example, the decoder organizes intra blocks as dynamic waves and performs intra prediction on a wave-by-wave basis. Features of the example H.264-GPU mapping include:

1. building dynamic waves based on the intra prediction patterns in a picture;
2. merging luma and chroma waves to increase parallelism in each wave for the GPU; and
3. reducing shader branches for various prediction directions using table based lookup.

Alternatively, the H.264-GPU mapping includes other and/or additional features.

In general, the term intra prediction refers a spatial prediction mode in which redundancy between adjacent blocks of the same picture is exploited. The H.264 standard specifies four different intra macroblock types: I_4×4, I_8×8, I_16×16 and I_PCM. For the I_PCM macroblock type, raw Y, U and V values are coded into the bit stream. Intra "prediction" is simply a copy operation handled before other intra prediction steps. For the other intra macroblock types, predicted sample values are calculated for a 4×4 block (for I_4×4 type), 8×8 block (for I_8×8 type) or 16×16 block (for I_16×16 type) using a set of pixel values from the left macroblock, above-left macroblock, above macroblock and/or above-right macroblock. These dependencies reduce the number of primitives (separate sets of data) that a GPU shader can execute in parallel within a wave for intra prediction.

More specifically, the intra prediction modes used to predict sample values create dependencies between the sample values of a current block and the sample values of one or more neighbors. An intra macroblock type has a number of available prediction modes, which typically correspond to different directions of extrapolation from the neighboring sample values into the current block. In the H.264 standard, there are nine prediction modes for I_4×4, nine prediction modes for I_8×8, and four prediction modes for I_16×16.

The logic specified in the H.264 standard for calculating spatial predictions in the various modes includes numerous formulas typically handled by branches or indirect calls in a CPU architecture. A direct mapping of the CPU approach to the example GPU architecture could result in execution of all of the branches for many blocks, which is very inefficient.

For the H.264-GPU mapping, one goal is increase parallelism (e.g., more primitives per shader and fewer shaders) in execution of shaders for the intra prediction. Another goal is to reduce wasted computations.

1. Using Waves for Intra Prediction.

In some embodiments, the decoder (with GPU) uses waves to efficiently perform intra prediction on a GPU architecture. Basically, the GPU uses different execution units to process different intra blocks within a wave in parallel. Effectively organizing waves helps the decoder reduce the number of waves while simultaneously increasing per wave parallelism.

Figure 50:
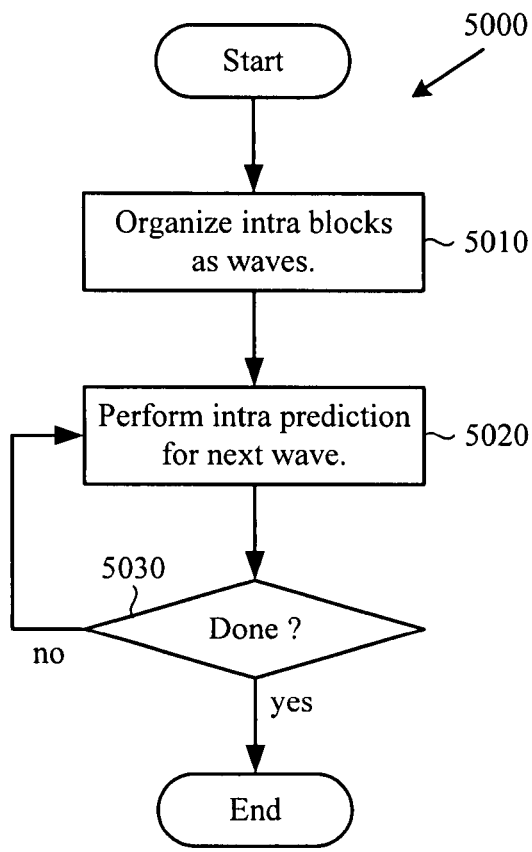
FIG. 50 is a flowchart of a generalized technique for performing intra prediction on a wave-by-wave basis.

FIG. 50 shows a technique (5000) for performing intra prediction using waves. A decoder such as the one described above with reference to FIG. 2 or other decoder performs the technique (5000).

To start, the decoder organizes (5010) intra blocks as waves. A wave includes one or more of the intra blocks. For example, the decoder organizes 4×4, 8×8, and 16×16 intra blocks as waves. Alternatively, the decoder organizes blocks of other and/or additional sizes.

In some embodiments, the decoder organizes the blocks as static waves based on how the blocks are laid out with respect to each other. Such static waves are laid out the same in different pictures, regardless of different slice or macroblock patterns in the different pictures. In general, a static wave is based on theoretical possibilities without considering actual data such as macroblock type and intra prediction mode. For example, the static waves roughly correspond to diagonal lines of blocks, starting from the top left corner and rippling toward the bottom right corner. The lines are tilted to the right because the neighboring sample values that can potentially be considered in spatial prediction for a current block are in blocks to the left of, above-left of, above, and above-right the current block.

While using static waves increases parallelism in some scenarios, the static waves may assume dependencies that do not actually exist between the blocks. Rather than assume a set of dependencies applies for a given block, the decoder can instead determine which dependencies actually are present between blocks. For example, if the context neighbors of a current intra block are in a different slice or are inter predicted, in some implementations, the current intra block does not use intra prediction from them, and intra prediction dependencies can be removed.

Aside from considering macroblock types and slice patterns, in some implementations the decoder also considers spatial prediction modes. Different spatial prediction modes have different dependencies, roughly corresponding to different directions of spatial extrapolation. For example, for many spatial prediction modes, a current block has no dependencies on the block to its above-right.

Often, organizing intra blocks as static waves results in too many waves. This can hurt performance due to switching overhead from wave-to-wave. Considering actual dependencies can help the decoder combine waves, making fewer waves that are typically bigger and therefore provide more opportunities for parallel processing.

So, in some embodiments, the decoder organizes the blocks as dynamic waves based on analysis of dependencies within the blocks. For example, the decoder organizes blocks as described in the following section. Alternatively, the decoder organizes blocks as dynamic waves using another approach.

In particular, in B slices and P slices, intra blocks are typically few in number and sparse. There are typically not many dependencies for intra blocks in B and P slices. Organizing intra blocks as dynamic waves (considering macroblock type to identify isolated intra blocks with no intra dependencies) can help process separate intra blocks in parallel within one wave for B and P pictures. For example, if a B slice includes six isolated I_16×16 macroblocks that share no edges, the six macroblocks are intra predicted in parallel in one wave.

For I slices, I_PCM macroblocks provide similar opportunities for removing intra prediction dependencies. I_PCM macroblocks are uncommon in many coding scenarios, however. Or, if the decoder considers actual prediction modes, organizing blocks as dynamic waves can help the decoder eliminate assumed spatial prediction mode dependencies that are not in fact present, which helps increase parallelism.

Returning to FIG. 50, after organizing (5010) blocks as waves, the decoder performs intra prediction on a wave-by-wave basis. The decoder performs (5020) intra prediction for a wave and determines (5030) whether to continue with another wave. If so, the decoder performs (5020) intra prediction for the next wave.

For example, the decoder performs intra prediction for wave 0, which includes the top-left intra block in a picture and any other intra block that has no intra prediction dependencies on another intra block. In some implementations, in a B picture or P picture, isolated intra blocks all over the picture can be processed as part of the first wave, since they have no intra prediction dependencies. The decoder then performs intra prediction for wave 1, which includes intra blocks that only have intra prediction dependencies on intra blocks in wave 0. Then, the decoder performs intra prediction for wave 2, which includes intra blocks that have intra prediction dependencies on intra blocks in waves 0 and 1. The decoder thus continues wave-by-wave through the picture.

Alternatively, instead of organizing intra blocks for a picture and performing wave-by-wave intra prediction across the picture, the decoder operates on a slice-by-slice or other basis.

2. Dynamic Waves for Intra Prediction.

In some embodiments, the decoder (with GPU) organizes intra blocks as dynamic waves for intra prediction. Building dynamic waves for pictures helps improve performance by reducing the number of waves and, correspondingly, increasing the number of intra blocks in the remaining waves. In particular, building dynamic waves improves performance for B and P slices because non-intra coded macroblocks in them provide wave boost, tending to cause intra blocks to be processed in earlier waves.

Figure 51:
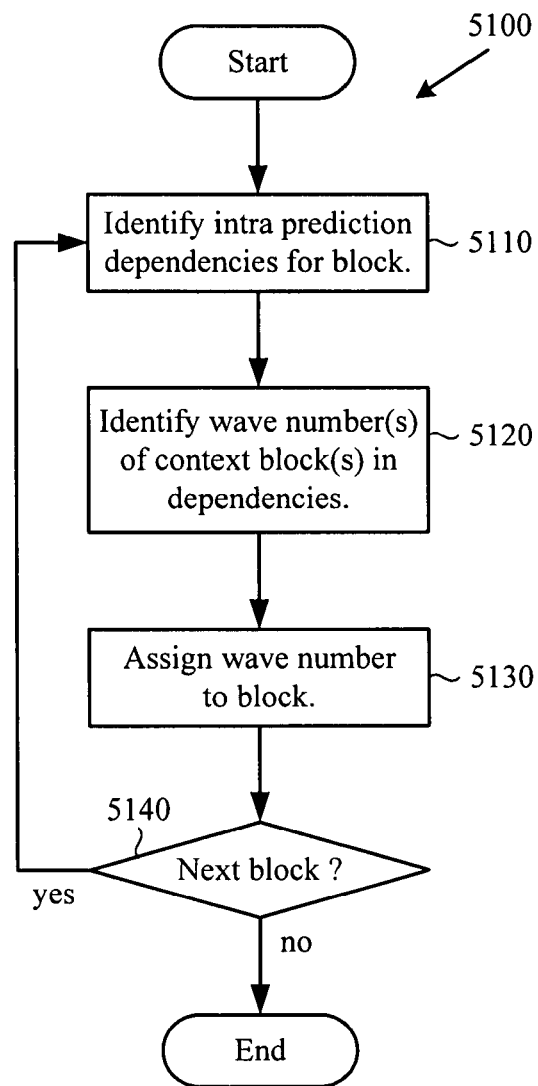
FIG. 51 is a flowchart of a generalized technique for organizing dynamic waves for intra prediction.

FIG. 51 shows an example technique (5100) for organizing intra blocks of a picture in dynamic waves. A decoder such as the one described above with reference to FIG. 2 or other decoder performs the technique (5100).

Initially, the decoder assigns a wave number of zero to the intra blocks in the picture. For a current block, the decoder identifies (5110) intra prediction dependencies for the block. For example, the decoder scans the image in macroblock/block order as in the H.264 standard.

The decoder identifies (5120) wave number(s) of neighbor block(s) upon which the current block has dependencies and assigns (5130) a wave number to the current block. For example, the decoder assigns wave number max (DEPBLK)+1 to the current block. In an H.264 decoder, DEPBLK represents wave number(s) for a set of one or more blocks whose members depend on macroblock type (intra or inter), prediction mode, frame type and MBAFF macroblock flags. More generally, DEPBLK indicates wave numbers for blocks upon which the current block depends for intra prediction. In some implementations, DEPBLK is implemented as a table of offsets subtracted from the position of the current block to determine positions (and then wave numbers) of adjacent blocks. The decoder determines (5140) whether to continue with another intra block in the picture and, if so, identifies (5110) intra prediction dependencies for the next intra block.

In some implementations, the block size for wave building is 8×8. Setting a block size sets a tradeoff between the number of waves and shader size. Setting block size to 4×4 typically doubles the number of waves but requires more memory; wave building is more computationally intensive but still linear in complexity.

In some implementations, the decoder increments a counter for number of blocks of different types within the respective waves. For example, when a block is assigned a wave number, a counter for that type of block (based on the type of the macroblock including the block) in that wave is incremented. Using the counters helps the decoder manage intra prediction computations more efficiently.

Finally, to speed up the wave building process in some implementations, the decoder performs the wave building on a slice-by-slice basis from the bottom up in a multi-slice picture. The last slice is processed first and scanned according to macroblock/block order within the slice. This makes the unavailability of neighboring macroblocks from different slices (for purposes of intra prediction) implicit.

3. Tracking Wave Organization.

Figure 52:
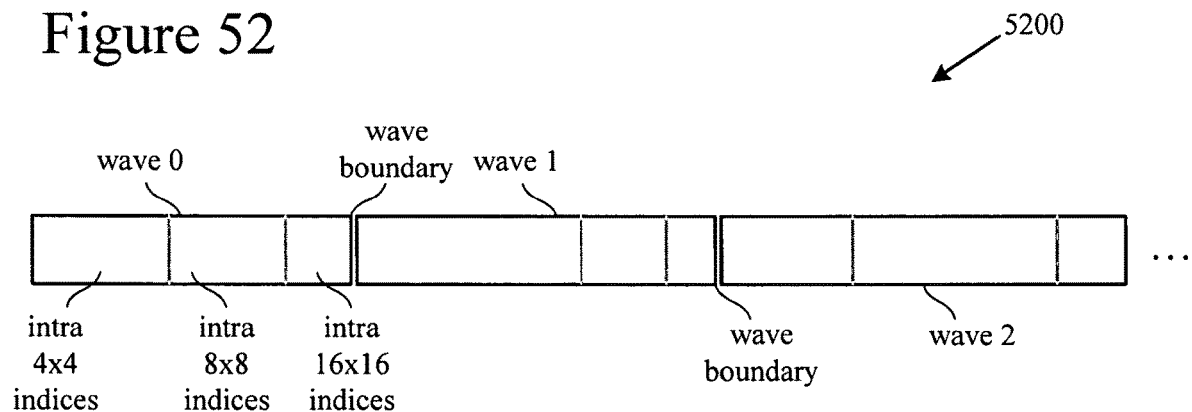
FIG. 52 is a diagram of a data structure for tracking how blocks are organized in waves.

In some embodiments, the decoder (with GPU) tracks organization of intra blocks as waves using a data structure such as the structure (5200) shown in FIG. 52. Alternatively, the decoder tracks organization of intra blocks as waves using another data structure.

The structure (5200) is organized wave-by-wave. The structure (5200) starts with a section for wave 0, followed by a section for wave 1, and so on. The section for a wave includes one or more sections for different block sizes for blocks in the wave. For example, the section for wave 0 includes an intra 4×4 section, an intra 8×8 section, and an intra 16×16 section. The intra 4×4 section includes indices of 4×4 intra blocks in wave 0, the intra 8×8 section includes indices of 8×8 intra blocks of that size in wave 0, and so on. The decoder uses raster scan numbering, for example, to index the blocks. As FIG. 52 shows, a given wave can include intra blocks of different sizes.

The decoder creates and populates the structure (5200), for example, when building waves. For example, the decoder performs an additional pass through a picture during wave building and records indices in an array of indices such as the structure (5200). The GPU then uses the structure (5200) during the wave-by-wave intra prediction.

4. Merging Luma Waves and Chroma Waves.

In some embodiments, the decoder (with GPU) merges luma waves and chroma waves to increase parallelism. When chroma prediction is independent of luma prediction, merging luma waves and chroma waves helps the GPU reduce the total number of waves and process more intra blocks in parallel within a given wave.

Figure 53:
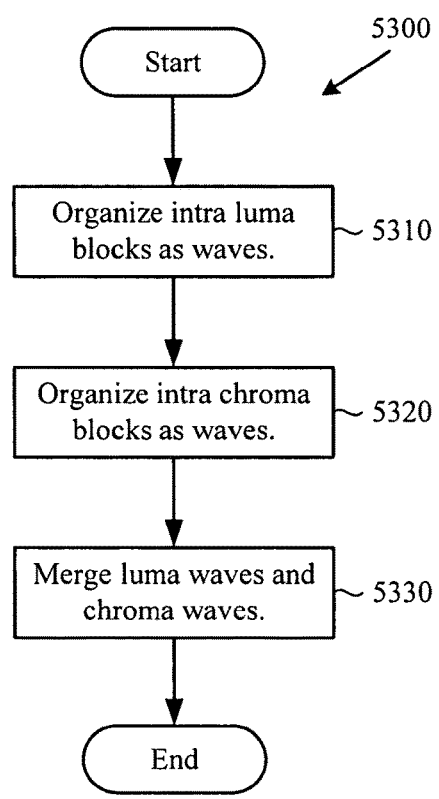
FIG. 53 is a flowchart of a generalized technique for merging luma waves and chroma waves.

FIG. 53 shows an example technique (5300) for merging luma waves and chroma waves. A decoder such as the one described above with reference to FIG. 2 or other decoder performs the technique (5300).

The decoder organizes (5310) intra luma blocks as waves. For example, the decoder uses a wave building technique described above or uses another wave building technique. The decoder also organizes (5320) intra chroma blocks as waves. The decoder can use the same or different wave building techniques for chroma blocks, performing the organizing (5310, 5320) separately in time or concurrently.

The decoder then merges (5330) the luma waves and chroma waves. For example, the decoder combines luma intra blocks for wave 0 with chroma intra blocks for wave 0, and so on. The luma intra blocks and chroma intra blocks with a wave may be collocated, or they may be at different locations due to different dependencies for luma and chroma. Luma prediction modes can be different than chroma prediction modes, for example, resulting in different dependencies.

5. Example Shaders with Refactored Intra Prediction Operations.

In some embodiments, the decoder (with GPU) uses refactored operations for intra prediction. This helps reduce wasted computation in intra prediction.

Formulas for different intra prediction modes have many computations in common. For example, in the H.264 standard, there are nine intra prediction modes for 4×4 intra blocks, and some of the prediction modes include several branches, but the different branches and modes have many computations in common.

Figure 54:
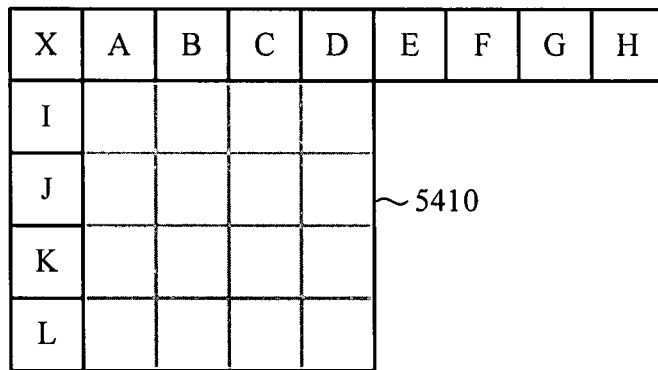
FIG. 54 is a chart illustrating sample positions referenced in refactored intra prediction operations.

FIG. 54 shows sample positions (5400) around a 4×4 intra block (5410) considered in the intra prediction modes according to the H.264 standard. Sample positions A, B, C and D are in the block above the current block (5410), and sample positions E, F, G and H are in the block above and to the right of the current block (5410). Sample position X is in the block above and left of the current block (5410), and sample positions I, J, K and L are in the block to the left of the current block (5410). Different branches of the various 4×4 intra prediction modes address different cases of sample positions (5400) being available/unavailable for intra prediction, or provide slightly different formulas for different positions with the current block (5410).

Several of the prediction modes compute (A+B+1)/2 as part of intra prediction. Several other prediction modes compute (A+2B+C+2)/4. Collectively, the intra prediction modes for intra 4×4 blocks (excluding the DC prediction mode) can be refactored using the following complete set of computations: (A,B,C); (B,C,D); (C,D,E); (D,E,F); (E,F,G); (F,G,H); (G, H,H); (I,J,K); (J,K,L); (J,I,X); (I,X,A); (X,A,B); (K,L,L); (A,B); (B,C); (C,D); (D,E); (E,F); (F,G); (G,H); (I,J); (J,K); (K,L); (I,X); and (X,A), where the letters refer to the sample positions shown in FIG. 54, the refactored operations with three sample positions (x,y,z) refer to an operation of the form (x+2y+z+2)/4, and the refactored operations with two sample positions (x,y) refer to an operation of the form (x+y+1)/2.

To reduce shader branches, a decoder can build a table that holds the results of the refactored operations for some or all of the modes of an intra macroblock type, to simplify intra prediction by providing common parts of possible prediction results for those modes. The decoder then selects the appropriate results when performing the intra prediction actually specified for the current block. For example, the decoder builds a table for eight 4×4 intra prediction modes (not DC mode) for a current 4×4 intra block and uses the table in intra prediction for the block, selecting appropriate values for a spatial prediction mode. The decoder handles DC mode separately.

The decoder can compute the values for the table using matrix multiplications. For example, the decoder computes the results of refactored operations for 4×4 intra prediction modes with two 4×4 matrix multiplications as follows.

$$\begin{bmatrix} A & B & C & D \\ I & J & K & L \\ J & I & X & A \\ I & X & A & B \end{bmatrix} \cdot \begin{bmatrix} 1 & 0 & 1 & 0 \\ 2 & 1 & 1 & 1 \\ 1 & 2 & 0 & 1 \\ 0 & 1 & 0 & 0 \end{bmatrix} \text{ and}$$

$$\begin{bmatrix} C & D & E & F \\ E & F & G & H \\ G & H & H & 0 \\ K & L & L & 0 \end{bmatrix} \cdot \begin{bmatrix} 1 & 0 & 1 & 0 \\ 2 & 1 & 1 & 1 \\ 1 & 2 & 0 & 1 \\ 0 & 1 & 0 & 0 \end{bmatrix}$$

Alternatively, the results of the refactored operations are computed in a different way. Commonality refactoring can be performed similarly for the prediction modes for other intra block sizes.

During intra prediction, the shader routine performs table lookups using the table. With the table, the number of branches in the shader is reduced, which speeds up execution and helps avoid wasted computation. Although computing the results of the refactored operations imposes additional overhead, efficient mechanisms (e.g., matrix multiplications) for computing the results of refactored operations can be used.

G. Loop Filtering Innovations Using Waves for GPU-Platform Decoding.

In some embodiments, a decoder uses loop filtering operations mapped to a GPU platform. For example, the decoder organizes blocks as waves and performs loop filtering on a wave-by-wave basis. Features of the example H.264-GPU mapping include:

1. using a multi-pass scheme for loop filtering on the GPU: calculate boundary strength, luma loop filtering, chroma loop filtering;
2. using fast boundary strength calculations;
3. building static waves to overcome dependencies in luma loop filtering; and
4. creating fully parallelizable chroma loop filtering with no edge dependencies.

Alternatively, the H.264-GPU mapping includes other and/or additional features.

1. Multi-Pass Loop Filtering with GPU.

In some embodiments, a decoder performs loop filtering in multiple independent passes to increase parallelism. For example, the different passes are for computing edge strengths, performing deblocking, and reshuffling results of the deblocking.

Figure 55:
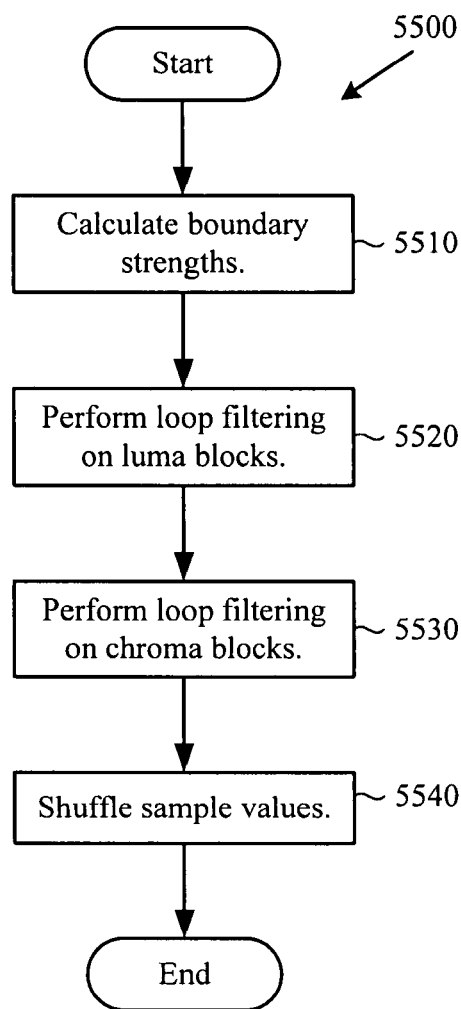
FIG. 55 is a flowchart of a generalized technique for performing loop filtering in multiple passes.

FIG. 55 shows an example technique (5500) for multi-pass loop filtering with a GPU. A decoder such as the one described above with reference to FIG. 2 or other decoder performs the technique (5500).

In a first pass, the decoder (with GPU) calculates (5510) boundary strengths and other data for each macroblock in a picture (or each macroblock pair for an MBAFF picture).

In a second pass, the decoder (with GPU) performs (5520) loop filtering on luma blocks and performs (5530) loop filtering on chroma blocks. For example, the loop filtering (5520, 5530) includes deblocking blocks in parallel according to different shaders for luma and chroma. The second pass can include a luma pass with wave-by-wave loop filtering of luma blocks and a chroma pass with single-wave loop filtering of chroma blocks. Loop filtering for a single wave can in turn be split into multiple passes, for example, a horizontal edge pass and vertical edge pass for luma loop filtering. Alternatively, the decoder uses a different timing for loop filtering on the luma blocks and chroma blocks.

In a third pass, the decoder (with GPU) shuffles (5540) sample values resulting from the second pass, in a fully parallel reshuffling stage. The sample values generated by the second pass are put into final image buffers. With the potential for reshuffling in the third pass, the decoder can exploit additional opportunities for efficient processing in the deblocking of the second pass.

2. Loop Filtering Using Waves for Luma Blocks.

In some embodiments, the decoder (with GPU) uses waves to efficiently perform loop filtering of luma blocks on a GPU architecture. Basically, the GPU uses different execution units to process different luma blocks within a wave in parallel.

Figure 56:
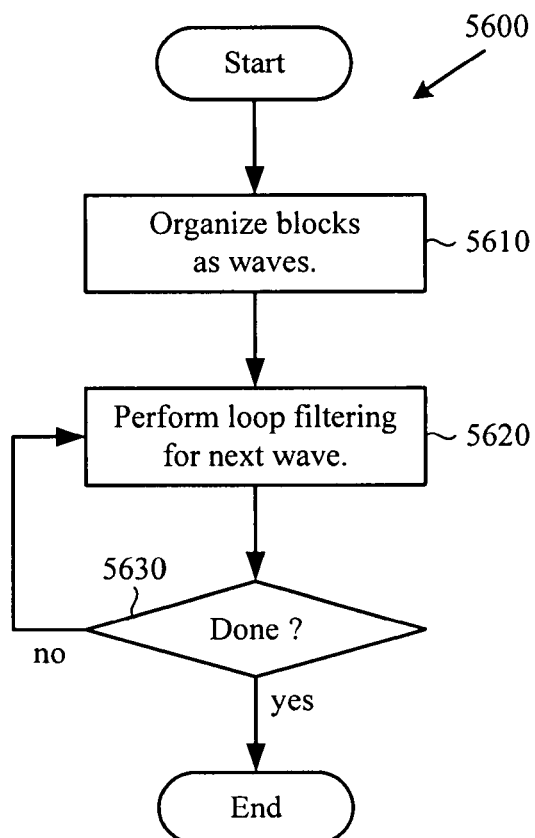
FIG. 56 is a flowchart of a generalized technique for performing loop filtering on a wave-by-wave basis.

FIG. 56 shows a technique (5600) for performing loop filtering using waves. A decoder such as the one described above with reference to FIG. 2 or other decoder performs the technique (5600).

To start, the decoder organizes (5610) luma blocks as waves. In doing so, the decoder identifies luma blocks that can be loop filtered in parallel.

In some embodiments, the decoder organizes macroblocks (or macroblock pairs) as static waves along diagonal lines. Such static waves are laid out regardless of edge strengths, but the structure of the waves does vary depending on the type of frame, MBAFF (macroblock pairs) or not. The static waves roughly correspond to diagonal lines of blocks, starting from the top left corner and rippling toward the bottom right corner. The number of waves relates to picture resolution and dimensions.

Alternatively, the decoder organizes luma blocks as dynamic waves, depending on boundary strengths. For example, boundary strength values are computed for a macroblock and used to reduce dependencies between the macroblock and other macroblocks.

After organizing (5610) blocks as waves, the decoder performs loop filtering on a wave-by-wave basis for the luma blocks. The decoder performs (5620) loop filtering on luma blocks for a wave and determines (5630) whether to continue with another wave. If so, the decoder performs (5620) loop filtering for the next wave.

In some embodiments, the decoder performs two passes for each loop filtering wave. The decoder performs loop filtering on vertical edges in the luma blocks in one pass, then it performs loop filtering on horizontal edges in the luma blocks in another pass.

Depending on implementation, a 4×4 block in the picture can be exported a variable number of times during different waves or passes within a wave. For instance, in a progressive frame, the top-left 4×4 block of an interior macroblock is exported for the vertical pass of its macroblock, and then for the horizontal pass. The bottom-right 4×4 block of the same macroblock is exported for the vertical pass of its macroblock's wave, then for the horizontal pass of the same wave; it is also exported for the vertical pass of the wave of the macroblock to its right, and finally for the horizontal pass of the wave of the macroblock below it. In some implementations, the decoder uses a scratch buffer to avoid overwriting data and make exports faster. When horizontal and vertical results are deposited into separate memory locations, it is possible to get the right information from horizontal and vertical buffers of a previous wave, or from the unfiltered pixels of the source image.

In some implementations, the decoder performs loop filtering by row or column in parallel, not macroblock-by-macroblock. In one GPU implementation, for each column or row of pixels in four 4×4 blocks in a macroblock, the decoder accepts five 4×4 blocks as input (namely, the five blocks around four vertical or horizontal edges) and outputs six 4×4 blocks. The decoder calculates and outputs one extra block above or to the left, and another one of padding for alignment purposes. This extra redundancy facilitates loop filtering according to the different dependency rules that apply to macroblock interiors and at macroblock external edges, for example, so that the macroblocks in a diagonal (including the edge macroblocks) can be processed simultaneously.

3. Loop Filtering Chroma Blocks as a Single Wave.

In some embodiments, a decoder (with GPU) performs loop filtering for chroma blocks in a single wave. When chroma blocks in a picture do not have dependencies for loop filtering (e.g., due to filters not reaching across certain edges), the chroma blocks are processed in parallel by the GPU. The chroma loop filtering can still include multiple passes for specialized loop filtering processing of different positions.

For some macroblock formats and filter types, chroma blocks throughout a picture can be loop filtered in parallel by a GPU. For example, for chroma loop filtering of 4:2:0 macroblocks according to the H.264 standard, chroma blocks have relatively few filtered edges, samples are spaced sufficiently far apart, and filters are sufficiently short, that chroma blocks do not have associated dependencies in loop filtering. As such, chroma deblocking is performed without wave-by-wave processing. Instead, chroma blocks are loop filtered as part of a single wave.

The single wave loop filtering can include multiple passes for different portions of the chroma blocks. The chroma blocks are processed in parallel, with different block portions being filtered in different passes.

Figures 57, 58:
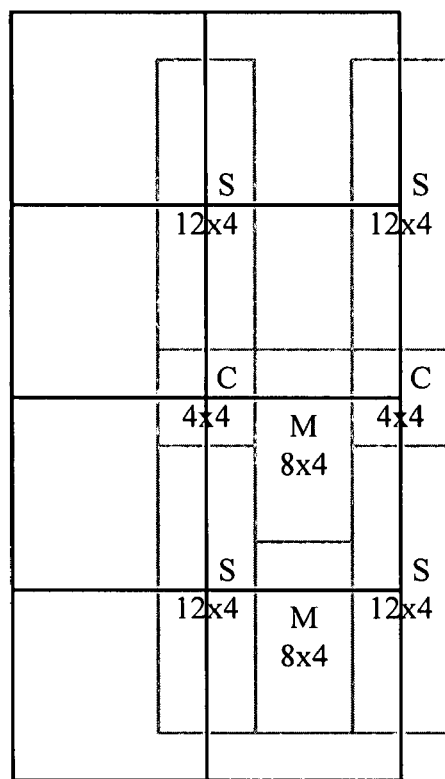
FIGS. 57 and 58 are diagrams illustrating portions filtered in different loop filtering passes.

For example, FIG. 57 shows an 8×8 chroma block (5700) of a progressive macroblock. The 8×8 chroma block (5700) includes different portions that are loop filtered in different loop filtering passes. Specifically, the 8×8 chroma block (5700) has 9 regions: a 4×4 region ("M") in the middle, two 2×4 regions ("S") on the left and right sides of the middle, two 4×2 regions ("T") above and below the middle, and four 2×2 regions ("C") in the corners.

Different regions in a block can be processed independently of the other regions in the block in loop filtering. Regions that touch the edge of a macroblock are processed together with the regions on the other side of the edge.

In some implementations, the chroma blocks of a picture are loop filtered in four passes, without any waves. One pass corresponds to 4×4 blocks centered around the top-left corners of the chroma blocks. For the 8×8 chroma block (5700) of FIG. 57 (collocated with the luma macroblock and coextensive in the chroma plane), the block's top left 2×2 corner is filtered in this pass, along with corners from up to three other chroma blocks of macroblocks. The other 2×2 corners of the chroma block (5700) are similarly filtered in this pass with corner(s) from other chroma block(s).

Another pass corresponds to 4×4 blocks centered on the top edges of the macroblocks (and collocated chroma blocks). The top 4×2 region of the 8×8 block (5700) in FIG. 57 is filtered with the bottom 4×2 region of the block above it (if available), and the bottom 4×2 region of the 8×8 block (5700) is filtered with the top 4×2 region of the block below it (if available).

Another pass correspond to 4×4 blocks centered on the left edges of the macroblocks (and collocated chroma blocks). The left side 2×4 region of the 8×8 block (5700) in FIG. 57 is filtered with the right side 2×4 region of the block to the left (if available), and the right side 2×4 region of the 8×8 block (5700) is filtered with the left side 2×4 region of the block to the right (if available).

Another pass corresponds to 4×4 blocks centered on the macroblocks.

In some implementations, the loop filtering operations for chroma blocks use a set of intermediate buffers and include some redundant calculations. Overall, however, performing multi-pass loop filtering within a single wave has increased parallelism compared to wave-by-wave approaches for chroma loop filtering.

FIG. 58 shows a set of 8×8 chroma blocks (5800) for a macroblock pair in a MBAFF picture. For MBAFF pictures, the multi-pass pattern for loop filtering is more complicated. FIG. 58 shows example partitions for multiple passes. Other improvements in chroma loop filtering for MBAFF pictures include adaptive field/frame shaders and reducing the number of redundant computations by adding another pass before reshuffling.

Alternatively, chroma blocks are filtered with other and/or additional passes in a single wave. Or, chroma blocks are loop filtered on a wave-by-wave basis.

H. Memory Usage Innovations for GPU-Platform Decoding.

In some embodiments, a decoder uses memory usage innovations adapted for a GPU platform. For example, the decoder uses memory tiling and 3D texture arrays for fast data access. Features of the example GPU mapping include:

1. using texture arrays for reference pictures or other data;
2. using memory tiling for 4×4 block operations or other operations;
3. using field/frame access mechanisms to efficiently store frames and their complementary fields; and
4. using reference picture tiling.

Alternatively, the H.264-GPU mapping includes other and/or additional features. For other operations or another type of GPU, the decoder uses different memory usage innovations.

Memory write patterns can dramatically affect performance for the GPU. In some implementations, to improve performance, a picture is kept in a 4×4 tiled format during decoding. This helps make both intra decoding and inter decoding (e.g., motion compensation) faster than if the normal scan line representation is used. Also, for deblocking, the decoder reads directly from the tiled image representation, which avoids reshuffling.

Memory read patterns can also dramatically affect GPU performance. In some implementations, the decoder extends the 4×4 tiled format to reference pictures in the decoded picture buffer (e.g., implemented as a 3D texture). This facilitates fast fetching of data by motion compensation shaders.

Other aspects of these memory usage innovations (e.g., representing reference pictures with textures, field/frame access, having multiple memory partitions or slot assignments in flight) are presented above (e.g., in section X.D or in conjunction with specific decoding operations).

I. Film Grain Noise Generation for GPU-Platform Decoding.

In some embodiments, a decoder uses film grain noise generation mapped to a GPU platform. For example, the decoder (with GPU) generates film grain noise and performs deblocking (since the H.264 noise generation is block-based). Features of the example H.264-GPU mapping include:

1. using pre-computed seed data; and
2. using pattern deblocking without dependencies.

Alternatively, the H.264-GPU mapping includes other and/or additional features.

According to the H.264 standard, certain types of supplemental enhancement information ("SEI") messages support modeling of film grain as film grain parameters to be sent along with coded video. As post-processing, the decoded video can be enhanced with film grain noise synthesized according to parameters. In some implementations, the decoder (with GPU) improves performance of film grain synthesis by using pre-computed seed data and/or performing pattern deblocking without dependencies.

J. Adaptive Loop Filtering with Quality Feedback for GPU-Platform Decoding.

At times, a decoder may encounter content that is harder to decode (e.g., because it has a higher complexity or is encoded at a higher quality) or the decoder may experience an unexpected resource shortage (e.g., lack of available processor cycles or memory because of other processes running). In such situations, the decoder may need to degrade the quality of the decoded video to simplify decoding. The decoder can do this by dropping pictures, for example, but picture dropping may provide more of an adjustment than is needed.

In some embodiments, a decoder uses adaptive loop filtering with quality feedback to gradually degrade video quality and simplify decoding. The quality feedback generally relates to performance of the decoder as it decodes video. For example, the decoder switches between different deblocking algorithms for loop filtering. In some implementations (e.g., H.264 decoders), loop filtering is part of "conformant" decoding to correctly decode video, and changing loop filtering can result in drift away from the correctly decoded video. Nevertheless, in some decoding scenarios, such quality degradation can be less objectionable to viewers than picture dropping to simplify decoding. Performance-adaptive loop filtering can be used in conjunction with picture dropping such that playback glitches due to picture dropping are reduced by selectively switching loop filtering quality levels to relieve the decoder earlier in stress situations, and overall quality is improved.

Figure 59:
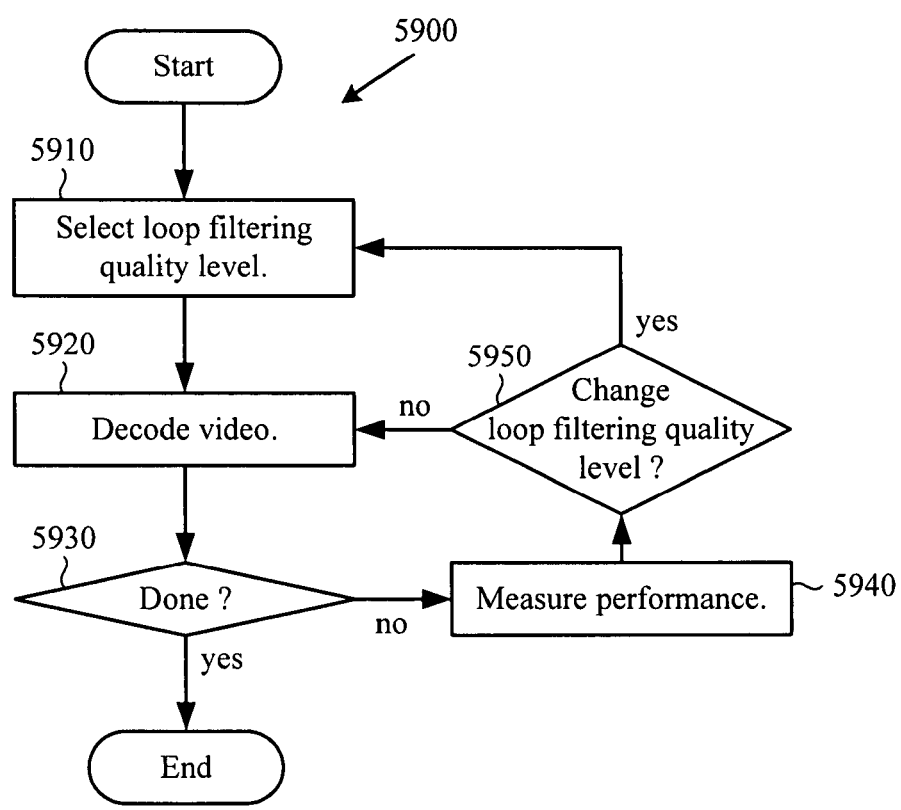
FIG. 59 is a flowchart of a generalized technique for adapting loop filtering in response to changes in decoding performance.

FIG. 59 shows a technique (5900) for performance-adaptive loop filtering during decoding. A decoder such as the one described above with reference to FIG. 2 or other decoder performs the technique (5900).

The decoder selects (5910) a loop filtering quality level from among multiple available loop filtering quality levels. Example quality levels in some implementations (including no loop filtering, full loop filtering, and multiple fast loop filtering options in between) are described below. Alternatively, the decoder selects between other and/or additional available loop filtering quality levels.

Initially, the selected loop filtering quality level has a value set for the decoder or decoding session, for example, the highest loop filtering quality level. During decoding, the decoder can adjust the selected loop filtering quality level from time-to-time, as described below.

The decoder decodes (5920) video, performing loop filtering at the selected loop filtering quality level. For example, the decoder decodes one or more pictures of the video at the selected loop filtering quality level.

The decoder determines (5930) if it is done (e.g., at the end of the sequence) and, if not, measures (5940) performance. In some implementations, the decoder measures a count of previously decoded pictures that are queued and ready for display, and the decoder also measures how many decoded pictures in a given window, or range, of pictures, have been decoded at a given quality level. Alternatively, the decoder measures performance in other terms such as delay between presentation times of pictures versus actual delay or another measure of latency, or current processing capacity.

In some implementations, the decoder measures short-term performance and long-term performance as part of performance-adaptive loop filtering. The decoder measures performance on picture-by-picture basis, for example, by tracking a count of pictures ready for display. The decoder concurrently measures longer term performance for n pictures in a window of pictures. Alternatively, the decoder measures performance in some other interval.

Using the measured performance, the decoder determines (5950) whether to change the loop filtering quality level. The decoder can use the measured performance directly or indirectly in the determination (5950). For example, the decoder uses a performance metric directly in conditional logic or a table lookup operation to determine (5950) whether to change the quality level and, potentially, selects (5910) a new loop filtering quality level. Or, the decoder uses a performance metric to adjust other parameter(s) or decision(s) in turn used in determining (5950) whether to change the quality level. If the loop filtering quality level is unchanged, the decoder continues decoding (5920) video with loop filtering at the same quality level. Otherwise, the decoder selects (5910) a new loop filtering quality level and decodes (5920) video with loop filtering at the new quality level.

Loop filtering can be complex, especially when a decoder makes content-adaptive and dynamic decisions depending on macroblock and block types in a picture, sample value differentials across edges, etc. In performance-adaptive loop filtering, different available loop filtering quality levels basically trade off decoding complexity versus quality of reconstruction of the decoded video. Faster loop filtering quality levels typically have lower decoding complexity but lower quality (e.g., more discrepancies and drift due to skipped decisions in loop filtering). The discrepancies can show up, for example, as increased blurriness for lower complexity and quality loop filtering levels. Slower loop filtering quality levels typically have higher decoding complexity and higher quality. In some implementations, the decoder selects between the quality levels shown in the following table.

| Loop Filtering Quality Level | Description |
| --- | --- |
| A. No loop filtering. | The decoder performs no loop filtering. |
| B. Fast loop filtering of luma; no loop filtering of chroma. | The decoder performs non-conformant deblocking of the luma plane for a picture, filtering vertical edges of luma blocks without accounting for inter-MB dependencies, then filtering horizontal edges of luma blocks without accounting for inter-MB dependencies. The decoder performs no loop filtering of the chroma planes for the picture. |
| C. Fast loop filtering of luma; conformant loop filtering of chroma. | The decoder performs non-conformant deblocking of the luma plane for a picture as in level B. The decoder performs full, conformant loop filtering of the chroma planes for the picture. |

-continued

| Loop Filtering Quality Level | Description |
|---|---|
| D. Conformant loop filtering of luma; no loop filtering of chroma. | The decoder performs conformant deblocking of the luma plane for a picture. The decoder performs no loop filtering of the chroma planes for the picture. |
| E. Conformant loop filtering. | The decoder performs conformant deblocking of the luma plane and chroma planes for a picture. |

Alternatively, the decoder uses other and/or additional loop filtering quality levels in performance-adaptive loop filtering for different tradeoffs in decoding complexity, quality and robustness to levels of performance changes in decoding.

In some implementations, the decoder measures short-term performance as a count of how many pictures are buffered for digital to analog conversion ("DAC"). In particular, in one implementation, the decoder determines how far ahead pictures are buffered for DAC, measuring the difference between (1) the most recent vertical blanking interval ("VBI") or presentation time (generally, the time at which the DAC will refresh the screen with video data from memory) and (2) the VBI or presentation time for the picture as far ahead as any picture is currently scheduled for display. This count of pictures can be considered a queue length. Alternatively, the decoder uses another metric for short-term performance.

In some implementations, the decoder measures long-term performance as proportions of how many pictures in a window, or range, are decoded using different quality levels. Alternatively, the decoder uses another metric for short-term performance.

In some implementations, the decoder uses a multi-stage framework to organize the timing and types of level switching that happen performance-adaptive loop filtering. In an example five-stage framework, each of five stages has associated with it one or more of quality levels A to E, shown above. Each stage has different a "stage-best" quality level within the stage. For stage 1, the stage-best quality level is A, for stage 2 the stage-best quality level is B, and so on. Within a stage, the decoder selects between (1) level A, (2) the lesser of level B and the stage-best quality level for the stage, and (3) the stage-best quality level for the stage. The following table shows stages 1 to 5 in the example five-stage framework.

| Stage | Stage-Best Level | Available Quality Levels |
|---|---|---|
| 1 | A | A, min(B, A), A = (A) |
| 2 | B | A, min(B, B), B = (A, B) |
| 3 | C | A, min(B, C), C = (A, B, C) |
| 4 | D | A, min(B, D), D = (A, B, D) |
| 5 | E | A, min(B, E), E = (A, B, E) |

Within a stage, the decoder selects between the available loop filtering quality levels of the stage using (directly or indirectly) measured performance. For example, the decoder uses a current queue length (count of pictures ready for display) for short-term adjustments and uses a proportion of pictures decoded at stage-best quality levels for long-term adjustments. Depending on these measures, the decoder can switch from a current stage to a lower stage to decrease decoding complexity/quality, or the decoder can switch from the current stage to a higher stage to increase decoding complexity/quality. The decoder can switch between stages one at a time or more aggressively switch between stages, depending on implementation.

In one implementation, the decoder evaluates current queue length from time-to-time (e.g., on a picture-by-picture basis) and switches to a low complexity/quality level when the queue length gets too short. For example, if the queue length is less than two, the decoder performs no loop filtering (A) and switches to the next lower stage. Otherwise, if the queue length is less than four (but more than one), the decoder selects the lesser of level B and the stage-best quality level but stays in the current stage. Otherwise (queue length is four or more), the decoder selects the stage-best quality level and stays in the current stage. The thresholds for queue length also vary depending on implementation.

In the same implementations, the decoder evaluates also evaluates proportions of pictures decoded at stage-best levels from time-to-time (e.g., on a picture-by-picture basis) and switches between complexity/quality levels depending on the proportions. For example, if less than p % of the pictures in a current window of n pictures were loop filtered at the stage-best level for the current stage, the decoder switches to the next lower stage. Or, if more than q % of the picture in the current window were loop filtered at the stage-best level for the current stage, the decoder switches to the next higher stage. The values p, q and n depend on implementation and are, for example, p=80, q=90 and n=20. The decoder generally attempts to stay in the best quality stage (5 in the five-stage framework) as much as possible while still adapting to decoding performance for the content.

The decoder can reset statistics (e.g., number of pictures deblocked at stage-best quality level or min(B, stage-best quality level) when a window of pictures has been processed. Or, the decoder can use a sliding window. The decoder typically resets such statistics when it changes stages in a multi-stage framework.

Alternatively, the decoder uses a framework for performance-adaptive loop filtering with different timing and/or types of loop filtering quality level switching.

XIII. Features.

Different embodiments may include one or more of the inventive features shown in the following table of features.

| # | Feature |
|---|---|
| | A. Multithreading Innovations. |
| A1. | A method comprising: selecting a threading mode from among plural available threading modes, the plural available threading modes including a single CPU thread mode, a multiple CPU thread mode, and a one or more CPU thread plus GPU thread mode; and decoding video in the selected threading mode. |

-continued

| # | Feature |
|---|---|
| A2. | A method comprising:<br>identifying decoding dependencies for plural macroblocks of a picture;<br>organizing the plural macroblocks as one or more segments for<br>multithreaded decoding, each of the one or more segments including a part of a<br>slice, a slice, plural slices, or parts of plural slices; and<br>decoding the picture, including scheduling the one or more segments for<br>multithreaded decoding on a segment-by-segment basis.<br>Recovery Mechanisms |
| A3. | A method comprising:<br>finding a picture in an encoded video bit stream;<br>determining if the picture is an I picture;<br>if the picture is an I picture, scheduling one or more decoding tasks for<br>the picture for multithreaded decoding; and<br>if the picture is not an I picture, cleaning up the picture and repeating<br>the method for a next picture in the encoded video bit stream. |
| A4. | The method of A3 wherein the finding includes initializing structures<br>for parameters and data for the picture, and wherein the cleaning up includes<br>releasing memory used by the parameters and data for the picture. |
| A5. | The method of A3 further comprising detecting corruption in the<br>encoded video bit stream, wherein a decoder performs the finding as part of<br>recovery from the corruption in the encoded video bit stream. |
| A6. | The method of A3 further comprising receiving an indicator of an<br>arbitrary location within the encoded video bitstream, wherein a decoder<br>performs the finding as part of start up of decoding from the arbitrary location<br>within the encoded video bitstream. |
| A7. | A method comprising:<br>catching an error during decoding of a picture from an encoded video bit stream;<br>determining if the error is fatal;<br>if the error is fatal, cleaning up the picture;<br>if the error is not fatal, determining whether the picture successfully<br>enters a decoded picture buffer;<br>if the picture successfully enters the decoded picture buffer,<br>marking the picture as skipped; and<br>otherwise, cleaning up the picture. |
| A8. | The method of A7 wherein the error is a non-fatal slice header error for<br>a slice in the picture, wherein the picture fails to successfully enter the decoded<br>picture buffer, and wherein decoding continues with a next picture. |
| A9. | The method of A7 wherein the cleaning up the picture include removing<br>commands in a picture command queue and releasing memory used for<br>structures for the picture. |
| A10. | The method of A7 wherein a decoder performs the method, wherein the<br>error is a fatal error, the method further comprising closing the decoder. |
| A11. | The method of A7 wherein, if the error is non-fatal, the method further<br>comprises repeating the method for one or more other pictures from the<br>encoded video bit stream until an error-free picture is found or a fatal error is<br>encountered. |
| A12. | A method comprising:<br>catching an error during decoding of a picture from an encoded video bit stream;<br>if the error occurred during a picture extent discovery stage, processing<br>the error by cleaning up the picture or skipping decoding of the picture; and<br>if the error occurred during another stage, processing the error using<br>error handling. |
| A13. | The method of A12 wherein the error indicates part of the encoded<br>video bit stream for a slice in the picture is corrupted, and wherein the error<br>handling comprises skipping decoding of the slice but decoding one or more<br>other slices in the picture. |
| A14. | The method of A12 wherein the error indicates part of the encoded<br>video bit stream for a slice in the picture is corrupted, and wherein the error<br>handling comprises concealing the error for the slice and decoding one or more<br>other slices in the picture.<br>B. Innovations in Neighbor Determination. |
| B1. | A method comprising:<br>getting one or more tables indicating neighbor availability relationships<br>between macroblocks, blocks and/or sub-blocks; and<br>using the one or more tables to determine neighbor availability during<br>decoding operations. |
| B2. | The method of B1 wherein the one or more tables includes a first<br>availability table indicating different macroblock neighbor or macroblock pair<br>neighbor patterns and a second availability table indicating different sub-<br>macroblock neighbor patterns. |

| # | Feature |
|---|---|
| B3. | The method of B2 wherein the first availability table is pre-determined. |
| B4. | The method of B2 wherein the second availability table is created for a decoding session. |
| B5. | The method of B1 wherein the decoding operations are for a progressive picture or field picture, and wherein the neighbor availability includes macroblock neighbor availability. |
| B6. | The method of B1 wherein the one or more tables include a first availability table and a second availability table, and wherein the using the one or more tables includes:<br>setting up a state machine for plural macroblocks in a slice;<br>determining macroblock neighbor availability using the state machine and the first availability table; and<br>determining sub-macroblock neighbor availability using the macroblock neighbor availability and the second availability table. |
| B7. | The method of B6 wherein, for a given state, the state machine stores information indicating number of consecutive macroblocks in the state and an index to the first availability table indicating availability information for the state. |
| B8. | The method of B6 wherein the first availability table associates different states with different macroblock neighbor availability patterns. |
| B9. | The method of B6 wherein the second availability table associates different macroblock neighbor availability patterns with different block/sub-block neighbor availability patterns. |
| B10. | The method of B1 wherein the decoding operations are for a macroblock adaptive field frame picture, and wherein the neighbor availability includes macroblock pair neighbor availability. |
| B11. | The method of B1 wherein the one or more tables include a first availability table and a second availability table, and wherein the using the one or more tables includes:<br>setting up a state machine for plural macroblock pairs in a slice;<br>setting up a neighbor context vector for each macroblock of the plural macroblock pairs in the slice;<br>determining macroblock pair neighbor availability using the state machine and the first availability table;<br>determining sub-macroblock neighbor availability using the macroblock pair neighbor availability and the second availability table. |
| B12. | The method of B11 wherein the neighbor context vector indicates field or frame mode for a current macroblock pair, field or frame mode for each of plural neighbor macroblock pairs, and whether the current macroblock is a top or bottom macroblock in its macroblock pair. |
| B13. | The method of B11 wherein, for a given state, the state machine stores information indicating number of consecutive macroblock pairs in the state and an index to the first availability table indicating availability information for the state. |
| B14. | The method of B11 wherein the first availability table associates different states with different macroblock pair neighbor availability patterns. |
| B15. | The method of B11 wherein the second availability table associates different macroblock pair neighbor availability patterns and current macroblock patterns with different block/sub-block neighbor availability patterns. |
| B16. | The method of B1 wherein the using the one or more tables includes storing location information for neighboring macroblocks. |
| B17. | The method of B14 wherein the location information is stored as offsets from a current macroblock. |
| B18. | The method of B1 wherein the decoding operations include one or more of CABAC decoding, spatial intra prediction, mode computation for intra prediction, and CAVLC decoding. |
| B19. | The method of B1 wherein the using the one or more tables involves a hierarchical determination at macroblock level then sub-macroblock level. |
| B20. | A method comprising:<br>determining macroblock or macroblock pair neighbor availability during decoding operations; and<br>determining sub-macroblock neighbor availability during the decoding operations using information from the determined macroblock or macroblock pair neighbor availability. |
| | C. CABAC Decoding Innovations. |
| C1. | A method comprising:<br>entropy decoding encoded video information from an encoded video bit stream, the encoded video information having been encoded using context-adaptive binary arithmetic coding, wherein the entropy decoding comprises:<br>loading bits of the encoded video information from the encoded video bit stream on a machine word-by-machine word basis, as necessary, for context-adaptive binary arithmetic decoding; and<br>using results of the entropy decoding in reconstruction of the video information. |
| C2. | The method of C1 wherein the machine word has 32 bits or 64 bits. |
| C3. | A method comprising:<br>entropy decoding encoded video information from an encoded video bit |

| # | Feature |
|---|---------|
| | stream, the encoded video information having been encoded using context-adaptive binary arithmetic coding, wherein the entropy decoding comprises: storing an encoded video information value being decoded and plural available stream bits together in a first variable; storing bit count information for the first variable in a second variable; and using the first and second variables in context-adaptive binary arithmetic decoding; and using results of the entropy decoding in reconstruction of the video information. |
| C4. | The method of C3 further comprising loading the plural available stream bits directly into the first variable from the encoded video bit stream. |
| C5. | The method of C3 further comprising, during the context-adaptive binary arithmetic decoding: left shifting the first variable by one or more bits, thereby updating the encoded information value being decoded and incorporating one or more of the plural available stream bits stored in the first variable; and updating the bit count information in the second variable. |
| C6. | The method of C5 further comprising: determining whether or not to replace stream bits in the first variable; and if stream bits are to be replaced, adding at least some new stream bits from the encoded video bit stream to the first variable. |
| C7. | The method of C6 wherein stream bits are added on a half-word-by-half word basis. |
| C8. | A method comprising: entropy decoding encoded video information from an encoded video bit stream, the encoded video information having been encoded using context-adaptive binary arithmetic coding, wherein the entropy decoding comprises, during renormalization in context-adaptive binary arithmetic decoding: determining a multiplication amount; and multiplying a range by the multiplication amount; and using results of the entropy decoding in reconstruction of the video information. |
| C9. | The method of C8 wherein the multiplying comprises left shifting by a left shift amount corresponding to the multiplication amount. |
| C10. | The method of C8 further comprising: left shifting an encoded information value being decoded by a left shift amount corresponding to the multiplication amount. |
| C11. | The method of C8 wherein the multiplication amount is a dynamic shift amount, and wherein the multiplying comprises performing a dynamic shift operation. |
| C12. | The method of C8 wherein a table maps different range values to different multiplication amounts, and wherein the determining comprises looking up the range in the table to find a multiplication amount. |
| C13. | The method of C8 wherein unrolled loop logic maps at least some different range values to different multiplication amounts, and wherein the determining comprises traversing the unrolled loop logic. |
| C14. | The method of C13 wherein the determined multiplication amount is one of the different multiplication amounts in the unrolled loop logic, and wherein the multiplying comprises performing a fixed shift operation. |
| C15. | The method of C13 wherein a table maps remaining range values to other multiplication amounts, and wherein the determining comprises traversing the unrolled loop logic then looking up the range in the table to find the multiplication amount. |
| C16. | A method comprising: entropy decoding encoded video information from an encoded video bit stream, the encoded video information having been encoded using context-adaptive binary arithmetic coding, wherein the entropy decoding comprises: splitting context-adaptive binary arithmetic decoding for frequency coefficients into plural context-adaptive binary arithmetic decoding units, each of the plural context-adaptive binary arithmetic decoding units being adapted for a different frequency interval for the frequency coefficients; and using results of the entropy decoding in reconstruction of the video information. |
| C17. | The method of C16 wherein the plural context-adaptive binary arithmetic decoding units include a first decoding unit adapted for a lower frequency interval and a second decoding unit adapted for a higher frequency interval. |
| C18. | The method of C16 wherein the entropy decoding further comprises, calling a core decoding function from each of the plural context-adaptive binary arithmetic decoding units. |
| C19. | The method of C16 wherein each of the plural context adaptive binary arithmetic decoding units includes logic adapted for probabilistic expectations of the frequency interval of the context adaptive binary arithmetic decoding unit. |
| C20. | The method of C19 wherein the entropy decoding further comprises, for each of the plural context adaptive binary arithmetic decoding units: calling a core decoding function from within the logic adapted for |

| # | Feature |
|---|---|
| | probabilistic expectations of the frequency interval of the context adaptive binary arithmetic decoding unit. |
| C21. | A method comprising: <br> entropy decoding encoded video information from an encoded video bit stream, the encoded video information having been encoded using context-adaptive binary arithmetic coding, wherein the entropy decoding comprises: using a state machine that calls a core decoding function for context-adaptive binary arithmetic decoding; and using results of the entropy decoding in reconstruction of the video information. |
| C22. | The method of C21 wherein the state machine implements a cascade of conditional logic using a position state and transition table. |
| C23. | The method of C22 wherein the transition table indicates a next state based at least in part upon a current state and results of a call to the core decoding function. |
| C24. | The method of C21 wherein the state machine implements logic for a first decoding function, and wherein the entropy decoding further comprises: using a second state machine that calls the core decoding function for context-adaptive binary arithmetic decoding, wherein the second state machine implements logic for a second decoding function different than the first decoding function. |
| | D. Trick Play Mode Innovations. |
| D1. | A method comprising: <br> decoding video in a first playback mode of a decoder; receiving a mode switch command; draining the decoder; and decoding video in a second playback mode of the decoder, the second playback mode being different than the first playback mode. |
| D2. | The method of D1 wherein the first playback mode is a normal playback mode and the second playback mode is a trick mode. |
| D3. | The method of D1 wherein the first playback mode is a trick mode and the second playback mode is a normal playback mode. |
| D4. | The method of D1 wherein the first playback mode is a first trick mode and the second playback mode is a second trick mode. |
| D5. | The method of D1 wherein at least one of the first playback mode and the second playback mode is a trick mode, and wherein the trick mode is fast forward mode or fast backward mode. |
| D6. | The method of D6 wherein, for the trick mode, the decoder decodes only I pictures. |
| D7. | The method of D6 wherein, for the trick mode, the decoder decodes only I pictures, and wherein the decoder provides multiple display rate options in which different proportions of I pictures are skipped. |
| D8. | The method of D1 wherein the draining the decoder includes stopping input to the decoder until the decoder consumes what it has previously accepted as input in the first playback mode. |
| D9. | The method of D1 wherein the draining the decoder includes releasing memory used for the decoding video in the first playback mode and/or waiting for working threads for the decoding to rest. |
| D10. | The method of D1 wherein, for the trick mode, the decoder bypasses DPB management logic used in multithreaded decoding. |
| D11. | A method comprising: <br> switching from a normal video playback mode to a trick video playback mode; and decoding video in the trick playback mode, wherein one or more delay reduction mechanisms reduce latency in switching from the normal video playback mode to the trick video playback mode. |
| D12. | The method of D11 wherein the one or more delay reduction mechanisms include reducing size of an output buffer. |
| D13. | The method of D11 wherein the one or more delay reduction mechanisms include outputting decoded pictures directly to an output buffer, bypassing decoded picture buffer logic. |
| D14. | The method of D11 wherein the one or more delay reduction mechanisms include finding I pictures in an encoded video bit stream by seeking special-purpose access delimiters. |
| | E. Recovery Using Picture Dropping. |
| E1. | A method comprising: <br> creating a dependency tracking structure in which reference relationships between at least some of plural pictures of a video sequence are tracked; in a picture dropping mode, selecting one or more of the plural pictures to drop based at least in part on the dependency tracking structure; decoding plural non-dropped pictures among the plural pictures; and outputting the plural non-dropped decoded pictures for display. |

| # | Feature |
|---|---|
| E2. | The method of E1 wherein the dependency tracking structure is a task dependency graph that organizes decoding tasks for segments, and wherein the reference relationships are represented in the task dependency graph as dependencies between some of the decoding tasks for segments. |
| E3. | The method of E1 wherein the dependency tracking structure includes nodes and edges, and wherein at least some of the edges indicate the reference relationships. |
| E4. | The method of E1 further comprising marking the one or more selected pictures to drop as skipped, wherein decoding is skipped for the one or more skipped pictures. |
| E5. | The method of E4 wherein a decoded picture buffer tracks the plural non-dropped decoded pictures and tracks the one or more skipped pictures. |
| E6. | The method of E4 wherein the marking includes updating the dependency tracking structure for the one or more skipped pictures. |
| E7. | The method of E4 wherein the marking includes: marking a first picture of the one or more skipped pictures as skipped in the dependency tracking structure; and propagating skipped status to at least one other picture of the one or more skipped pictures, the at least one other picture being dependent on the first picture for reference. |
| E8. | The method of E1 wherein a picture extent discovery module of a decoder performs the selecting. |
| E9. | The method of E1 further comprising: receiving a control signal; and selecting the picture dropping mode from among plural available picture dropping modes based at least in part upon the received control signal. |
| E10. | The method of E9 wherein the plural available picture dropping modes include no dropping, dropping non-referenced pictures, dropping B pictures and pictures referencing them, dropping P pictures and pictures referencing them, and dropping all but I pictures. |
| E11. | A method comprising: finding a picture in an encoded video bit stream; determining whether or not to drop the picture; if the picture is not dropped, decoding the picture, wherein the decoded picture has an entry in a decoded picture buffer; and if the picture is dropped, skipping decoding of the picture but maintaining an entry for the dropped picture in the decoded picture buffer. |
| E12. | The method of E11 further comprising, if the picture is dropped: marking the picture as skipped; and recycling at least some of resources allocated for the picture. |
| E13. | The method of E11 further comprising repeating the method for each of one or more other pictures in the encoded video bit stream. |
| E14. | The method of E11 wherein the entry for the dropped picture in the decoded picture buffer is an initialized, un-decoded picture. |
| E15. | The method of E11 wherein the entry for the dropped picture in the decoded picture buffer indicates the dropped picture was skipped. |
| E16. | A method comprising: selecting a picture dropping mode from among plural available picture dropping modes, wherein the plural available picture dropping modes include no dropping, dropping non-referenced pictures, dropping B pictures and pictures referencing them, dropping P pictures and pictures referencing them, and dropping all but I pictures; in the selected picture dropping mode, decoding video of a video sequence that includes plural pictures; outputting plural non-dropped decoded pictures among the plural pictures for display. |
| E17. | The method of E16 further comprising receiving a control signal, wherein the selecting is based at least in part upon the received control signal. |
| F. | Innovations in Computing Contextual Information for Direct Mode Macroblocks. |
| F1. | A method comprising: for a direct mode macroblock, selecting among plural available collocated macroblock information routines to call depending on two or more of: (a) spatial/temporal mode decision used for the direct mode macroblock, (b) picture format of a second picture that includes the direct mode macroblock, and (c) picture format of the first picture; calling the selected collocated macroblock information routine to get collocated macroblock information for the direct mode macroblock; and using the collocated macroblock information in reconstruction of the direct mode macroblock. |
| F2. | The method of F15 wherein the selecting is further based upon one or more of: (d) macroblock pair format for a macroblock pair including the direct mode macroblock, and (e) macroblock position of the direct mode macroblock in the MB pair. |

| # | Feature |
|---|---|
| | G. Reducing Memory Consumption During Multithreaded Decoding. |
| G1. | A method comprising:<br>entropy decoding plural encoded transform coefficients; and<br>packing at least some of the decoded transform coefficients in one or<br>more data structures, wherein the packing includes representing an individual<br>decoded transform coefficient as a single multi-bit value including a block<br>position and a coefficient level value packed together. |
| G2. | The method of G1 wherein the one or more data structures include a<br>buffer fragment having plural multi-bit values for the at least some of the<br>decoded transform coefficients, the plural multi-bit values including the single<br>multi-bit value. |
| G3. | The method of G1 wherein the one or more data structures include an<br>array of plural block count values for plural blocks of a macroblock, each of the<br>plural block count values indicating a count of non-zero coefficients in a<br>corresponding block of the plural blocks of the macroblock. |
| G4. | The method of G1 wherein the single multi-bit value further includes an<br>extension flag that indicates the presence or absence of a second multi-bit value<br>for storing an extension value for the coefficient level value. |
| G5. | The method of G1 wherein the packing further includes skipping<br>explicit representation of zero-value decoded transform coefficients in the one<br>or more data structures. |
| G6. | The method of G1 further comprising, during later decoding, unpacking<br>the packed transform coefficients for inverse scanning and inverse quantizing. |
| G7. | A method comprising:<br>entropy decoding plural encoded transform coefficients; and<br>packing at least some of the decoded transform coefficients in one or<br>more data structures, wherein the one or more data structures include an array<br>of plural block count values for plural blocks of a macroblock, each of the<br>plural block count values indicating a count of non-zero coefficients in a<br>corresponding block of the plural blocks of the macroblock. |
| G8. | The method of G7 wherein the packing further includes skipping<br>explicit representation of zero-value decoded transform coefficients in the one<br>or more data structures. |
| G9. | A method comprising:<br>entropy decoding plural encoded transform coefficients; and<br>buffering at least some of the decoded transform coefficients in plural<br>thread-specific buffers. |
| G10. | The method of G9 wherein each of the plural thread-specific buffers<br>includes one or more buffer fragments and dynamically adds buffer fragments<br>as needed. |
| G11. | The method of G10 wherein each of the one or more buffer fragments is<br>an array of multi-bit values, each of the multi-bit values representing one non-<br>zero decoded transform coefficient. |
| G12. | The method of G10 wherein a buffer fragment pool includes free buffer<br>fragments available for addition to the plural thread-specific buffers. |
| G13. | A method comprising:<br>decoding one or more pictures for a video frame including a top field<br>and a bottom field, wherein the top field includes plural lines and the bottom<br>field includes plural lines; and<br>buffering the top and bottom fields together in a single frame memory<br>buffer, the plural lines of the top field alternating with the plural lines of the<br>bottom field in the single frame memory buffer, wherein a top field structure<br>facilitates access to the buffered top field in the single frame memory buffer,<br>and wherein a bottom field structure facilitates access to the buffered bottom<br>field in the single frame memory buffer. |
| G14. | The method of G13 wherein the top field structure includes plural<br>pointers to the plural lines of the buffered top field in the single frame memory<br>buffer. |
| G15. | The method of G13 wherein the bottom field structure includes plural<br>pointers to the plural lines of the buffered bottom field in the single frame<br>memory buffer. |
| G16. | The method of G13 wherein a frame structure facilitates access to the<br>video frame in the single frame memory buffer, and wherein the frame<br>structure includes plural pointers to the plural lines of the single frame memory<br>buffer. |
| G17. | The method of G13 wherein the decoding includes decoding an encoded<br>version of the video frame. |
| G18. | The method of G13 wherein the decoding includes decoding encoded<br>versions of the top field and the bottom field. |
| G19. | A method comprising:<br>allocating memory from plural memory pools, each of the plural<br>memory pools storing available memory chunks adapted for a different<br>decoding task or adapted for a different one or more data structures used in<br>decoding; and<br>decoding video using the allocated memory. |

| # | Feature |
|---|---|
| G20. | The method of G19 wherein, for a given memory pool of the plural available memory pools, each of the available memory chunks is sized for the different decoding task or one or more data structures for the given memory pool. |

H. Inverse Transform Innovations for GPU-platform Decoding.

| # | Feature |
|---|---|
| H1. | A method comprising:<br>receiving transform coefficients for video;<br>classifying the transform coefficients into plural types; and<br>with a graphics processing unit, performing inverse transforms on the transform coefficients in plural passes corresponding to the plural types, respectively, wherein each of the plural types is associated with a quantum of work for the type. |
| H2. | The method of H1 wherein the plural types are 4 × 4 luma, 4 × 4 chroma and 8 × 8 luma. |
| H3. | The method of H2 wherein the quantum of work for 4 × 4 luma is four 4 × 4 blocks of the transform coefficients. |
| H4. | The method of H2 wherein the quantum of work for 4 × 4 chroma is two 4 × 4 blocks of the transform coefficients. |
| H5. | The method of H2 wherein the quantum of work for 8 × 8 luma is one 8 × 8 block of the transform coefficients. |
| H6. | The method of H1 wherein the performing the inverse transforms uses native matrix multiplication operations and native matrix addition operations. |
| H7. | A method comprising:<br>receiving transform coefficients for video; and<br>with a graphics processing unit, performing inverse transforms on the transform coefficients using native matrix multiplication operations and native matrix addition operations. |

I. Inverse Quantization Innovations for GPU-platform Decoding.

| # | Feature |
|---|---|
| I1. | A method comprising:<br>receiving transform coefficients for video;<br>classifying inverse quantization operations for the transform coefficients into plural types; and<br>with a graphics processing unit, performing inverse quantization on the transform coefficients in plural passes corresponding to the plural types, respectively, wherein each of the plural types is associated with a quantum of work for the type. |
| I2. | The method of I1 wherein the plural types are DC luma, DC chroma, 4 × 4 luma, 4 × 4 chroma and 8 × 8 luma. |
| I3. | The method of I2 wherein the quantum of work for DC luma is one 4 × 4 block of DC coefficients of the transform coefficients. |
| I4. | The method of I2 wherein the quantum of work for DC chroma is one 2 × 2 block of DC coefficients of the transform coefficients. |
| I5. | The method of I2 wherein the quantum of work for 4 × 4 luma is one 1 × 16 row of AC coefficients of the transform coefficients. |
| I6. | The method of I2 wherein the quantum of work for 4 × 4 chroma is two 2 × 4 blocks of the transform coefficients. |
| I7. | The method of I2 wherein the quantum of work for 8 × 8 luma is one 4 × 16 block of AC coefficients of the transform coefficients. |
| I8. | The method of I1 wherein the performing the inverse quantization uses a user-defined scaling list and/or normalization adjustment matrix. |
| I9. | The method of I8 wherein an array of constant registers holds the user-defined scaling list and/or normalization adjustment matrix. |
| I10. | The method of I1 wherein the performing the inverse quantization uses a default scaling list and/or normalization adjustment matrix. |
| I11. | A method comprising:<br>receiving transform coefficients for video; and<br>with a graphics processing unit, performing inverse quantization on the transform coefficients using a scaling list, wherein an array of constant registers holds the scaling list. |
| I12. | The method of I11 wherein the scaling list is a user-defined scaling list, the method further comprising receiving the user-defined scaling list signaled as part of a picture header in a coded video bit stream. |
| I13. | The method of I11 wherein the scaling list is a default scaling list. |

J. Fractional Interpolation Innovations for GPU-platform Decoding.

| # | Feature |
|---|---|
| J1. | A method comprising:<br>receiving plural motion vectors for video;<br>classifying plural blocks into plural motion vector types; and<br>with a graphics processing unit, performing motion compensation operations for the plural blocks with the plural motion vectors in plural passes corresponding to the plural motion vector types, respectively, wherein each of the plural motion vector types is associated with a quantum of work for the motion vector type. |
| J2. | The method of J1 wherein the plural motion vector types are integer, center offset, and off-center offset. |

| # | Feature |
|---|---|
| J3. | The method of J2 wherein the quantum of work for each of the plural motion vector types is 8 × 8 block. |
| J4. | The method of J2 wherein, for an integer pass of the plural passes, the motion compensation tasks include fetching sample values. |
| J5. | The method of J2 wherein, for a center offset pass of the plural passes, a center offset shader routine implements the motion compensation operations. |
| J6. | The method of J2 wherein, for an off-center offset pass of the plural passes, an off-center offset shader routine implements the motion compensation operations. |
| J7. | The method of J1 wherein the plural motion vector types differ in terms of complexity of sample interpolation. |
| J8. | The method of J1 wherein the motion compensation operations include fractional sample value interpolation. |
| J9. | The method of J1 wherein plural reference pictures for the motion compensation operations are represented as a 3D texture. |
| J10. | The method of J1 wherein the motion vectors are applied for 4 × 4 blocks in the motion compensation operations. |
| J11. | A method comprising:<br>receiving plural motion vectors for video; and<br>with a graphics processing unit, performing motion compensation operations for plural blocks with the plural motion vectors, wherein the performing includes using an off-center offset shader routine for off-center motion vectors among the plural motion vectors. |
| J12. | The method of J11 wherein the performing motion compensation operations includes performing motion compensation on a block-by-block basis for 4 × 4 blocks. |
| J13. | The method of J11 wherein the performing motion compensation operations includes performing motion compensation on a block-by-block basis and not storing intermediate values from block-to-block. |
| J14. | A method comprising:<br>receiving plural motion vectors for video; and<br>with a graphics processing unit, performing motion compensation operations for plural blocks with the plural motion vectors, wherein the performing includes using a center offset shader routine for center motion vectors among the plural motion vectors. |
| J15. | The method of J14 wherein the performing motion compensation operations includes performing motion compensation on a block-by-block basis for 4 × 4 blocks. |
| J16. | The method of J14 wherein the performing motion compensation operations includes performing motion compensation on a block-by-block basis and storing intermediate values from block-to-block.<br>K. Intra Prediction Innovations Using Waves for GPU-platform Decoding. |
| K1. | A method comprising:<br>organizing plural intra blocks as plural waves, each of the plural waves including one or more of the plural intra blocks; and<br>with a graphics processing unit, performing intra prediction on the plural intra blocks on a wave-by-wave basis, including for at least one of the plural waves processing some of the one or more intra blocks within the wave in parallel. |
| K2. | The method of K1 wherein the organizing includes:<br>grouping a first set of one or more of the plural intra blocks having no intra prediction dependencies on other intra blocks of the plural intra blocks;<br>grouping a second set of one or more of the plural intra blocks having no intra prediction dependencies other than dependencies on the first set; and<br>grouping a third set of one or more of the plural intra blocks having no intra prediction dependencies other than dependencies on the first and second sets. |
| K3. | The method of K2 wherein the organizing is based upon static assumptions of intra prediction dependencies for the plural intra blocks. |
| K4. | The method of K2 wherein the organizing is based upon actual intra prediction dependencies for the plural intra blocks. |
| K5. | The method of K1 wherein the one or more intra blocks for at least one of the plural waves include a first intra block having a first block size and a second intra block having a second block size different than the first block size. |
| K6. | The method of K1 wherein the plural intra blocks have plural different block sizes, and wherein at least one of the plural waves includes a set of one or more intra blocks for each of the plural different block sizes. |
| K7. | The method of K1 wherein the organizing includes:<br>identifying plural actual intra prediction dependencies for the plural intra blocks; and<br>building the plural waves based at least in part on the plural actual intra prediction dependencies. |

| # | Feature |
|---|---|
| K8. | The method of K1 wherein the organizing includes:<br>assigning an initial wave number to each of the plural intra blocks;<br>scanning a picture with the plural intra blocks; and<br>during the scanning, assigning increasing wave numbers to the plural<br>intra blocks depending on intra picture dependencies for the plural intra blocks. |
| K9. | The method of K1 wherein the plural intra blocks are in a P picture or B<br>picture along with one or more non-intra blocks omitted from the plural waves. |
| K10. | The method of K1 wherein the plural intra blocks are in an I picture. |
| K11. | The method of K1 wherein the plural intra blocks include plural luma<br>blocks and plural chroma blocks, wherein the plural waves are plural merged<br>waves, and wherein the organizing includes:<br>identifying plural luma waves for the plural luma blocks;<br>identifying plural chroma waves for the plural chroma blocks; and<br>merging the plural luma waves and the plural chroma waves into the<br>plural merged waves to increase parallelism within the plural merged waves. |
| K12. | The method of K11 wherein at least some collocated luma blocks and<br>chroma blocks are in different waves of the plural merged waves. |
| K13. | The method of K11 wherein the performing intra prediction includes for<br>each of the plural merged waves processing at least some of the plural luma<br>blocks and at least some of the plural chroma blocks in parallel. |
| K14. | The method of K1 wherein the intra prediction includes plural intra<br>prediction modes, and wherein the performing intra prediction includes<br>applying results of refactored operations for the plural intra prediction modes,<br>the refactored operations reducing branches in implementations of the plural<br>intra prediction modes. |
| K15. | A method comprising:<br>loading a table with results of refactored operations for plural intra<br>prediction modes; and<br>with a graphics processing unit, performing intra prediction on plural<br>intra blocks in parallel, including using table-based lookups on the table with<br>results of refactored operations for the plural prediction modes.<br>L. Loop Filtering Innovations Using Waves for GPU-platform Decoding. |
| L1. | A method comprising:<br>organizing plural blocks as plural waves, each of the plural waves<br>including one or more of the plural blocks; and<br>with a graphics processing unit, performing loop filtering on the plural<br>blocks on a wave-by-wave basis, including for at least one of the plural waves<br>processing some of the one or more blocks within the wave in parallel. |
| L2. | The method of L1 wherein the plural blocks are luma blocks, the<br>method further comprising performing loop filtering on plural chroma blocks as<br>a single wave. |
| L3. | The method of L1 wherein the loop filtering includes block-by-block<br>processing along a row or column in a macroblock. |
| L4. | The method of L1 wherein the organizing includes:<br>grouping a first set of one or more of the plural blocks having no<br>dependencies on other blocks of the plural blocks;<br>grouping a second set of one or more of the plural blocks having no<br>dependencies other than dependencies on the first set; and<br>grouping a third set of one or more of the plural intra blocks having no<br>dependencies other than dependencies on the first and second sets. |
| L5. | The method of L1 wherein the organizing is based upon static<br>assumptions of dependencies for the plural blocks. |
| L6. | The method of L1 wherein the organizing is independent of edge<br>strengths of the plural blocks. |
| L7. | A method comprising:<br>in a first loop filtering pass for a picture, calculating boundary strength<br>values in parallel with a graphics processing unit;<br>in a second loop filtering pass for the picture:<br>loop filtering plural luma blocks in parallel with the graphics<br>processing unit; and<br>loop filtering plural chroma blocks in parallel with the graphics<br>processing unit. |
| L8. | The method of L7 further comprising:<br>in a third pass for the picture, reshuffling at least some results of the<br>second loop filtering pass. |
| L9. | The method of L7 wherein the second loop filtering pass includes a<br>luma pass for the loop filtering the plural luma blocks and a chroma pass for<br>the loop filtering the plural chroma blocks. |
| L10. | The method of L9 wherein the loop filtering the plural luma blocks<br>includes:<br>organizing the plural luma blocks as plural waves; and<br>performing the loop filtering the plural luma blocks on a wave-by-wave<br>basis. |

| # | Feature |
|---|---|
| L11. | The method of L9 wherein the loop filtering the plural luma blocks includes a horizontal edge pass and a vertical edge pass. |
| L12. | The method of L9 wherein the loop filtering the plural chroma blocks includes performing the loop filtering the plural chroma blocks as a single wave. |
| L13. | A method comprising:<br>receiving plural chroma blocks; and<br>loop filtering the plural chroma blocks in parallel with a graphics processing unit as a single wave. |
| L14. | The method of L13 wherein the loop filtering the plural chroma blocks includes performing plural loop filtering passes within the single wave. |
| L15. | The method of L14 wherein the plural loop filtering passes include a top-left corner pass, top edge pass, left edge pass, and center pass. |

M. Memory Usage Innovations for GPU-platform Decoding.

| # | Feature |
|---|---|
| M1. | A method comprising:<br>decoding encoded video for a picture with a graphics processing unit;<br>during the decoding, buffering sample values for the picture in a tiled format; and<br>after the decoding, buffering the decoded picture in a decoded picture buffer in the tiled format for use as a reference picture. |
| M2. | The method of M1 wherein the tiled format is a tiled 4 × 4 format. |
| M3. | A method comprising:<br>representing plural resource usage patterns for plural commands in a graphics processing unit command queue; and<br>decoding plural pictures in serial coded order with a graphics processing unit, wherein the decoding includes regulating memory based at least in part upon the plural resource usage patterns. |
| M4. | The method of M3 wherein the resource usage patterns are memory partition patterns for a memory array. |
| M5. | The method of M3 wherein the resource usage patterns are reference picture slot assignment patterns for a memory array. |
| M6. | A method comprising:<br>representing a reference picture as a texture in memory; and<br>decoding one or more pictures of a video sequence with a graphics processing unit, including using texture operations to access the reference picture in memory during motion compensation. |
| M7. | The method of M6 wherein the reference picture is a first field reference picture, the method further comprising representing a second field reference picture in memory by alternating lines of the first and second field reference pictures in the texture. |
| M8. | The method of M7 wherein the using the texture operations includes:<br>using texture operations on even lines of the texture when accessing one of the first and second field reference pictures;<br>using texture operations on odd lines of the texture when accessing the other of the first and second field reference pictures; and<br>using texture operations on the even lines and the odd lines of the texture when accessing the first and second field reference pictures as a reference frame. |
| M9. | The method of M6 wherein the texture is a plane in a 3D texture, wherein the 3D texture also represents one or more other reference pictures. |
| M10. | A method comprising:<br>representing plural reference pictures as a 3D texture in memory; and<br>decoding one or more pictures of a video sequence with a graphics processing unit, including using texture operations to access one or more of the plural reference picture in memory during motion compensation. |
| M11. | A method comprising:<br>representing a top field reference picture and a bottom field reference picture as alternating lines of a texture in memory; and<br>decoding one or more pictures of a video sequence with a graphics processing unit, including using texture operations to access one or more of the top and bottom field reference pictures in memory during motion compensation. |
| M12. | The method of M11 wherein the using the texture operations includes:<br>using texture operations on even lines of the texture when accessing the top field reference picture;<br>using texture operations on odd lines of the texture when accessing the bottom field reference picture; and<br>using texture operations on the even lines and the odd lines of the texture when accessing the top and bottom field reference pictures as a reference frame. |

N. Performance-adaptive Loop Filtering

| # | Feature |
|---|---|
| N1. | A method comprising:<br>receiving video in an encoded video bit stream; and<br>decoding the video, wherein the decoding includes:<br>measuring performance of the decoding; |

| # | Feature |
|---|---|
| | selecting a loop filtering quality level from among plural available loop filtering quality levels using the measured performance; and performing loop filtering at the selected loop filtering quality level. |
| N2. | The method of N1 wherein the measured performance includes a count of pictures ready for display. |
| N3. | The method of N2 wherein the decoding includes repeating the measuring of the count of pictures ready for display and the selecting on a picture-by-picture basis for plural pictures of the video. |
| N4. | The method of N1 wherein the measured performance includes proportion of pictures in a window that are decoded at a given loop filtering quality level among the plural available loop filtering quality levels. |
| N5. | The method of N4 wherein the decoding includes repeating the measuring the proportion and the selecting on a picture-by-picture basis. |
| N6. | The method of N1 wherein the selecting is based at least in part upon one or more of a short-term performance measure and a long-term performance measure. |
| N7. | The method of N6 wherein the short-term performance measure is a count of pictures ready for display, and wherein the long-term performance measure is a proportion of pictures in a window that are decoded at a given loop filtering quality level. |
| N8. | The method of N1 wherein the plural available loop filtering quality levels include a no loop filtering level, a full loop filtering level, and one or more fast loop filtering levels, each of the one or more fast loop filtering levels being computationally simpler than the full loop filtering level but lower quality. |
| N9. | The method of N1 wherein the loop filtering is content adaptive and the selecting the loop filtering quality level is performance adaptive depending on one or more of current computational capacity, complexity of the video being decoded and quality of the video being decoded. |
| N10. | The method of N1 wherein the selecting comprises: determining whether to switch from a current quality stage to another quality stage and, if so, changing the current quality stage to the other quality stage, wherein the current quality stage is associated with one or more of the plural available loop filtering quality levels, and wherein within the current quality stage the selecting selects between the one or more available loop filtering quality levels associated with the current quality stage. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units, memory, and storage, wherein the memory and/or the storage has stored therein computer-executable instructions for causing the computer system, when programmed thereby, to perform video processing comprising:
receiving encoded data for a picture that includes plural portions; and
decoding the encoded data to reconstruct the picture, including performing decoding operations for the plural portions of the picture, on a wave-by-wave basis, as plural waves, the plural portions of the picture having variable size, each of the plural waves including one or more of the plural portions of the picture, wherein, for at least one of the plural waves, at least some of the one or more portions within the wave are processed in parallel, wherein the plural waves ripple from a top-left corner of the picture toward a bottom-right corner of the picture, wherein each of the plural waves depends on results of the decoding operations for preceding waves among the plural waves, and wherein, for each of the plural waves, for each given portion of the wave the decoding operations have completed for (1) the portion, if any, left of the given portion, (2) the portion, if any, above-left of the given portion, (3) the portion, if any, above the given portion, and (4) the portion, if any, above-right of the given portion.

2. The computer system of claim 1, wherein the plural waves roughly correspond to diagonal lines of portions of the picture, and wherein the portions are macroblocks.

3. The computer system of claim 1, wherein the plural waves are based upon static assumptions of dependencies for the plural portions of the picture.

4. The computer system of claim 1, wherein the plural waves are based upon actual dependencies for the plural portions of the picture.

5. The computer system of claim 1, wherein the one or more processing units include a central processing unit ("CPU") and a graphics processing unit ("GPU"), and wherein execution units of the GPU perform the decoding operations for the plural portions of the picture on a wave-by-wave basis.

6. The computer system of claim 1, wherein each of the plural portions of the picture is an arrangement of sample values for luma with associated arrangements of sample values for chroma.

7. The computer system of claim 1, wherein the plural portions of the picture are intra-coded, and wherein the decoding operations include intra prediction operations.

8. The computer system of 28, wherein, for at least one of the plural waves, the one or more portions of that wave include a first intra portion having a first size and a second intra portion having a second size different than the first size.

9. The computer system of claim 7, wherein the picture is a P picture or a B picture, and wherein one or more non-intra portions of the picture are omitted from the plural waves.

10. The computer system of claim 7, wherein the picture is an I picture.

11. The computer system of claim 7, wherein the performing the intra prediction operations include, for one of the plural waves, processing at least some luma blocks and at least some chroma blocks in parallel.

12. The computer system of claim 7, wherein the intra prediction operations use plural intra prediction modes, and wherein the performing the intra prediction operations includes applying results of refactored operations for the plural intra prediction modes, the refactored operations reducing branches in implementations of the plural intra prediction modes.

13. The computer system of claim 1, wherein the decoding operations include loop filtering operations.

14. The computer system of claim 13, wherein the loop filtering operations include block-by-block processing along a row or column in a macroblock.

15. The computer system of claim 13, wherein the plural waves are independent of edge strengths of the plural portions of the picture.

16. The computer system of claim 13, wherein the loop filtering operations include:
in a first loop filtering pass for the picture, calculating boundary strength values; and
in a second loop filtering pass for the picture:
loop filtering plural luma blocks; and
loop filtering plural chroma blocks.

17. The computer system of claim 16, wherein the second loop filtering pass includes a luma pass for the loop filtering the plural luma blocks and a chroma pass for the loop filtering the plural chroma blocks.

18. A method comprising:
receiving encoded data for a picture that includes plural portions; and
decoding the encoded data to reconstruct the picture, including performing decoding operations for the plural portions of the picture, on a wave-by-wave basis, as plural waves, the plural portions of the picture having variable size, each of the plural waves including one or more of the plural portions of the picture, wherein, for at least one of the plural waves, at least some of the one or more portions within the wave are processed in parallel, wherein the plural waves ripple from a top-left corner of the picture toward a bottom-right corner of the picture, wherein each of the plural waves depends on results of the decoding operations for preceding waves among the plural waves, and wherein, for each of the plural waves, for each given portion of the wave the decoding operations have completed for (1) the portion, if any, left of the given portion, (2) the portion, if any, above-left of the given portion, (3) the portion, if any, above the given portion, and (4) the portion, if any, above-right of the given portion.

19. The method of claim 18, wherein execution units of a graphics processing unit ("GPU") perform the decoding operations for the plural portions of the picture on a wave-by-wave basis.

20. The method of claim 18, wherein the plural portions of the picture are intra-coded, and wherein the decoding operations include intra prediction operations.

21. The method of claim 20, wherein:
the picture is a P picture or a B picture, and one or more non-intra portions of the picture are omitted from the plural waves; or
the picture is an I picture.

22. The method of claim 18, wherein the decoding operations include loop filtering operations.

23. A non-volatile memory device having stored therein computer-executable instructions for causing a computer system, when programmed thereby, to perform video processing comprising:
receiving encoded data for a picture that includes plural portions of the picture; and
decoding the encoded data to reconstruct the picture, including performing decoding operations for the plural portions of the picture, on a wave-by-wave basis, as plural waves, the plural portions of the picture having variable size, each of the plural waves including one or more of the plural portions of the picture, wherein, for at least one of the plural waves, at least some of the one or more portions within the wave are processed in parallel, wherein the plural waves ripple from a top-left corner of the picture toward a bottom-right corner of the picture, wherein each of the plural waves depends on results of the decoding operations for preceding waves among the plural waves, and wherein, for each of the plural waves, for each given portion of the wave the decoding operations have completed for (1) the portion, if any, left of the given portion, (2) the portion, if any, above-left of the given portion, (3) the portion, if any, above the given portion, and (4) the portion, if any, above-right of the given portion.

24. The non-volatile memory device of claim 23, wherein execution units of a graphics processing unit ("GPU") perform the decoding operations for the plural portions of the picture on a wave-by-wave basis.

25. The non-volatile memory device of claim 23, wherein the plural portions of the picture are intra-coded, and wherein the decoding operations include intra prediction operations.

26. The non-volatile memory device of claim 25, wherein:
the picture is a P picture or a B picture, and one or more non-intra portions of the picture are omitted from the plural waves; or
the picture is an I picture.

27. The non-volatile memory device of claim 23, wherein the decoding operations include loop filtering operations.

* * * * *